US008963405B2

(12) United States Patent
Petroski et al.

(10) Patent No.: US 8,963,405 B2
(45) Date of Patent: Feb. 24, 2015

(54) LIGHT BULB WITH THERMAL FEATURES

(75) Inventors: James T. Petroski, Parma, OH (US);
Witold Bauer, Westlake, OH (US);
Jeffery R. Parker, Richfield, OH (US)

(73) Assignee: Rambus Delaware LLC, Brecksville, OH (US)

( * ) Notice: Subject to any disclaimer, the term of this patent is extended or adjusted under 35 U.S.C. 154(b) by 261 days.

(21) Appl. No.: 13/570,559

(22) Filed: Aug. 9, 2012

(65) Prior Publication Data

US 2013/0038195 A1    Feb. 14, 2013

Related U.S. Application Data

(60) Provisional application No. 61/521,505, filed on Aug. 9, 2011, provisional application No. 61/548,765, filed on Oct. 19, 2011, provisional application No. 61/648,844, filed on May 18, 2012.

(51) Int. Cl.
*H01J 7/26* (2006.01)
*F21V 29/00* (2006.01)
*F21K 99/00* (2010.01)

(52) U.S. Cl.
CPC ............. *F21V 29/22* (2013.01); *F21V 29/2231* (2013.01); *F21K 9/52* (2013.01); *Y02B 20/19* (2013.01); *F21K 9/13* (2013.01)
USPC ........................... 313/35; 362/373; 362/296.1

(58) Field of Classification Search
USPC .................................. 313/35; 362/373, 296.1
See application file for complete search history.

(56) References Cited

U.S. PATENT DOCUMENTS

| 7,160,012 | B2 | 1/2007 | Hilscher et al. |
| 8,540,401 | B2 | 9/2013 | Simon et al. |
| 2007/0070629 | A1 | 3/2007 | Hulick et al. |
| 2009/0296402 | A1 | 12/2009 | Chang et al. |
| 2010/0246166 | A1 | 9/2010 | Hsu et al. |
| 2011/0032708 | A1 | 2/2011 | Johnston et al. |
| 2011/0090686 | A1 | 4/2011 | Pickard |

FOREIGN PATENT DOCUMENTS

WO    WO-2010-066841    6/2010

OTHER PUBLICATIONS

International Search Report and Written Opinion dated Jan. 29, 2013 in International Application No. PCT/US2012/050080. 9 pages.
PCT Notification of Transmittal of ISR and WO of the ISA dated Feb. 27, 2013, re Application No. PCT/US2012/050078. 10 pages.

*Primary Examiner* — Elmito Breval
(74) *Attorney, Agent, or Firm* — Renner, Otto, Boisselle & Sklar, LLP

(57) ABSTRACT

A light bulb includes a light guide, light source, and housing. The light guide is configured as an open-ended hollow body surrounding an internal volume and defining a longitudinal axis. The light guide has inner and outer major surfaces. The light source is configured to edge light the light guide. The housing is at one end of the light guide. In one embodiment, fins extend from the housing adjacent the outer major surface, each fin separated from the outer major surface by an air gap to allow air flow between the fin and outer major surface. In another embodiment, a heat sink is disposed in the internal volume and configured as a hollow body with a branched cross section. Each branch extends outward from a common center and defines an air flow channel that terminates in an orifice aligned with a respective through-slot of the light guide.

33 Claims, 42 Drawing Sheets

LIGHT BULB WITH THERMAL FEATURES

RELATED APPLICATION DATA

This application claims the benefit of U.S. Provisional Patent Application No. 61/521,505, filed Aug. 9, 2011, claims the benefit of U.S. Provisional Patent Application No. 61/548,765, filed Oct. 19, 2011, and claims the benefit of U.S. Provisional Patent Application No. 61/648,844, filed May 18, 2012, the disclosures of which are incorporated herein by reference in their entireties.

BACKGROUND

Energy efficiency has become an area of interest for energy consuming devices. One class of energy consuming devices is incandescent light bulbs. Light emitting diode (LED) based light bulbs show promise as an energy-efficient, longer-lived and mercury-free replacement for incandescent light bulbs and compact fluorescent lamps (CFL). But, the energy-saving promise of LED-based light bulbs cannot be realized without an effective way of dissipating heat generated by the LEDs at all possible orientations of the light bulb.

DESCRIPTION

Figure 1A:
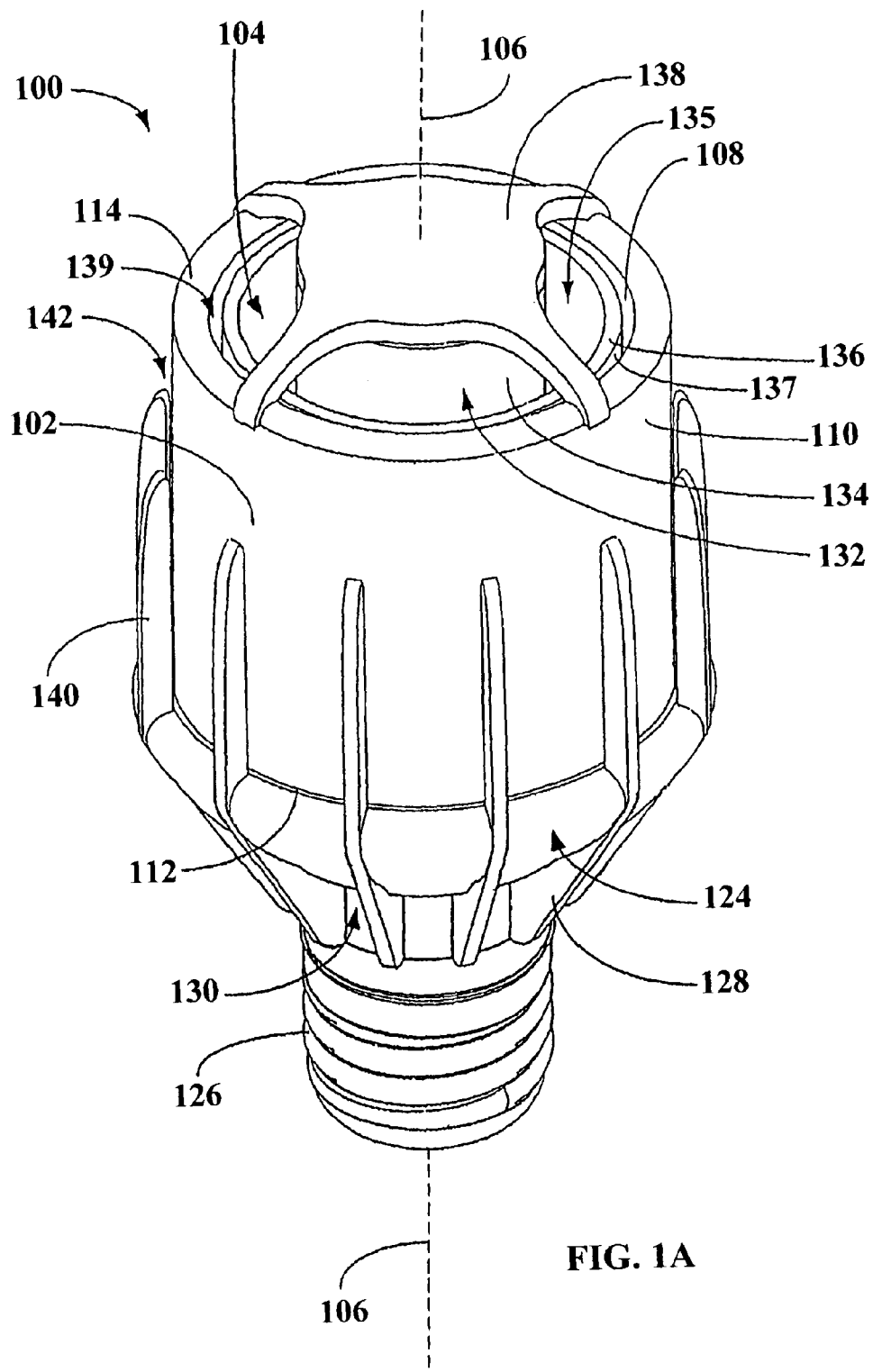
FIG. 1A is a perspective view of an exemplary light bulb oriented with its longitudinal axis vertical.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments. In this disclosure, angles of incidence, reflection, and refraction and output angles are measured relative to the normal to the surface.

In accordance with one embodiment, a light bulb includes a light guide, a light source, and a housing. The light guide is configured as an open-ended hollow body surrounding an internal volume and defining a longitudinal axis. The light guide has an inner major surface and an outer major surface. The light source is configured to edge light the light guide such that light from the light source propagates along the light guide by total internal reflection at the outer and inner major surfaces. The housing is at an end of the light guide. Fins extend from the housing adjacent the outer major surface of the light guide. The fins, the housing, and the light source are thermally coupled. Each fin is separated from the outer major surface of the light guide by an air gap to allow air flow between the fin and the outer major surface of the light guide.

In accordance with another embodiment, a light bulb includes a light guide, a light source, and a housing. The light guide is configured as an open-ended hollow body surrounding an internal volume and defining a longitudinal axis. The light guide has an inner major surface and an outer major surface. The light guide has light guide regions and has a through-slot between two adjacent ones of the light guide regions. The light source is configured to edge light the light guide such that light from the light source propagates along the light guide by total internal reflection at the outer and inner major surfaces. The housing is at one end of the light guide. A heat sink is disposed in the internal volume of the light guide and configured as a hollow body with a branched cross section. Each branch extends outward from a common center and defines an air flow channel that terminates in an orifice aligned with a respective through-slot of the light guide. The heat sink, the housing, and the light source are thermally coupled.

In accordance with another embodiment, a light bulb component includes a housing including a proximal end and a distal end and defining a longitudinal axis. The distal end of the housing includes a light source mounting surface. Vents extend from the outer surface of the housing to the distal end of the housing. Fins extend from the distal end of the housing in a direction parallel to the longitudinal axis. The fins are thermally coupled to the housing.

In accordance with another embodiment, a light bulb component includes a housing including a proximal end and a distal end and defining a longitudinal axis. The distal end of the housing includes a light source mounting surface. A heat sink is at the distal end of the housing. The heat sink is configured as a hollow body with a branched cross section, each branch extending outward from a common center and defining an air flow channel that terminates in an orifice. The heat sink and the housing are thermally coupled.

With initial reference to FIGS. 1A-1D, an exemplary embodiment of a light bulb is shown at 100. References in this disclosure to a "light bulb" are meant to broadly encompass light-producing devices that fit into and engage any of various fixtures used for mechanically mounting the light-producing device and for providing electrical power thereto. Examples of such fixtures include, without limitation, a screw-in fixture for engaging an Edison light bulb base, a bayonet fixture for engaging a bayonet light bulb base, and a bi-pin fixture for engaging a bi-pin light bulb base. Thus the term "light bulb," by itself, does not provide any limitation on the shape of the light-producing device, or the mechanism by which light is produced from electric power. In one embodiment, however, the light bulb conforms to an outer envelope of an A19 light bulb. Also, the light bulb need not have an enclosed envelope forming an environment for light generation. The light bulb may conform to American National Standards Institute (ANSI) or other standards for electric lamps, but the light bulb does not necessarily have to have this conformance.

The light bulb 100 includes a light guide 102. In this disclosure, a light guide is a solid article made from, for example, acrylic, polycarbonate, poly(methyl-methacrylate) (PMMA), glass, or other appropriate material. The light guide may also be a multi-layer light guide having two or more layers that may differ in refractive index. In some embodiments, the light guide is a single element. In other embodiments, the light guide includes light guide segments that collectively form the light guide.

The light guide 102 is configured as an open-ended hollow body surrounding an internal volume 104 and defining a longitudinal axis 106. The light guide 102 includes an inner major surface 108 and an outer major surface 110 opposite the inner major surface 108. The major surfaces 108, 110 extend along the longitudinal axis 106 between a proximal end 112 and a distal end 114. The major surfaces 108, 110 of the light guide 102 may curve about at least one of an axis orthogonal to the longitudinal axis 106 and an axis parallel to the longitudinal axis 106. In the illustrated embodiment, the light guide 102 is cylindrical in shape. In other embodiments the light guide is frustroconical, a frustrated pyramid, a bell shape, an hourglass shape, or another suitable shape.

Figure 1B:
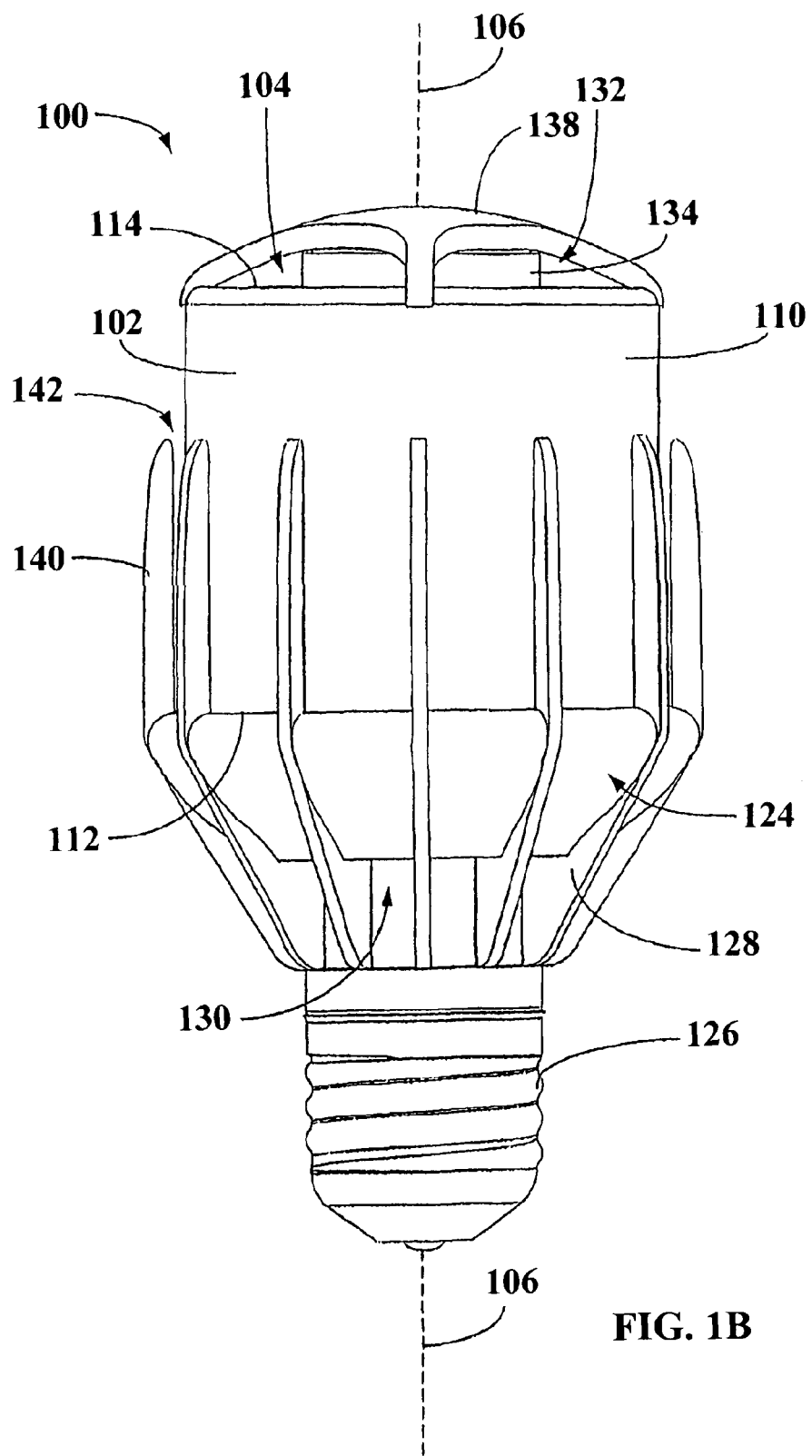
FIG. 1B is a side view of the light bulb shown in FIG. 1A oriented with its longitudinal axis vertical.
Figure 1C:
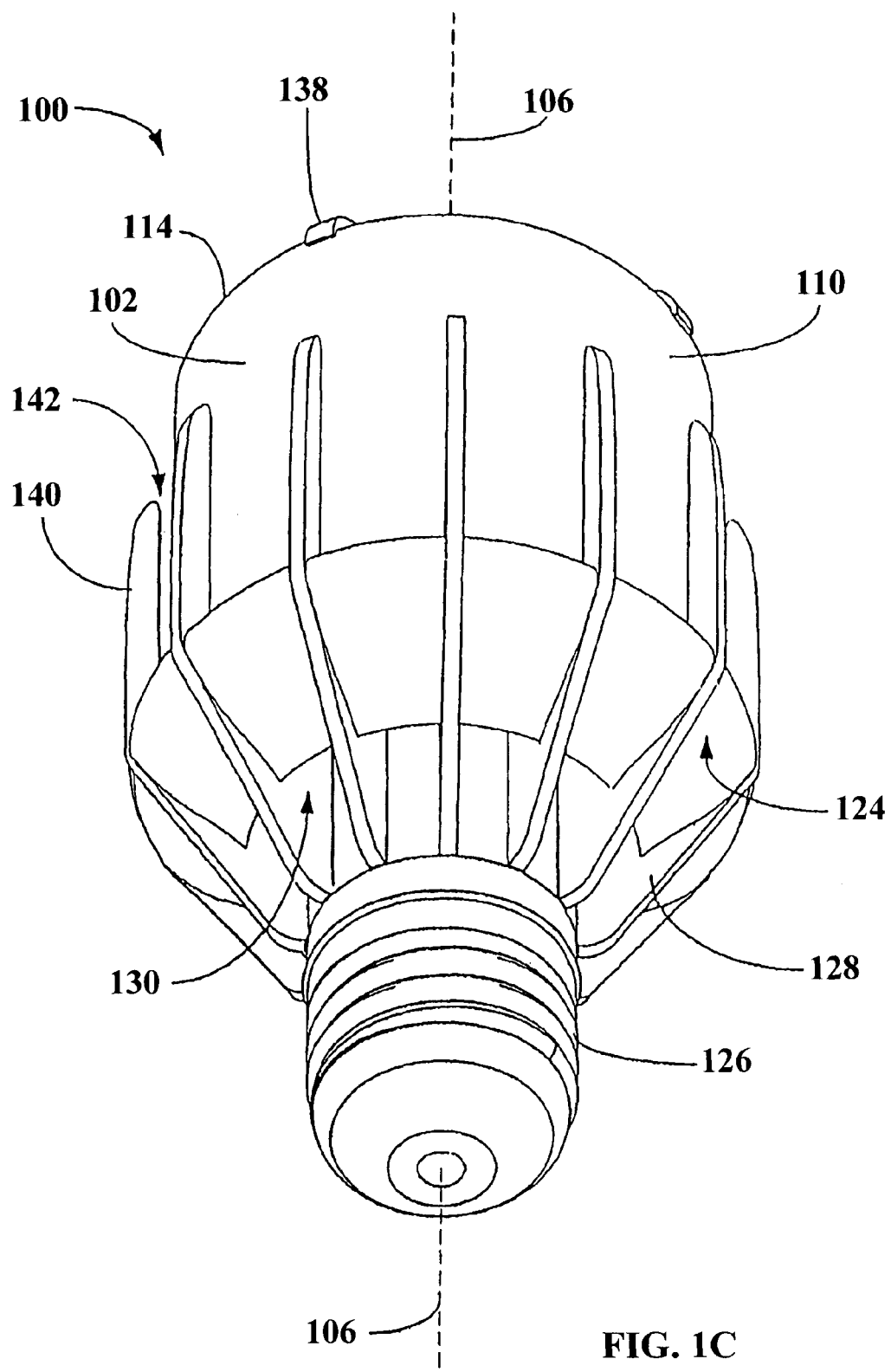
FIG. 1C is another perspective view of the light bulb shown in FIG. 1A oriented with its longitudinal axis vertical.
Figure 1D:
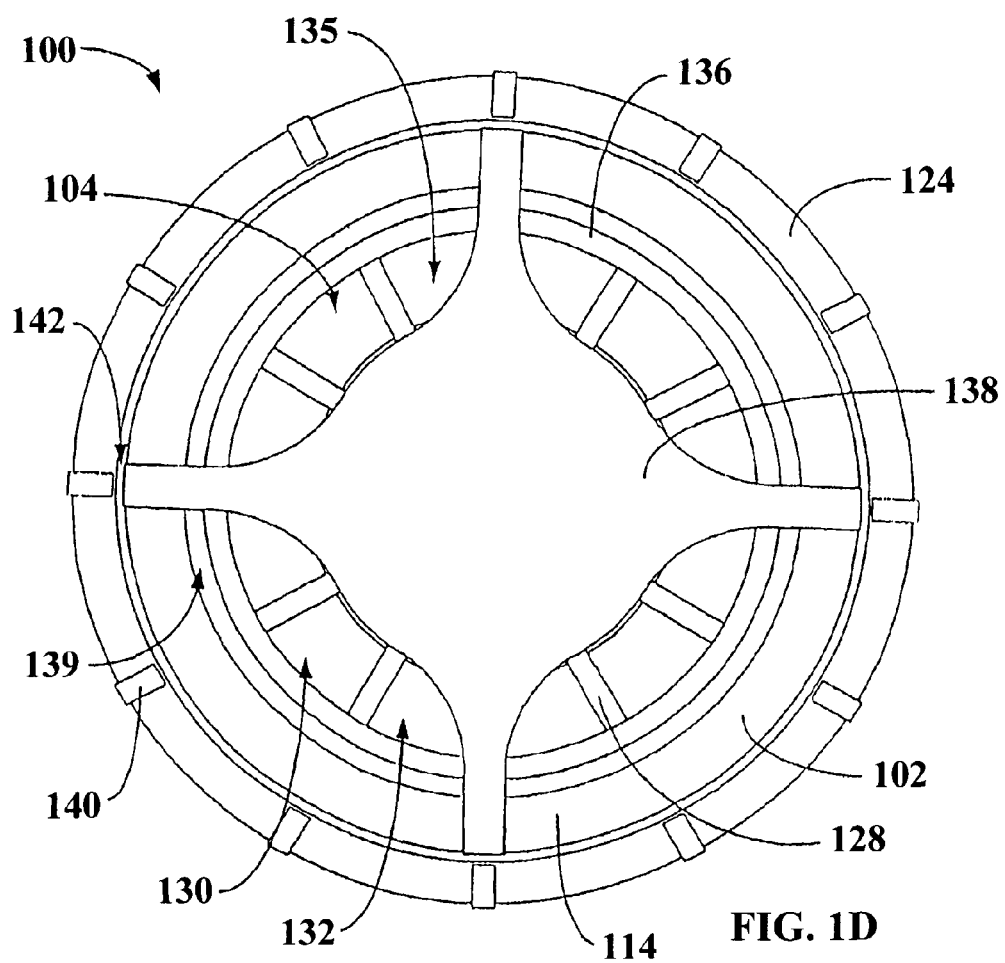
FIG. 1D is a top view of the light bulb shown in FIG. 1A viewed from the distal end of the light guide.
Figure 1E:
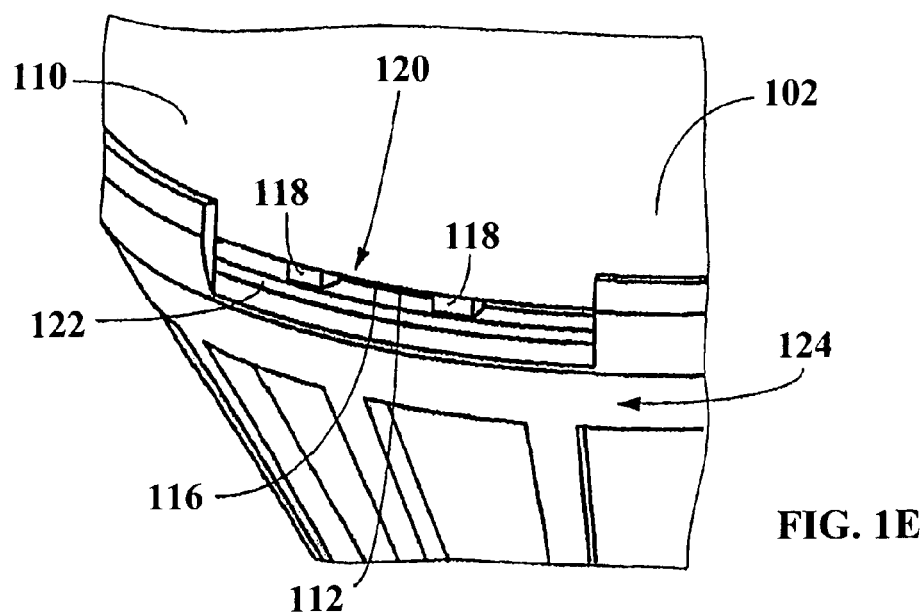
FIG. 1E is a perspective view showing part of the light bulb shown in FIG. 1A.

With additional reference to FIG. 1E, an edge surface at the proximal end 112 of the light guide 102 provides a light input edge 116 through which light from light source 120 is input to the light guide 102. The light guide 102 is configured to propagate light input to the light guide 102 by total internal reflection at the inner major surface 108 and the outer major surface 110.

The light guide 102 includes light extracting elements (not shown) in, on, or beneath at least one of the major surfaces 108, 110. Light extracting elements that are in, on, or beneath the major surface 108, 110 will be referred to as being "at" the major surface. Each light extracting element functions to disrupt the total internal reflection of the propagating light that is incident on the light extracting element. In one embodiment, the light extracting elements reflect light toward the opposing major surface so that the light exits the light guide 102 through the opposing major surface. Alternatively, the light extracting elements transmit light through the light extracting elements and out of the major surface of the light guide 102 having the light extracting elements. In another embodiment, both types of light extracting elements are present. In yet another embodiment, the light extracting elements reflect some of the light and refract the remainder of the light incident thereon. Therefore, the light extracting elements are configured to extract light from the light guide 102 through one or both of the major surfaces 108, 110, and light may be similarly extracted through the major surfaces of other light guides described herein.

Light guides having such light extracting elements are typically formed by a process such as stamping, molding, embossing, extruding, laser etching, chemical etching, or another suitable process. Light extracting elements may also be produced by depositing elements of curable material on the light guide (e.g., light guide 102) and curing the deposited material using heat, UV-light or other radiation. The curable material can be deposited by a process such as printing, ink jet printing, screen printing, or another suitable process.

Exemplary light extracting elements include light-scattering elements, which are typically features of indistinct shape or surface texture, such as printed features, ink-jet printed features, selectively-deposited features, chemically etched features, laser etched features, and so forth. Other exemplary light extracting elements include features of well-defined shape, such as V-grooves, lenticular grooves, and features of well-defined shape that are small relative to the linear dimensions of the major surfaces (e.g., major surfaces 108, 110), which are referred to herein as micro-optical elements. The smaller of the length and width of a micro-optical element is less than one-tenth of the longer of the length and width (or circumference) of the light guide (e.g., light guide 102) and the larger of the length and width of the micro-optical element is less than one-half of the smaller of the length and width (or circumference) of the light guide. The length and width of the micro-optical element is measured in a plane parallel to the major surface (e.g., major surfaces 108, 110) of the light guide for planar light guides or along a surface contour for non-planar light guides (e.g., light guide 102).

The light extracting elements are configured to extract light in a defined intensity profile over one or both of the major surfaces (e.g., major surfaces 108 and 110) of the light guide (e.g., light guide 102), such as a uniform intensity profile, and/or a defined light ray angle distribution. In this disclosure, intensity profile refers to the variation of intensity with position within a light-emitting region (such as the major surface (e.g., major surface 108, 110) or a light output region of the major surface). Furthermore, the term light ray angle distribution is used to describe the variation of the intensity of light with ray angle (typically a solid angle) over a defined range of light ray angles. In an example in which the light is emitted from an edge-lit light guide, the light ray angles can range from −90° to +90° relative to the normal to the major surface (e.g., major surfaces 108, 110).

Micro-optical elements are shaped to predictably reflect or refract light. However, one or more of the surfaces of the micro-optical elements may be modified, such as roughened, to produce a secondary effect on light output. Exemplary micro-optical elements are described in U.S. Pat. No. 6,752,505 and, for the sake of brevity, are not described in detail in this disclosure.

With continued reference to FIGS. 1A-1E, in some embodiments, one or more optical adjusters (not shown) are located adjacent the major surface 108, 110 of the light guide 102. Each optical adjuster has an optical modifying characteristic that modifies a property (e.g., spectrum, polarization, light ray angle distribution, and/or intensity) of the light extracted through the major surface 108, 110 of the light guide 102. In other embodiments, an optical reflector (not shown) is located adjacent the inner major surface of the light guide and is highly reflective to reflect light extracted through the inner major surface 108 back through the light guide 102. Other light guides described herein may include optical adjusters located adjacent their major surfaces. A surface having a reflectivity of 80% or more with respect to visible light is highly reflective.

The light bulb 100 further includes a light source 120 positioned adjacent the light input edge 116 of the light guide 102. In this disclosure, the light source 120 is configured to edge light the light guide 102 such that light from the light source enters the light input edge and propagates along the light guide 102 by total internal reflection at the major surfaces 108, 110. The light source includes one or more solid-state light emitters 118. In one embodiment, the solid-state light emitters 118 constituting the light source 120 are arranged in a ring or another suitable pattern depending on the shape of the light input edge 116 of the light guide 102 to which the light source 120 supplies light. Other light bulbs described herein may include similarly configured light sources.

Exemplary solid-state light emitters 118 include such devices as LEDs, laser diodes, and organic LEDs (OLEDs). In an embodiment where the solid-state light emitters 118 are LEDs, the LEDs may be top-fire LEDs or side-fire LEDs, and may be broad spectrum LEDs (e.g., white light emitters) or LEDs that emit light of a desired color or spectrum (e.g., red light, green light, blue light, or ultraviolet light), or a mixture of broad-spectrum LEDs and LEDs that emit narrow-band light of a desired color. In one embodiment, the solid-state light emitters 118 emit light with no operably-effective intensity at wavelengths greater than 500 nanometers (nm) (i.e., the solid-state light emitters 118 emit light at wavelengths that are predominantly less than 500 nm). In some embodiments, the solid-state light emitters 118 constituting light source 120 all generate light having the same nominal spectrum. In other embodiments, at least some of the solid-state light emitters 118 constituting light source 120 generate light that differs in spectrum from the light generated by the remaining solid-state light emitters 118. For example, two different types of solid-state light emitters 118 are alternately located along the light source 120.

Although not specifically shown in detail, embodiments of the light source 120 also include structural components to retain the solid-state light emitters 118. In the example shown in FIG. 1E, the solid-state light emitters 118 are mounted to a printed circuit board (PCB) 122. The light source 120 may additionally include circuitry, power supply, electronics for controlling and driving the solid-state light emitters 118, and/or any other appropriate components. Other light bulbs described herein may include similar features.

The light source 120 generates heat that is thermally dissipated by one or more thermal features (e.g., heat sink, cooling fins, etc.) thermally coupled to the light source 120 (either directly or indirectly via another intermediate thermally-conductive component). This heat dissipation allows the light source 120 to operate within a temperature range at which the solid-state light emitters 118 generate light efficiently and reliably.

The light bulb 100 includes thermal features that provide for improved dissipation of the heat generated by the light source 120, regardless of the orientation of the light bulb 100. The thermal features allow the solid-state light emitters 118 to operate efficiently and reliably when the light bulb 100 is operated at different orientations. In one embodiment, the light bulb 100 has a light output of at least that of a 75-Watt conventional incandescent light bulb. In another embodiment, the light bulb 100 has a light output of at least that of a 100-Watt conventional incandescent light bulb. The thermal features provide heat dissipation while also allowing some embodiments of the light bulb 100 to conform to the size and shape of standard incandescent light bulbs. In one embodiment, the light bulb 100 conforms to the outer envelope of an A19 light bulb. The thermal features of the various embodiments of the light bulb 100 are discussed in detail below. Other light bulbs described herein may include similar thermal features.

With continued reference to FIGS. 1A-1E, the light bulb 100 additionally includes a housing 124 at the proximal end 112 of the light guide 102. The housing 124 retains the light source 120. In some embodiments, the housing 124 also retains the light guide 102. The housing 124 includes a base 126 configured to mechanically mount the light bulb 100 and receive electrical power. In the illustrated example, the base 126 is an Edison screw base. In other examples, the base is a bayonet base, a bi-pin base, or any other suitable configuration to mechanically mount the light bulb and receive electrical power. Other light bulbs described herein may be similarly configured.

The housing 124 is thermally coupled to the light source 120. In an example, such thermal coupling is provided by direct contact between the light source 120 and the housing 124. Such direct contact may be enhanced by the use of a suitable thermal compound. In another example, thermal coupling is provided by using a secondary device, such as a heat pipe, to convey heat produced by the light source 120 to the housing 124. In some embodiments, the housing 124 is shaped to provide an increased surface area available for cooling. Other light bulbs described herein may be similarly configured. In the embodiment shown in FIGS. 1A-1E, for example, the housing 124 includes radial buttresses 128 disposed parallel to the longitudinal axis 106. Air flow past the buttresses 128 provides some cooling. Vents 130 extend through the housing 124 and connect to the internal volume 104 of the light guide 102 to provide a path for air flow and convection cooling into at least part of the internal volume 104.

The light bulb 100 includes a heat sink 132 disposed in the internal volume 104 of the light guide 102 and thermally coupled to the light source 120. The thermal coupling can be direct, via the housing 124, or via another intermediate thermally-conductive element. Such thermal contact may be enhanced by the use of a suitable thermal compound. In the example shown, the heat sink 132 is configured as an open-ended hollow body and includes an inner portion 134 and an outer portion 136. The inner portion 134 may house one or more components of the light source 120. In one example, a light source driver (not shown) is housed within the inner portion 134. The outer portion 136 is separated from the inner portion 134 by an air gap 135 and is proximate the inner major surface 108 of the light guide 102. The outer surface 137 of the outer portion 136 of the heat sink 132 conforms to the inner major surface 108 of the light guide 102 and is separated from the inner major surface 108 of the light guide 102 by an air gap 139. In another example, the outer surface 137 of the outer portion 136 of the heat sink 132 is in contact with the inner major surface 108 of the light guide 102. In some embodiments, the outer surface 137 of the outer portion 136 of the heat sink 130 is highly reflective, and light extracted from the light guide 102 through the inner major surface 108 is reflected by the outer portion 136, re-enters the light guide 102 at the inner major surface 108, and is output from the light guide 102 through the outer major surface 110.

Although not specifically shown, in some embodiments, the heat sink 132 includes one or more surface area increasing features. In an example, radial fins (not shown) parallel to the longitudinal axis 106 extend radially inward from the outer portion 136 of the heat sink 132. In another example, radial fins (not shown) parallel to the longitudinal axis 106 extend radially outward from the inner portion 134 of the heat sink 132. In yet another example, radial fins (not shown) parallel to the longitudinal axis 106 join the inner portion 134 and the outer portion 136 of the heat sink 132. The number and thickness of the fins are chosen such that there is sufficient space between the fins to provide a path for air flow and convective cooling through the vents 130 in the housing 124 and the air gap 135 between the inner portion 134 and the outer portion 136 of the heat sink 132. Other light bulbs described herein may be similarly configured.

Figure 1F:
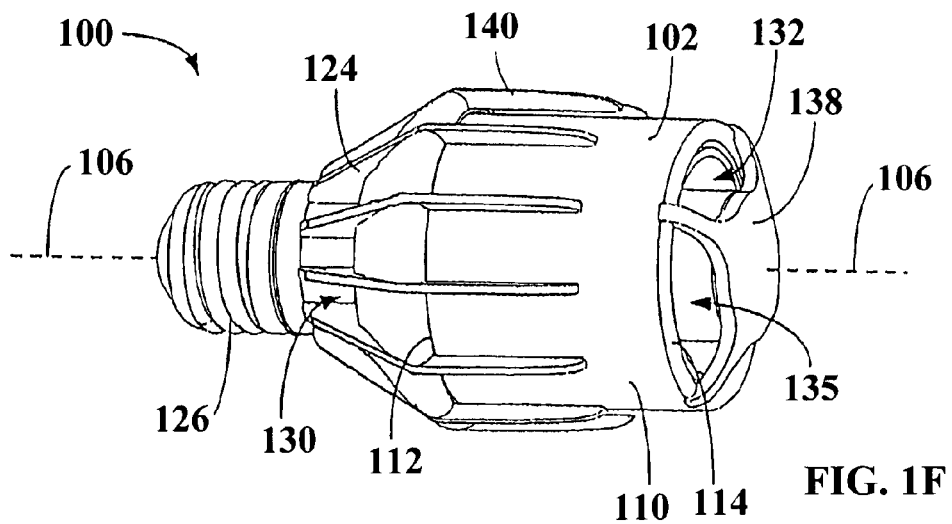
FIG. 1F is a perspective view of the light bulb shown in FIG. 1A oriented with its longitudinal axis horizontal.

The vents 130 through the housing 124 establish an airflow pathway into at least part of the internal volume 104 of the light guide 102 through which air flows by convection due to heating by the light source 120. When the light bulb 100 is oriented with its longitudinal axis 106 vertical (e.g., as shown in FIGS. 1A-1C), the cooling air flow is an axial flow through the vents 130 and past the heat sink 132 disposed in the internal volume 104. In the example shown, the flow of cooling air past the heat sink 132 is through the air gap 135. Cool air enters the light bulb 100 through vents 130 in the housing 124 and warm air exits the light bulb 100 through the open, distal end 114 of the light guide 102. This air flow reverses when the light bulb 100 is inverted relative to the orientation shown in FIGS. 1A-1C such that cool air enters through the open, distal end 114 of the light guide 102 and exits the light bulb 100 through the vents 130. This air flow, however, is reduced when the light bulb 100 is oriented with its longitudinal axis 106 horizontal (e.g., as shown in FIG. 1F).

The light bulb 100 additionally includes an end cap 138 at the distal end 114 of the light guide 102 partially covering the distal end 114. The end cap 138 is mechanically coupled to the heat sink 132 (e.g., via a mechanical fastener (not shown) or adhesive (not shown)), or is integral with the heat sink 132 or part of the heat sink 132 (e.g., the inner portion 134 or the outer portion 136 of the heat sink 132). In the illustrated example, the end cap 138 is also mechanically coupled to the distal end 114 of the light guide 102 and retains the light guide 102 in position relative to the housing 124. The end cap 138 is thermally coupled to the light source 120 via the heat sink 132.

The light bulb 100 additionally includes fins that extend from the housing 124 adjacent the outer major surface 110 of the light guide 102 and that are thermally coupled to the light source 120 via the housing 124. An exemplary fin is shown at 140, and reference numeral 140 will additionally be used to refer to the fins collectively and individually. As shown in FIGS. 1A-1F, in a plane orthogonal to the longitudinal axis 106, each fin 140 has a rectangular cross sectional shape having its longer dimension radially oriented. In other examples, each fin has an oval cross sectional shape having its longer dimension radially oriented, a polygonal cross-sectional shape, or a circular cross-sectional shape. In some examples, the dimension of each fin in a direction tangential to the outer major surface of the light guide increases with increasing distance from the light guide. Each fin 140 is separated from the outer major surface 110 of the light guide 102 by an air gap 142 to allow air flow between the fin 140 and the outer major surface 110 of the light guide 102. In some examples, the size of the air gap 142 between a respective fin 140 and the outer major surface 110 of the light guide ranges from about 1 mm to about 2 mm. In the illustrated embodiment, fins 140 extend from housing 124 parallel to the longitudinal axis 106 along at least one-half of the length of light guide 102. In other embodiments, the fins extend from housing parallel to longitudinal axis 106 along at least one-quarter of the length of light guide or along the entire length of the light guide. The fins 140 are shown as having a uniform length. However, in other embodiments, the fins differ in length and/or cross-sectional size from one another.

Figure 1G:
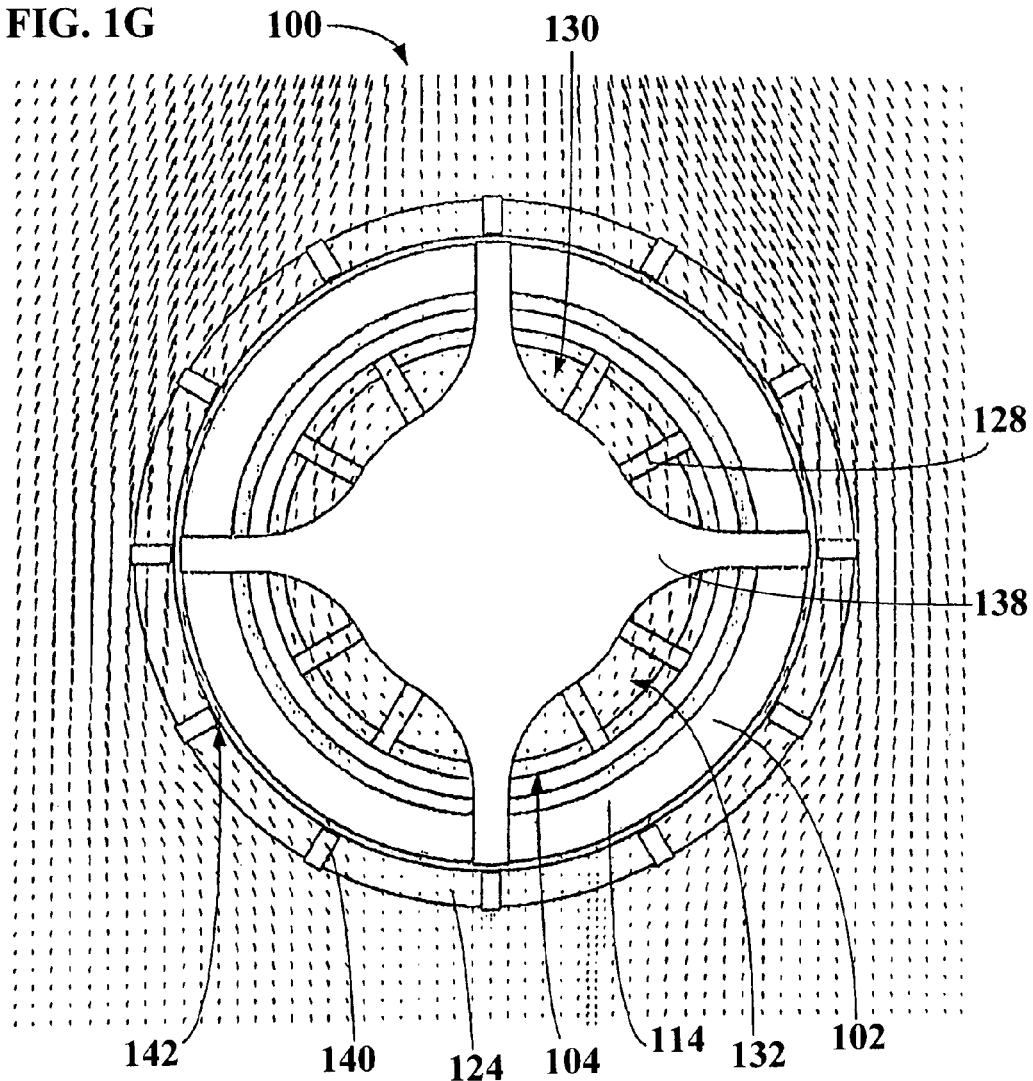
FIG. 1G is a schematic drawing showing the velocity vectors of computed air flow around and within the light bulb shown in FIG. 1A oriented with its longitudinal axis horizontal and viewed from the distal end of the light guide.

The air gaps 142 separating the fins 140 and the outer major surface 110 of the light guide 102 provide an air flow pathway through which air flows by convection due to heating by the light source 120. For example, when the light bulb 100 is oriented with its longitudinal axis 106 horizontal (e.g., as shown in FIG. 1F), the cooling air flow has a vertical vector component, as shown in FIG. 1G. The cooling air flows around the outer major surface 110 of the light guide 102 and around the fins 140, including through the air gaps 142 between the fins 140 and the outer major surface 110 of the light guide 102. Cool air is heated by heat from the fins 140, and the resulting warm air rises in a direction away from the light bulb 100, drawing in additional cool air. FIG. 1G further shows that, with the longitudinal axis 106 of the light bulb 100 oriented horizontally, the air gaps 142 provide a path for the part of the cooling air flow that flows along the outer major surface 110 of the light guide 102, which increases cooling air flow and enhances heat dissipation. The air flow through the air gaps 142, however, is reduced when the light bulb 100 is oriented with its longitudinal axis 106 vertical (e.g., as shown in FIGS. 1A-1C), but the heat sink 132 provides adequate heat dissipation in this orientation. Other light bulbs with fins described herein may be similarly configured.

Hence, the light bulb 100 includes thermal features that dissipate heat generated by the light source 120 regardless of the orientation of the light bulb 100. For example, when the light bulb 100 is oriented with its longitudinal axis 106 vertical, heat dissipation is primarily provided by the air flow through the vents 130 and past the heat sink 132 disposed in the internal volume 104 of the light guide. When the light bulb 100 is oriented with its longitudinal axis 106 horizontal, heat dissipation is primarily provided by the air flow around the fins 140, including through the air gaps 142 between the fins 140 and the outer major surface 110 of the light guide 102. When the light bulb 100 is oriented with its longitudinal axis 106 between the vertical and horizontal, heat dissipation is provided by both the internal air flow through the vents 130 and past the heat sink 132 disposed in the internal volume 104 of the light guide 102, and by the external air flow past the fins 140, including air flow through the air gaps 142 between the fins 140 and the outer major surface 110 of the light guide 102. Cooling is apportioned between the internal cooling air flow and the external cooling air flow depending on the specific orientation of the light bulb 100. Other light bulbs described herein may be similarly configured.

In some embodiments, a portion of the light emitted from the outer major surface 110 of the light guide 102 is incident on the fins 140, and is absorbed by the fins 140 or is scattered or reflected back into the light guide 102 by the fins 140. In other embodiments, one or more features of the light bulb minimize the amount of output light that is incident on the fins 140. Other light bulbs described herein may be similarly configured.

FIGS. 2A, 2B, 3A, and 3B show exemplary embodiments of the light bulb 200, 300 each respectively having a light guide 202, 302 that is similar to the light guide 102 shown in FIGS. 1A-1G. But each of the light guides 202, 302 additionally includes one or more light emitting regions 111, 311 at the outer major surface 210, 310 of the light guide 202, 302 through which light is predominantly output. The one or more light emitting regions 111, 311 are arranged relative to one or more non-light emitting regions 113, 313 of the outer major surface 210, 310 of the light guide 202, 302, and light output through the one or more light emitting regions 111, 311 is output at a higher intensity than light emitted from the non-light emitting regions 113, 313. The regions 113, 313 are referred to herein as non-light emitting regions, although in some embodiments light may be emitted from the regions 113, 313 with a lower light intensity than the light emitted from the light emitting regions 111, 311.

Figure 2A:
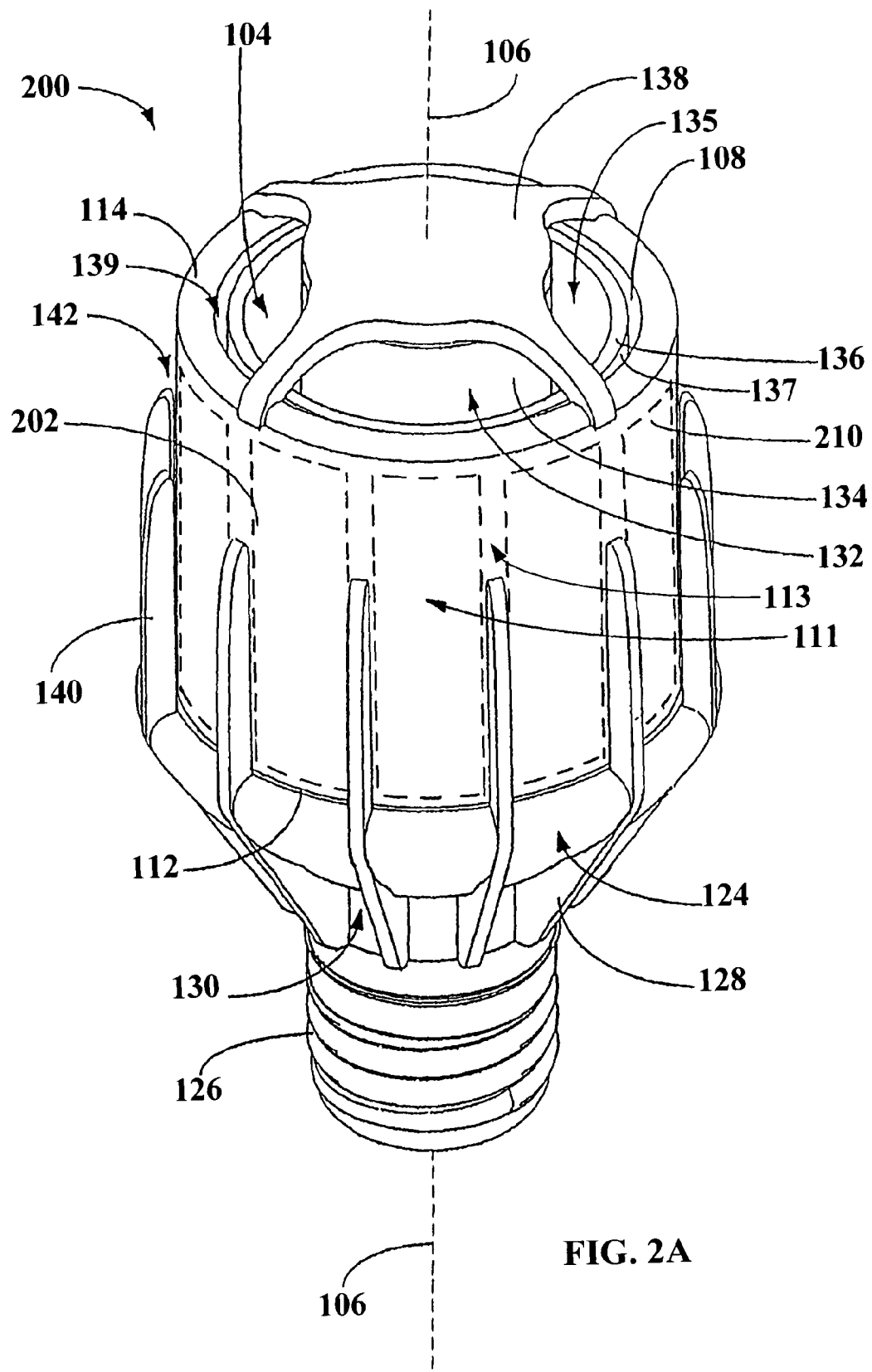
FIG. 2A is a perspective view of another exemplary light bulb oriented with its longitudinal axis vertical.
Figure 2B:
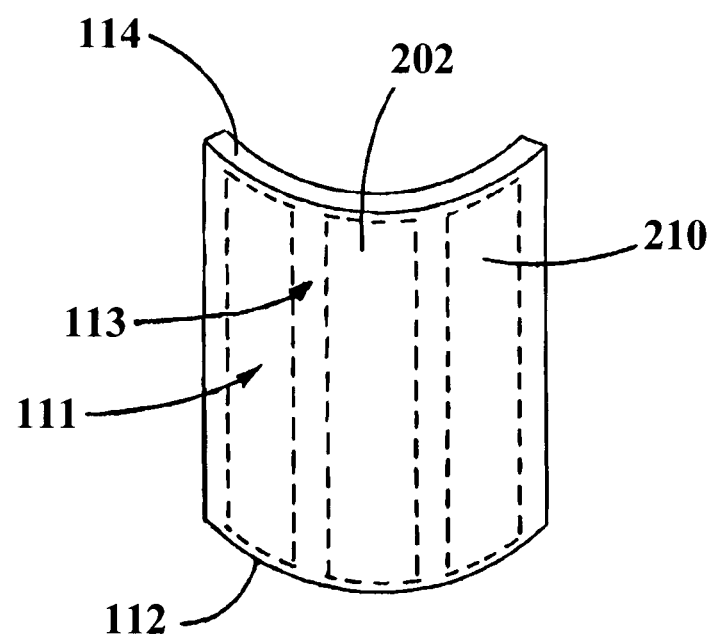
FIG. 2B is a perspective view showing part of the light bulb shown in FIG. 2A.
Figure 3A:
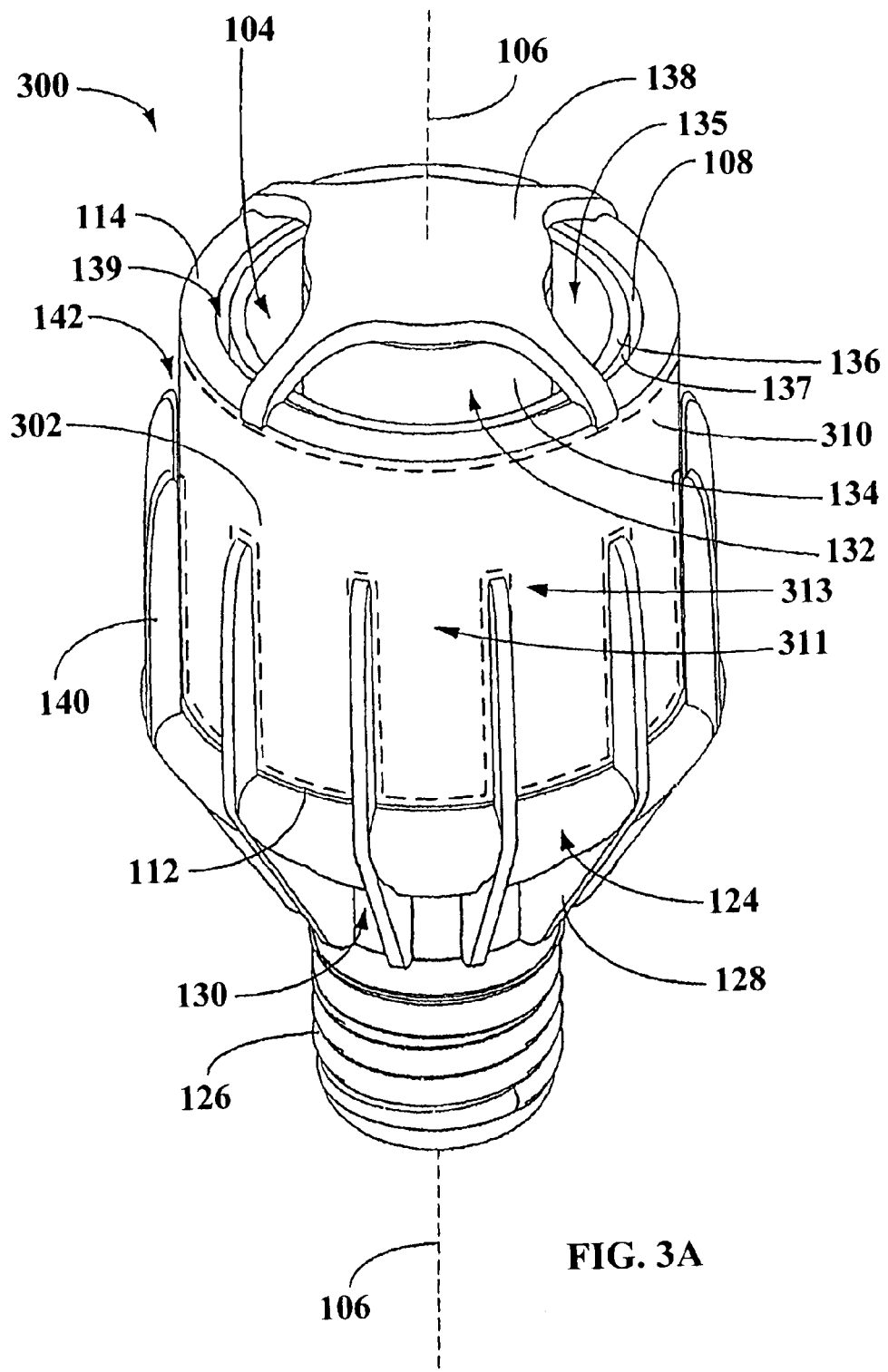
FIG. 3A is a perspective view of another exemplary light bulb oriented with its longitudinal axis vertical.
Figure 3B:
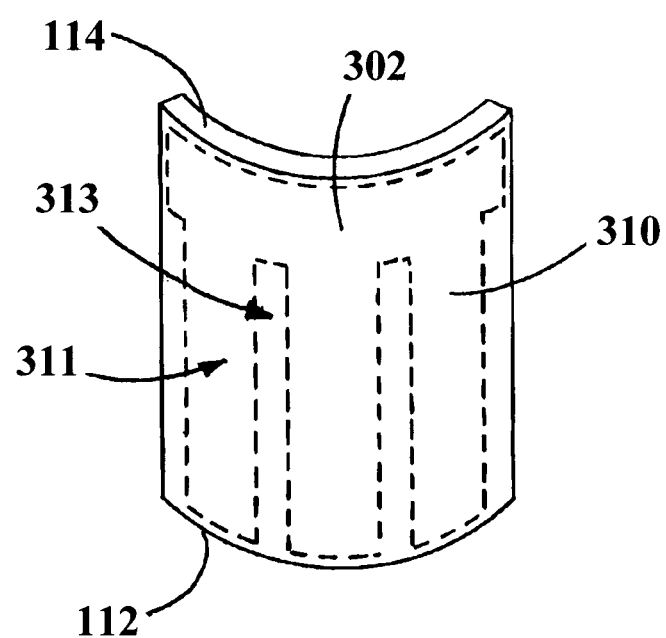
FIG. 3B is a perspective view showing part of the light bulb shown in FIG. 3A.

In the example shown in FIGS. 2A and 2B, the light bulb 200 includes separate light emitting regions 111 interleaved with the non-light emitting regions 113. The fins 140 are adjacent the non-light emitting regions 113, and are circumferentially offset from the light emitting regions 111. In the example shown in FIGS. 3A and 3B, the light bulb 300 includes a single continuous light emitting region 311. The light emitting region 311 is contoured proximate the proximal end 112 of the light guide 302 and surrounds the separate non-light emitting regions 313. The fins 140 are adjacent the non-light emitting regions 313, and are circumferentially offset from the light emitting region 311.

In some embodiments, the light is predominantly extracted from the light guide 202, 302 through the one or more light emitting regions 111, 311 by light extracting elements arranged relative to the one or more light emitting regions 111, 311. In one example, the light extracting elements are located within the one or more light emitting regions 111, 311 of the outer major surface 210, 310 of the light guide 202, 302. Locating the light extracting elements within the one or more light emitting regions 111, 311 causes light to be predominantly extracted from the light guide 202, 302 through the light emitting regions 111, 311. Regions of the light guide 202, 302 corresponding to non-light emitting regions 113, 313 contain no light extracting elements, a lower density of light extracting elements, or light extracting elements having a substantially lower light extracting power than the light extracting elements located within the one or more light emitting regions 111, 311. In another example, the light extracting elements are located within one or more light extracting regions (not shown) at the inner major surface 108 of the light guide and are configured to reflect light toward the one or more light emitting regions 111, 311 of the outer major surface 210, 310 through which the light is output from the light guide 202, 302.

In other embodiments, the light ray angle distribution of the light output by each of the LEDs constituting the light source is narrowed circumferentially as the light enters the light guide. FIGS. 4A and 4B, 5A and 5B, and 6A and 6B show examples of parts of the light bulb 400, 500, 600, respectively, that include a concentrating feature associated with each of the LEDs. The concentrating feature circumferentially narrows the light ray angle distribution of the light output from the respective LED. The LEDs and their associated concentrating features are circumferentially aligned with the one or more light emitting regions 111, 311 (FIGS. 2A, 2B, 3A, and 3B) and are circumferentially offset from the fins 140 such that most of the light input to the light guide with the circumferentially narrowed light ray angle distribution is incident on the light extracting elements located within regions of the light guide not occluded by the fins. As a result, the light is extracted from the light guide through the one or more light emitting regions at a higher intensity than the light emitted from the non-light emitting regions. This effect is achieved regardless of whether the light extracting elements are arranged relative to the one or more light emitting regions, or are arranged relative to the entire major surface of the light guide. Accordingly, such embodiments can include either arrangement of light extracting elements.

Figure 4A:
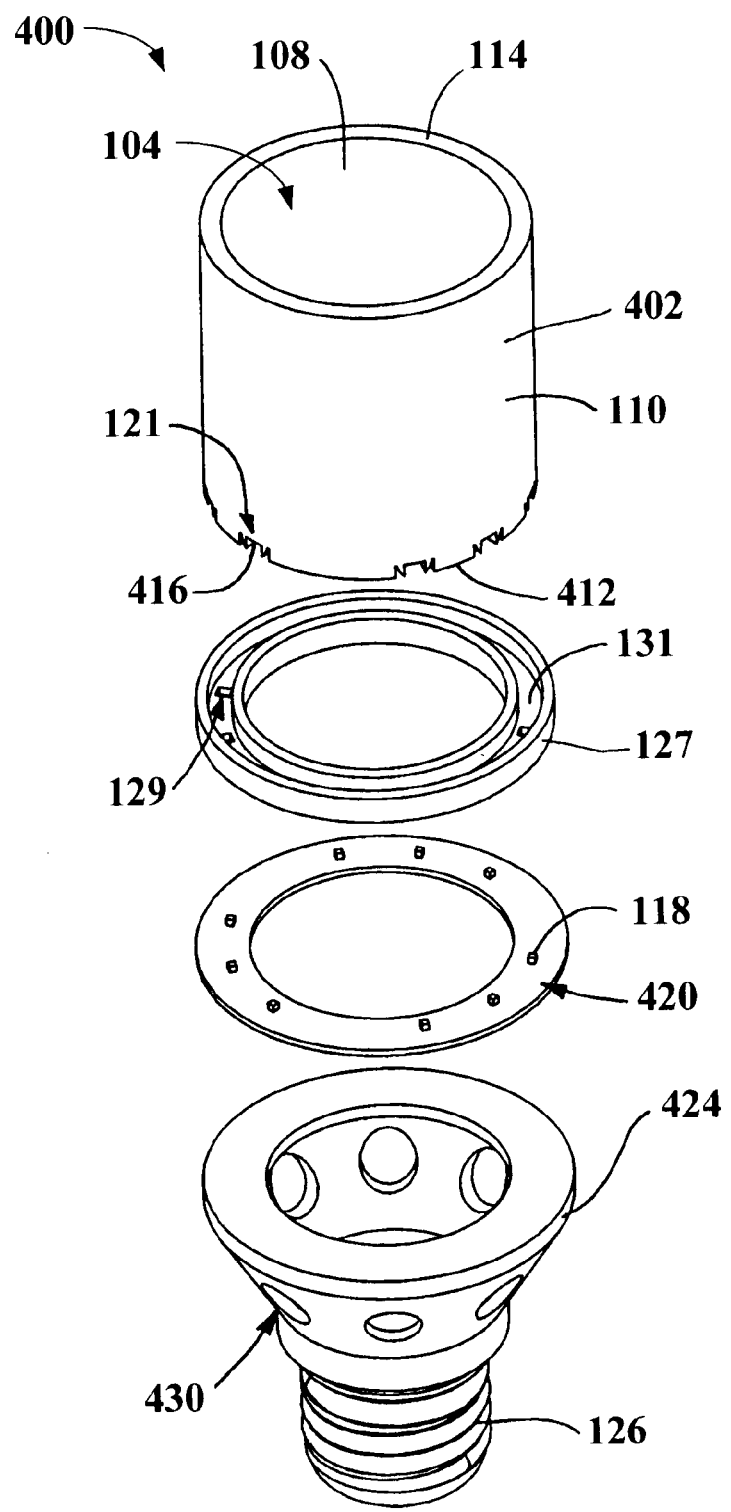
FIG. 4A is an exploded perspective view of another exemplary light bulb.
Figure 4B:
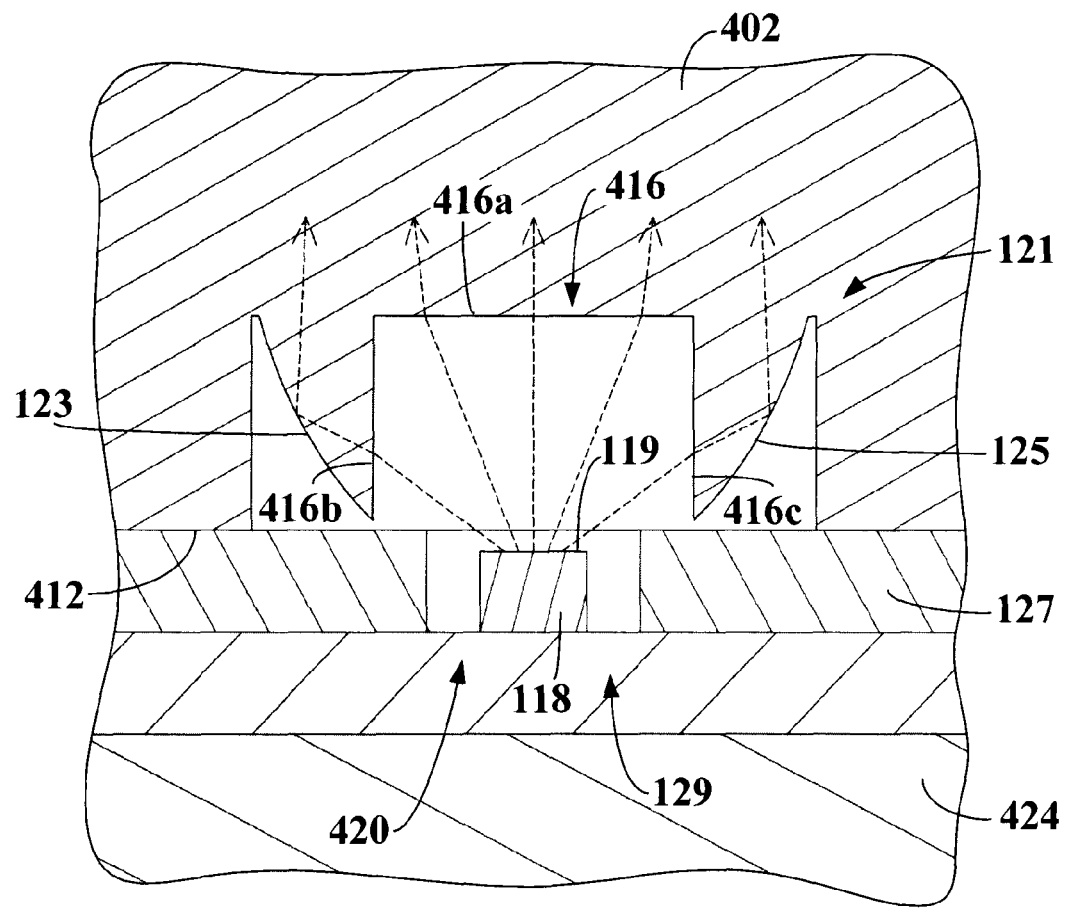
FIG. 4B is a cross-sectional view showing part of the light bulb shown in FIG. 4A.

In the example shown in FIGS. 4A and 4B, light bulb 400 includes a light guide 402 that is similar to the light guide 102 shown in FIGS. 1A-1G, but additionally including concentrating features 121 at the proximal end 412 thereof. With additional reference to FIGS. 2A and 3A, one or more of the concentrating features 121 are located between adjacent ones of the fins 140. Each concentrating feature 121 includes a light input edge 416 having a first, circumferential, light input portion 416a and second and third, axial, light input portions 416b, 416c that extend non-parallel to the first light input portion 416a. Concentrator surfaces 123, 125 are adjacent the second light input portion 416b and the third light input portion 416c, respectively. The concentrator surface 123 is configured to reflect the light input to the light guide 402 through the light input portion 416b and incident thereon in a direction having a greater axial component than the direction in which the light is input to the light guide 402. The concentrator surface 125 is configured to reflect the light input to the light guide 402 through the light input portion 416c and incident thereon in a direction having a greater axial component than the direction in which the light is input to the light guide 402. In some embodiments, each concentrator surface 123, 125 includes a highly reflective material or coating. The light source 420 is adjacent the light input edge 416 and arranged such that a first, on-axis portion of the light emitted by the light source 120 is input to the light guide 402 through the first light input portion 416a, and second and third, off-axis portions of the light emitted by the light source 120 are respectively input to the light guide 402 through the second and third input portions 416b, 416c. The direction of the first portion of the light emitted by the light source 420 has a greater axial component than those of the second and third portions. In the example shown, light input portions 416a, 416b, and 416c are planar. In other examples (not shown), the light input portions are non-planar, for example, convex.

In the examples shown in FIGS. 5A, 5B, 6A, and 6B, the light guide 102 has a plane light input edge 116.

The examples of the light bulb 400, 500, 600 shown in FIGS. 4A and 4B, 5A and 5B, and 6A and 6B include a light guide retaining member 127, 527, 627, respectively, that retains the light input edge 416, 116 relative to the light source 420, 520, 620. In the illustrated embodiments, the light guide retaining member 127, 527, 627 is a separate component from the housing 424. The housing 424 is similar to the housing 124 shown in FIGS. 1A-1G, but the housing 424 includes vents 430 embodied as orifices extending through the housing 424 to provide a path for air flow and convection cooling into at least part of the internal volume 104.

The light guide retaining member 127, 527, 627 includes a recess 131 configured to receive the proximal end 412, 112 of the light guide 402, 102. In the examples shown, the recess 131 is configured as a groove. The light guide retaining member 127, 527, 627 also includes one or more through-holes 129, 529, 629 extending through the light guide retaining member 127, 527, 627 in the axial direction in which the solid state light emitters 118 of the light source 420, 520, 620 are respectively disposed. One or more surfaces of the light guide retaining member 127, 527, 627 (e.g., the surfaces bounding the recess 131 and/or the one or more through-holes 129, 529, 629) are highly reflective to redirect light incident thereon into the light guide 402, 102. In some embodiments, the light guide retaining member 127, 527, 627 also defines the spacing between the light emitting surface 119 of the solid state light emitter 118 and the light input edge 416, 116 of the light guide 402, 502, 602.

Figure 5A:
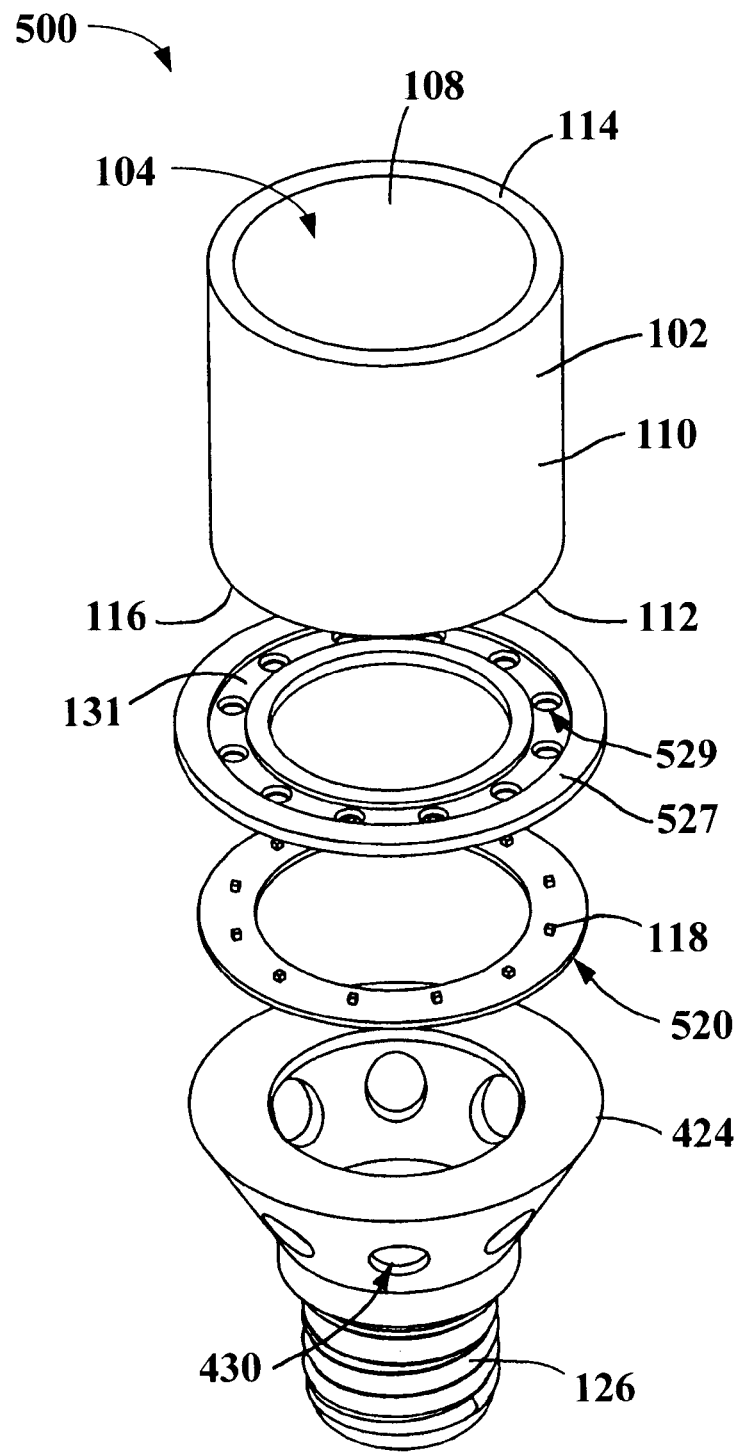
FIG. 5A is an exploded perspective view of another exemplary light bulb.
Figure 5B:
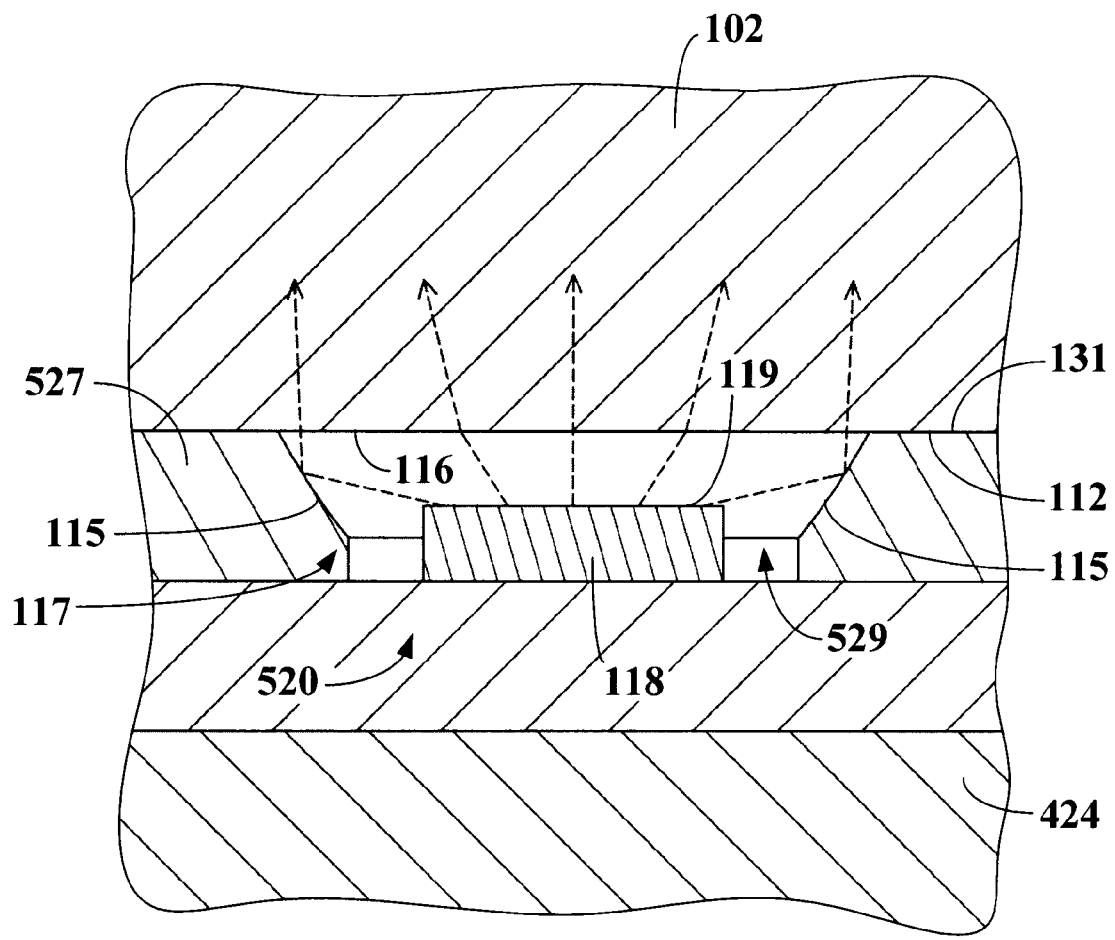
FIG. 5B is a cross-sectional view showing part of the light bulb shown in FIG. 5A.
Figure 6A:
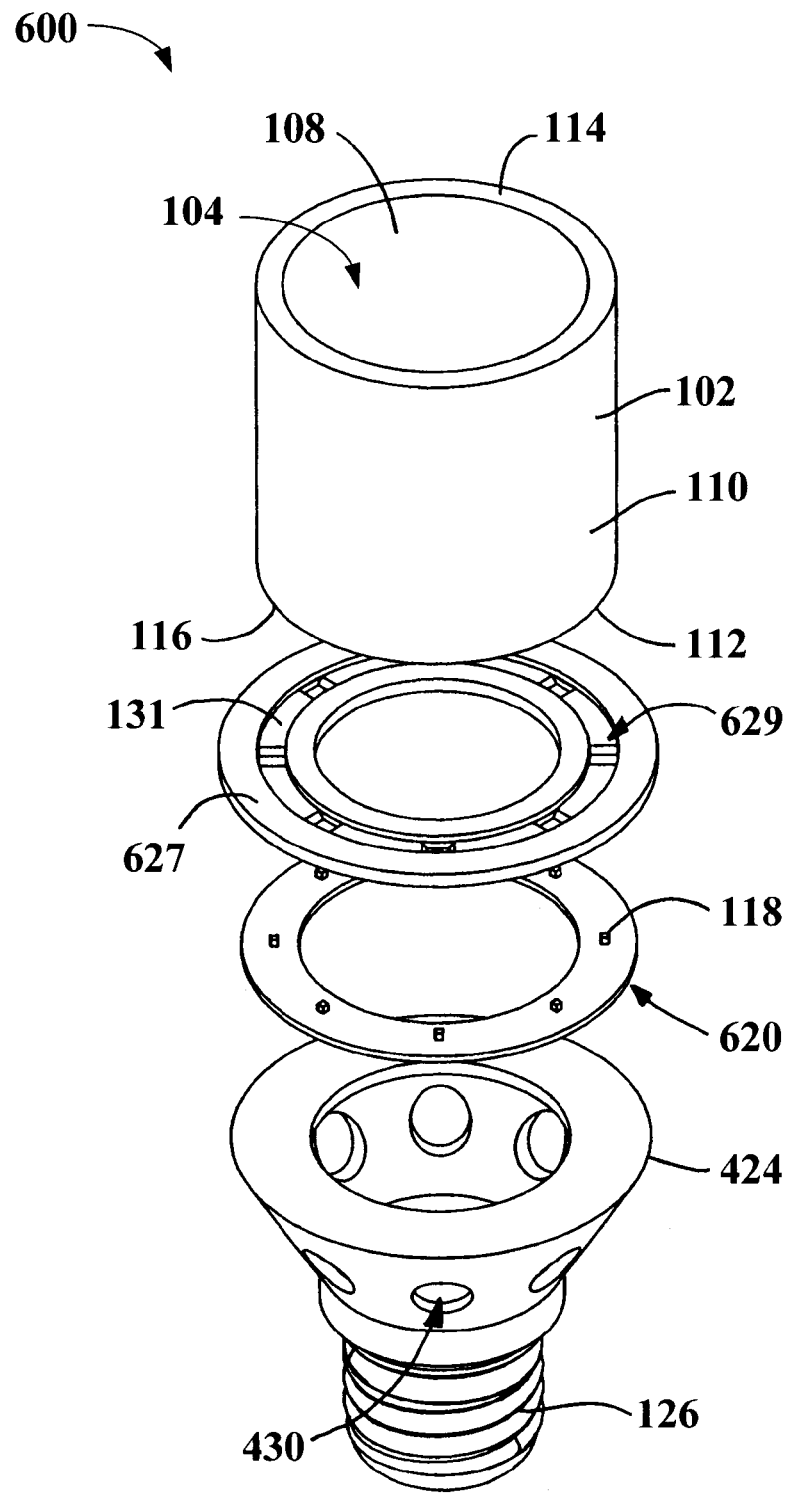
FIG. 6A is an exploded perspective view of another exemplary light bulb.
Figure 6B:
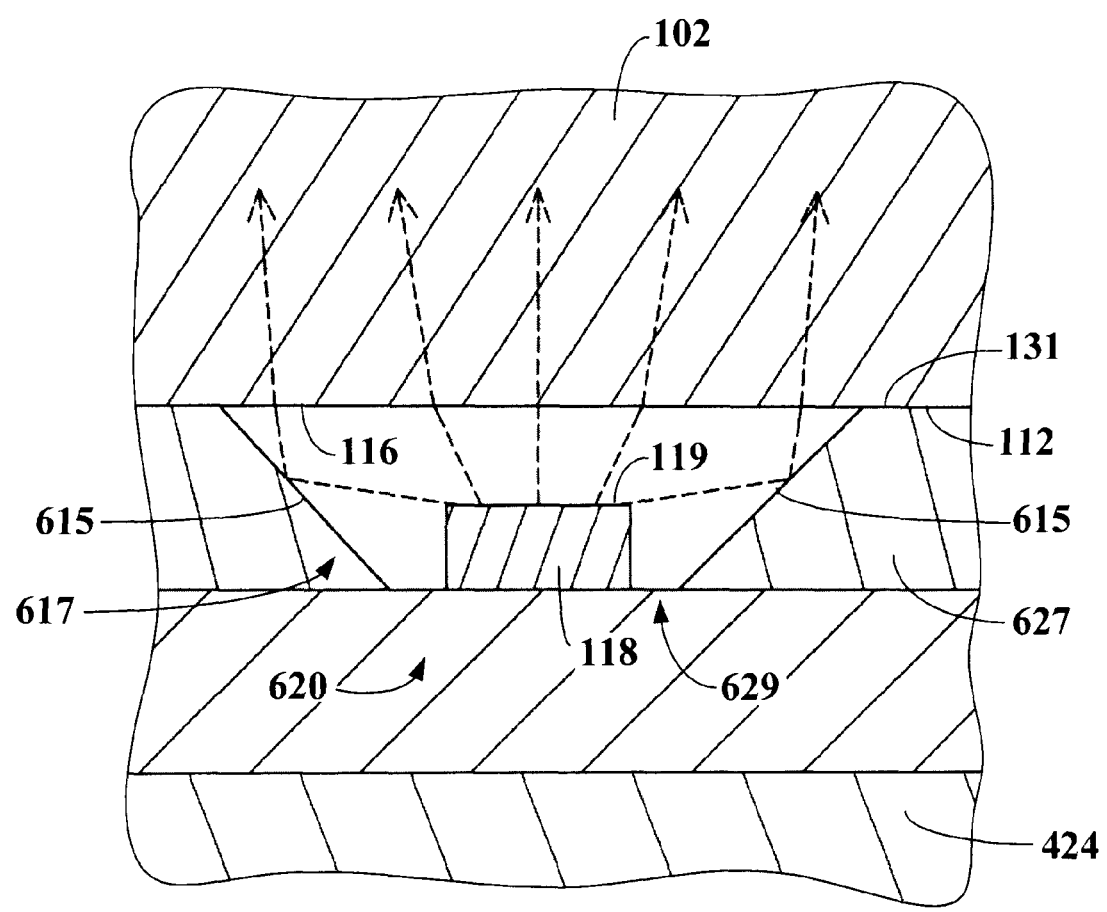
FIG. 6B is a cross-sectional view showing part of the light bulb shown in FIG. 6A.

In the example shown in FIGS. 5A and 5B, the through-holes 529 of the light guide retaining member 527 are configured as concentrating features 117. Each through-hole 529 includes a concentrator surface 115 configured to reflect the light emitted from the light source 520 and incident thereon in a direction having a greater axial component than the direction in which the light is emitted from the light source 520. In some embodiments, the concentrator surface 115 includes a highly reflective material or coating. In the example shown in FIGS. 5A and 5B, the through-holes 529 extending through light guide retaining member are circular in shape. FIGS. 6A and 6B show another exemplary embodiment in which the through-holes 629 are configured as rectangular-shaped concentrating features 617. Each through-hole 629 includes a concentrator surface 615 configured to reflect the light emitted from the light source 620 and incident thereon in a direction having a greater axial component than the direction in which the light is emitted from the light source 620. In some embodiments, the concentrator surface 615 includes a highly reflective material or coating. In other embodiments, the through-holes are any suitable shape (e.g., triangular, pentagonal, hexagonal, octagonal, etc.).

In some embodiments, the light bulb includes other thermal features that improve the dissipation of heat generated by the light source 120. For example, FIGS. 7 and 8 show embodiments of the light bulb 700, 800 having other thermal features that dissipate heat when the light bulb 700, 800 is oriented with its longitudinal axis 106 horizontal.

Figure 7:
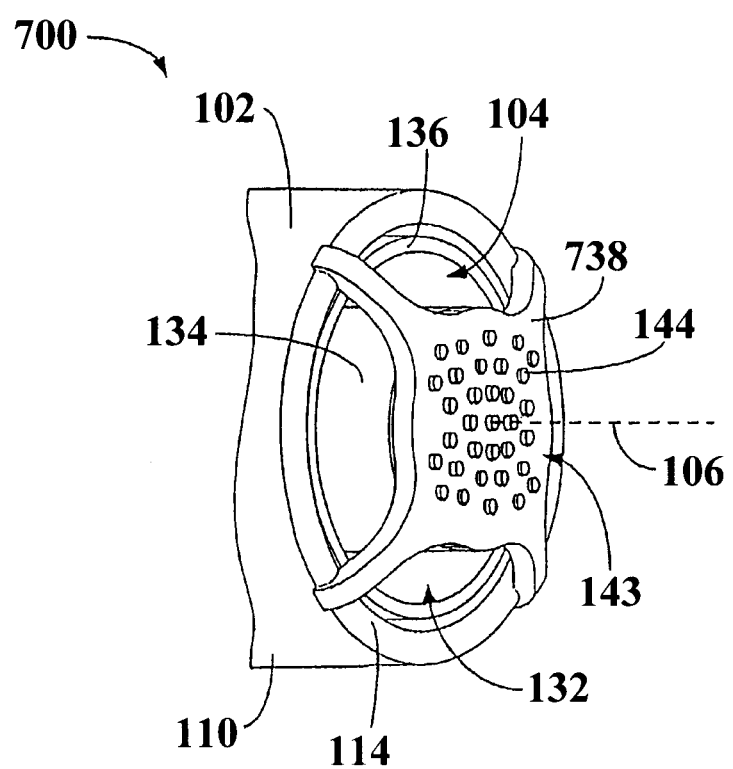
FIG. 7 is a perspective view showing part of another exemplary light bulb.

With reference to FIG. 7, the light bulb 700 includes an end cap 738 that is similar to the end cap 138 shown in FIGS. 1A-1G, but the end cap 738 additionally includes a dissipation increasing feature 143. The dissipation increasing feature 143 is configured to increase heat dissipation by end cap 738. In the example shown, the dissipation increasing feature 143 includes surface area increasing features, an exemplary one of which is shown at 144. Reference numeral 144 is also used to refer to the surface area increasing features collectively and individually. Surface area increasing features 144 are shaped to provide an increased surface area available for cooling. The surface area increasing features 144 are shown as protrusions that extend from the end cap 738 parallel to the longitudinal axis 106. In other embodiments, the surface area increasing features 144 include fins or another suitable shape. In other examples, dissipation increasing feature 143 includes a high-emissivity coating (not shown) or a surface treatment (not shown) applied to the end cap 738 to increase heat dissipation by the end cap. Roughening the surface of the end cap or converting the surface of the end cap to a highly-structured, high surface area configuration such as a metal foam are examples of a surface treatment.

Figure 8:
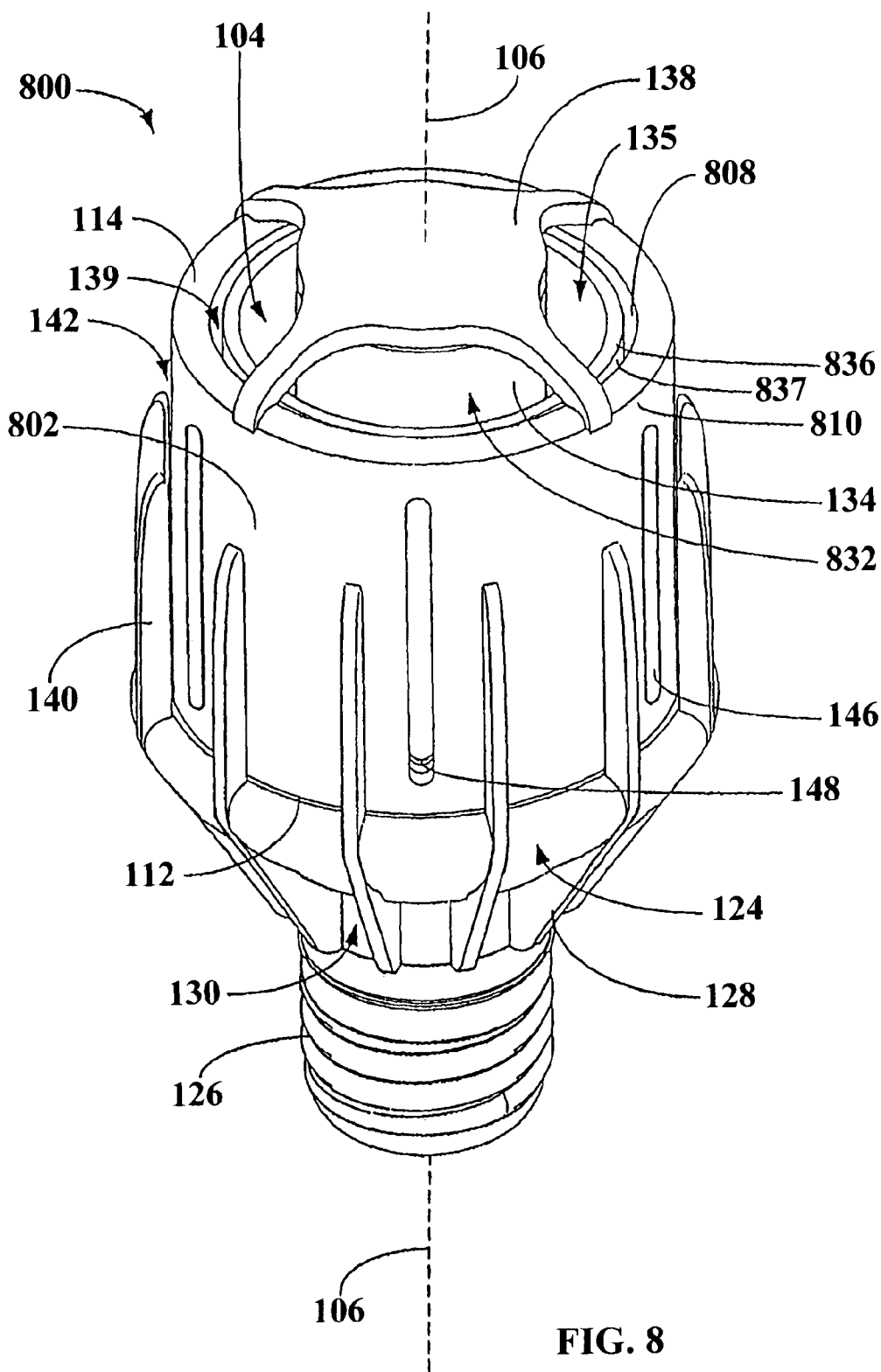
FIG. 8 is a perspective view of another exemplary light bulb oriented with its longitudinal axis vertical.

With reference to FIG. 8, the light bulb 800 includes a light guide 802 that is similar to the light guide 102 shown in FIGS. 1A-1G, but additionally includes elongate, axial through-slots 146 at the major surfaces 808, 810 of the light guide 802 that extend radially through the light guide 802. In the example shown, the light bulb 800 also includes an axial heat sink 832 that is similar to the axial heat sink 132 shown in FIGS. 1A-1G, but the outer portion 836 of the heat sink 832 additionally includes axial through-slots 148 at the outer surface 837 that extend radially through the heat sink 832 to allow air to flow into and/or out of the internal volume 104 of the light guide 802. In the illustrated embodiment, the light guide 802 is a single element and the through-slots 146 are formed in the light guide 802, for example, by a suitable machining process or by defining the through-slots in the mold used to mold the light guide 802. In other embodiments, the light guide 802 includes light guide segments (e.g., circumferential segments), and respective ends of the light guide segments are separated by a distance that defines through-slots 146 through which air may flow. Additionally or alternatively, through-slots are respectively formed in the light guide segments. In the example shown, through-slots 148 extend radially through the outer portion 836 of the heat sink 832 to allow air flow through the outer portion 836 of the heat sink 832 into the air gap 135 between the inner portion 134 and the outer portion 836 of the heat sink 832. In examples with a simpler heat sink, through-slots 148 may not be needed. The through-slots 146, 148 are arranged such that each through-slot 146 in the light guide 802 is aligned with a respective through-slot 148 in the heat sink 832. When the light bulb 800 is oriented with the longitudinal axis 106 horizontal, the through-slots 146, 148 allow cooling air to flow through the internal volume 104 of the light guide 802, the air flow direction having a vertical vector component. In some embodiments, the air flow through the internal volume 104 provides sufficient cooling to allow fins 140 to be reduced in length, reduced in circumferential dimension, reduced in number, or eliminated.

Referring now to FIGS. 9A-9H, another exemplary embodiment of a light bulb is shown at 900.

Figure 9A:
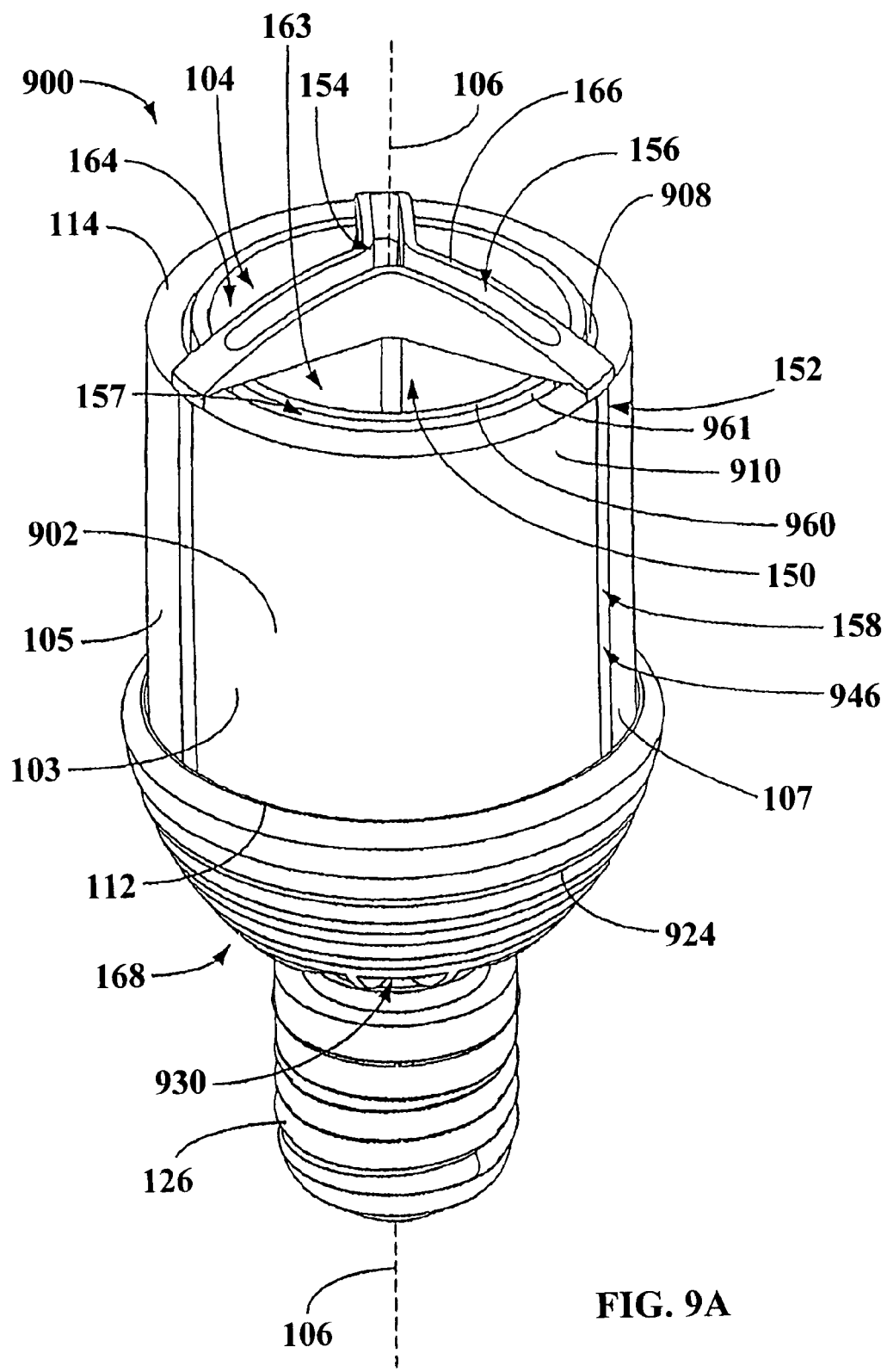
FIG. 9A is a perspective view of another exemplary light bulb oriented with its longitudinal axis vertical.
Figure 9B:
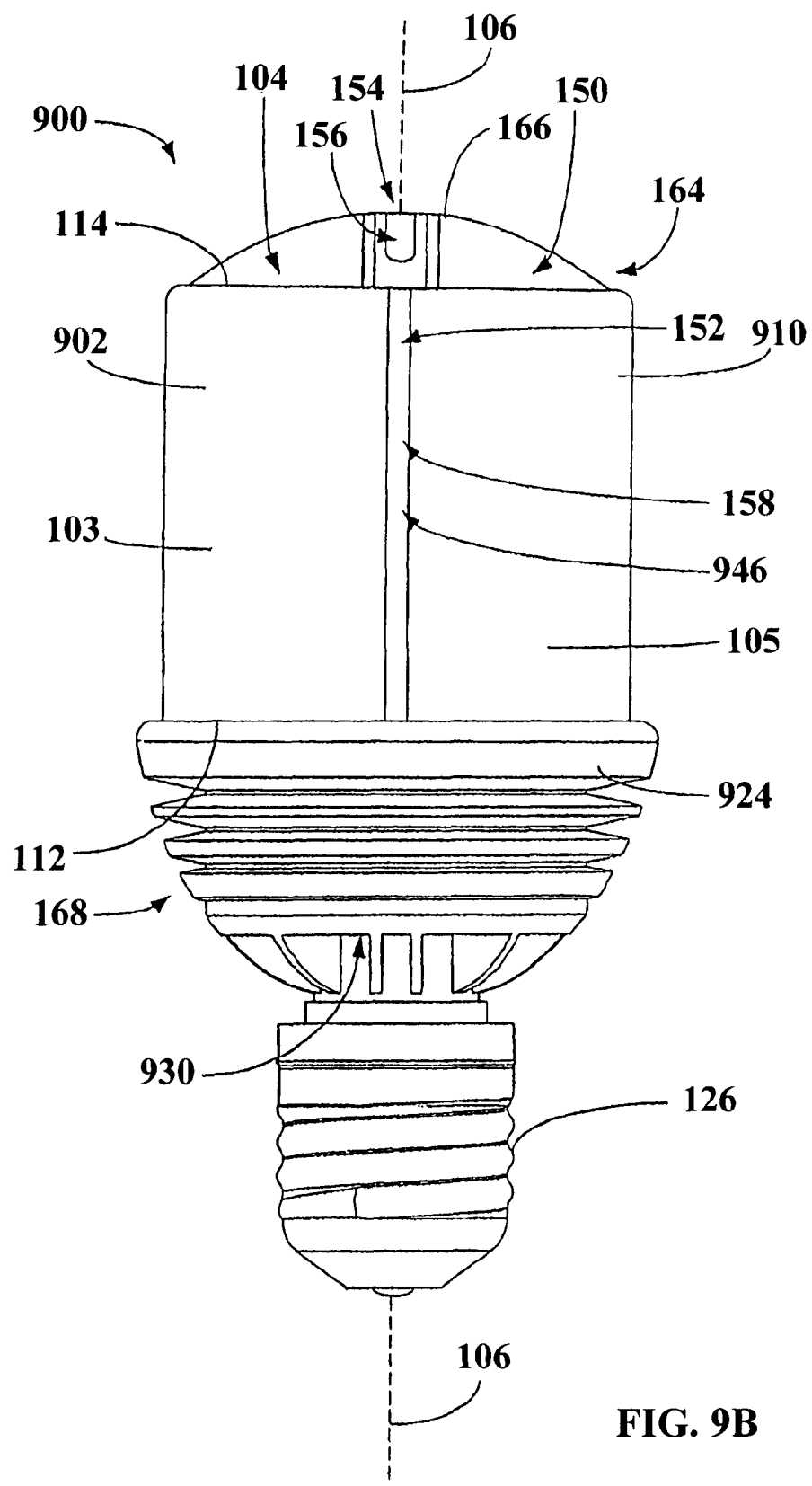
FIG. 9B is a side view of the light bulb shown in FIG. 9A oriented with its longitudinal axis vertical.
Figure 9C:
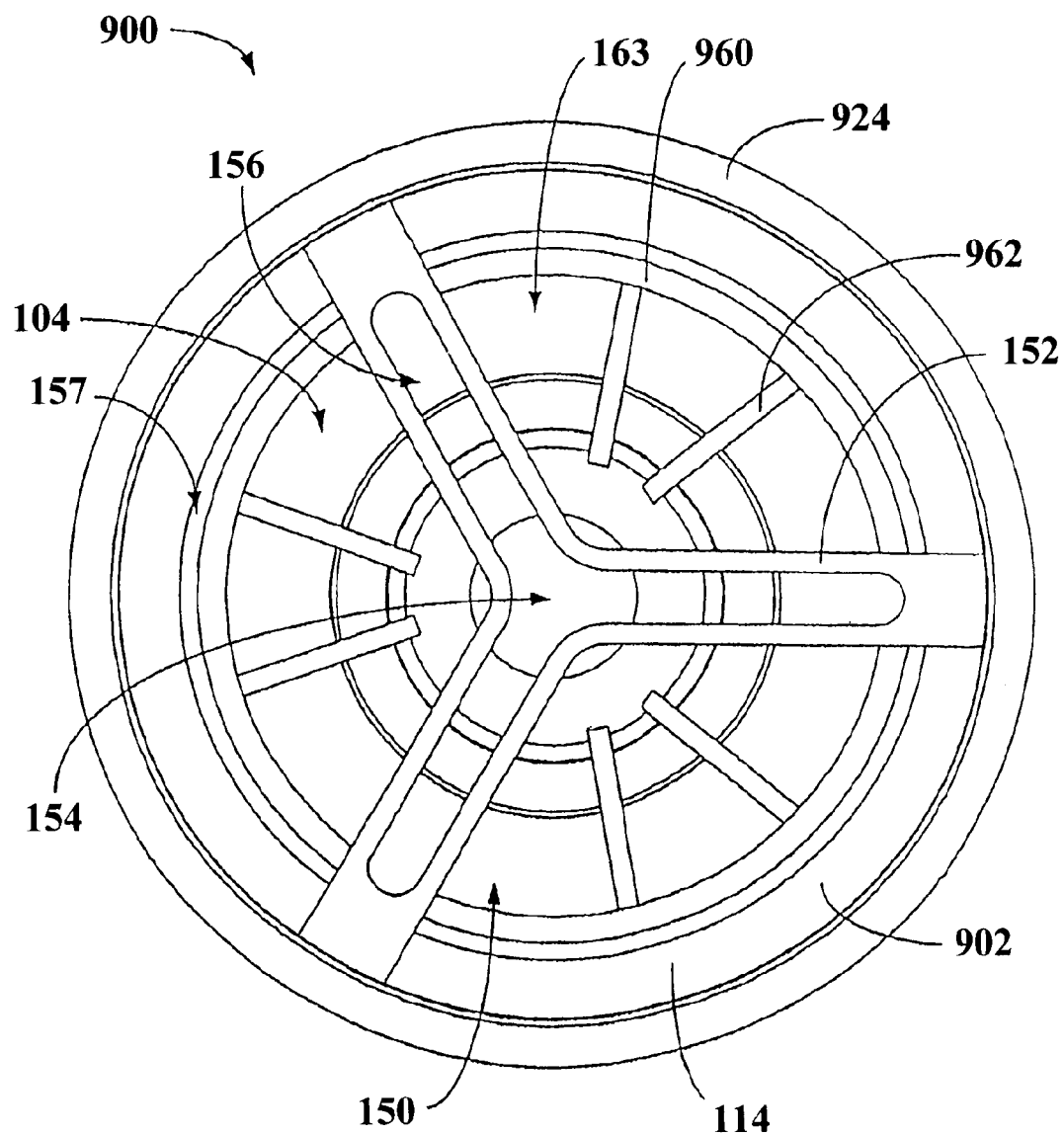
FIG. 9C is a top view of the light bulb shown in FIG. 9A viewed from the distal end of the light guide.
Figure 9D:
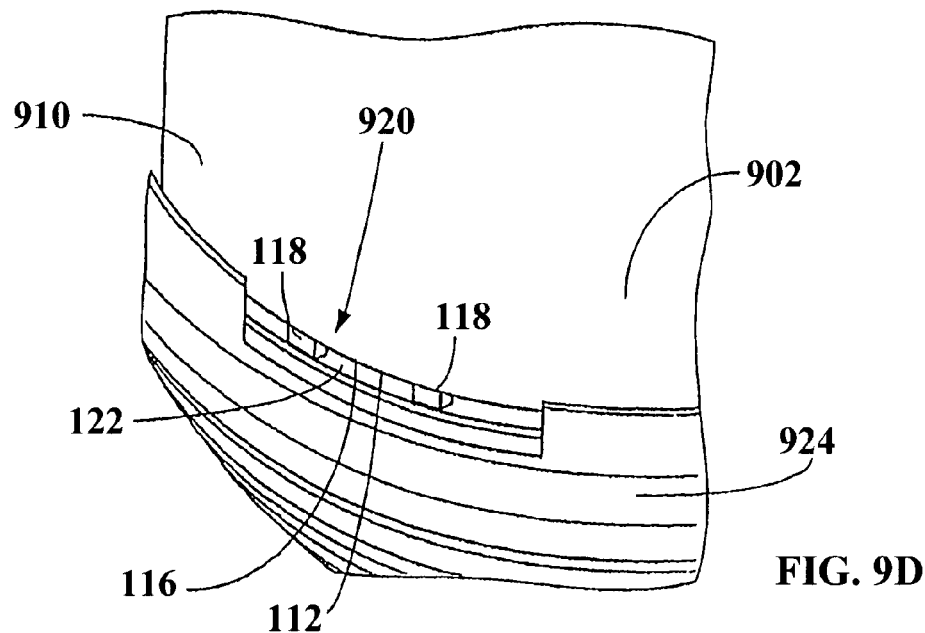
FIG. 9D is a perspective view showing part of the light source of the light bulb shown in FIG. 9A.
Figure 9E:
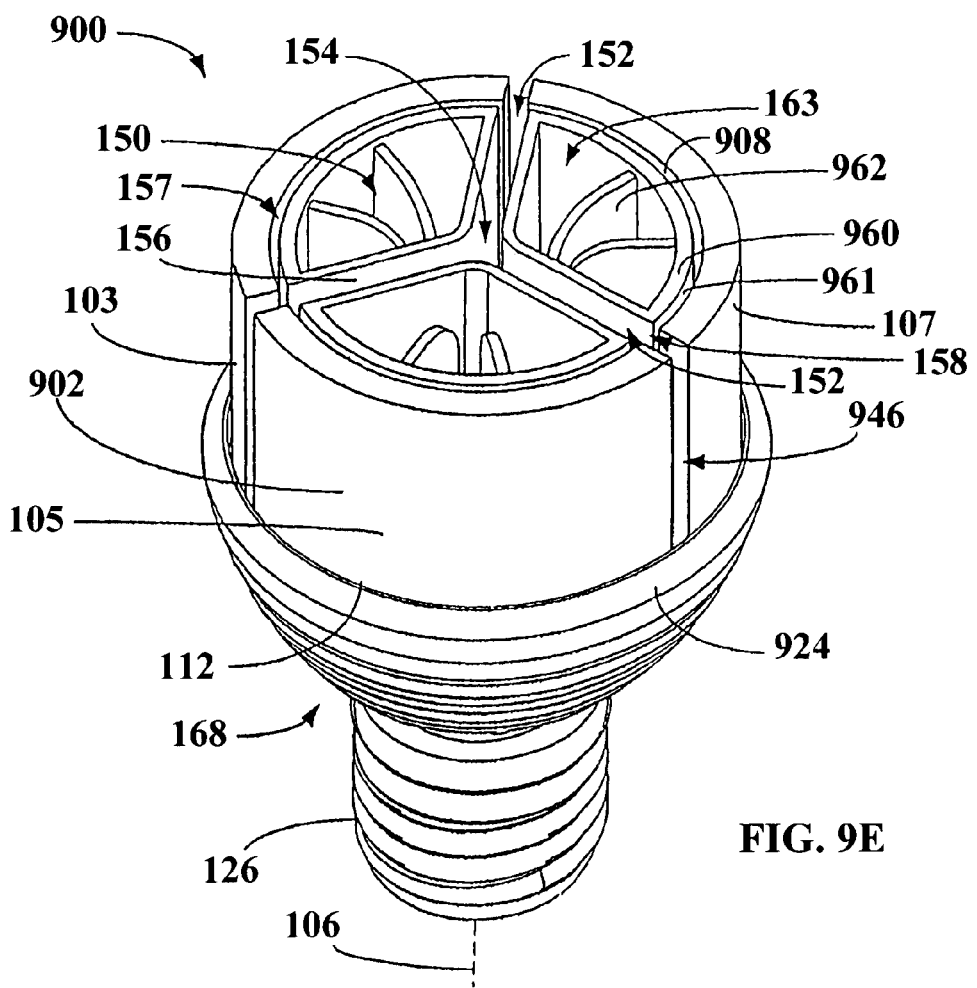
FIG. 9E is a perspective view showing the light bulb shown in FIG. 9A with distal portions of the light guide and heat sink cut off to show alignment between air flow passages of the heat sink and through slots in the light guide.

The light bulb 900 includes a heat sink 150 thermally coupled to the light source 920. The thermal coupling can be direct, via the housing 924, or via another intermediate thermally-conductive element. The heat sink 150 is in the internal volume 104 of the light guide 902 and is configured as a hollow body with a branched cross section. Each branch 152 (FIG. 9E) extends outward from a common center 154 and defines an air flow channel 156 that terminates in an orifice 158. In the example shown, the orifice 158 is adjacent the inner major surface 908 of the light guide 902. In other examples, the branch 152 extends through the light guide and the orifice is adjacent the outer major surface 910 of the light guide. The common center 154 is typically, but not necessarily, the geometric center of the heat sink 150. As shown, the branches 152 extend radially outward from the common center 154. The heat sink 150 extends along the longitudinal axis 106 of the light bulb 200 and, as specifically shown in FIGS. 9A and 9C, is open at both ends proximal and distal to the housing 924. In other embodiments, the heat sink 150 is closed at at least one of the ends (e.g., at the end proximal to the housing 924).

The light guide 902 includes light guide regions 103, 105, 107 separated by respective through-slots 946 configured to allow air to flow through the light guide 902 in a generally radial direction. Each through-slot 946 is aligned with a respective air flow channel 156. In some embodiments, the light guide 902 is a single element. In other embodiments, the light guide 902 includes separate light guide segments (e.g., circumferential segments), each of which corresponds to a respective one of the light guide regions 103, 105, 107. Adjacent ones of the light guide segments are separated by a distance that defines the through-slots 946. Each through-slot 946 is aligned with a respective branch 152 of the heat sink 150. Additionally or alternatively, the through-slots 946 are respectively formed in the light guide segments.

Figure 10A:
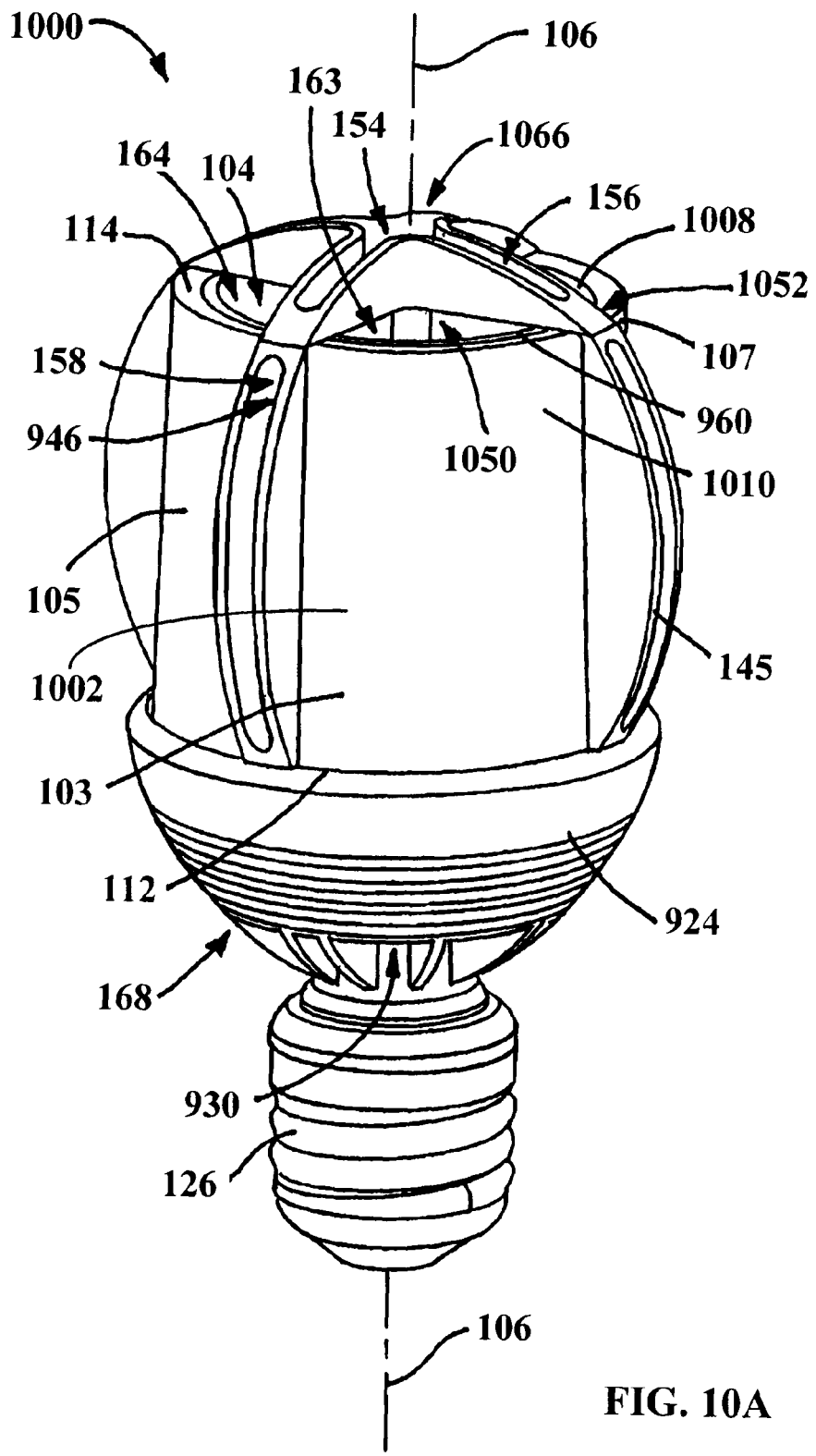
FIG. 10A is a perspective view of another exemplary light bulb oriented with its longitudinal axis vertical.
Figure 10B:
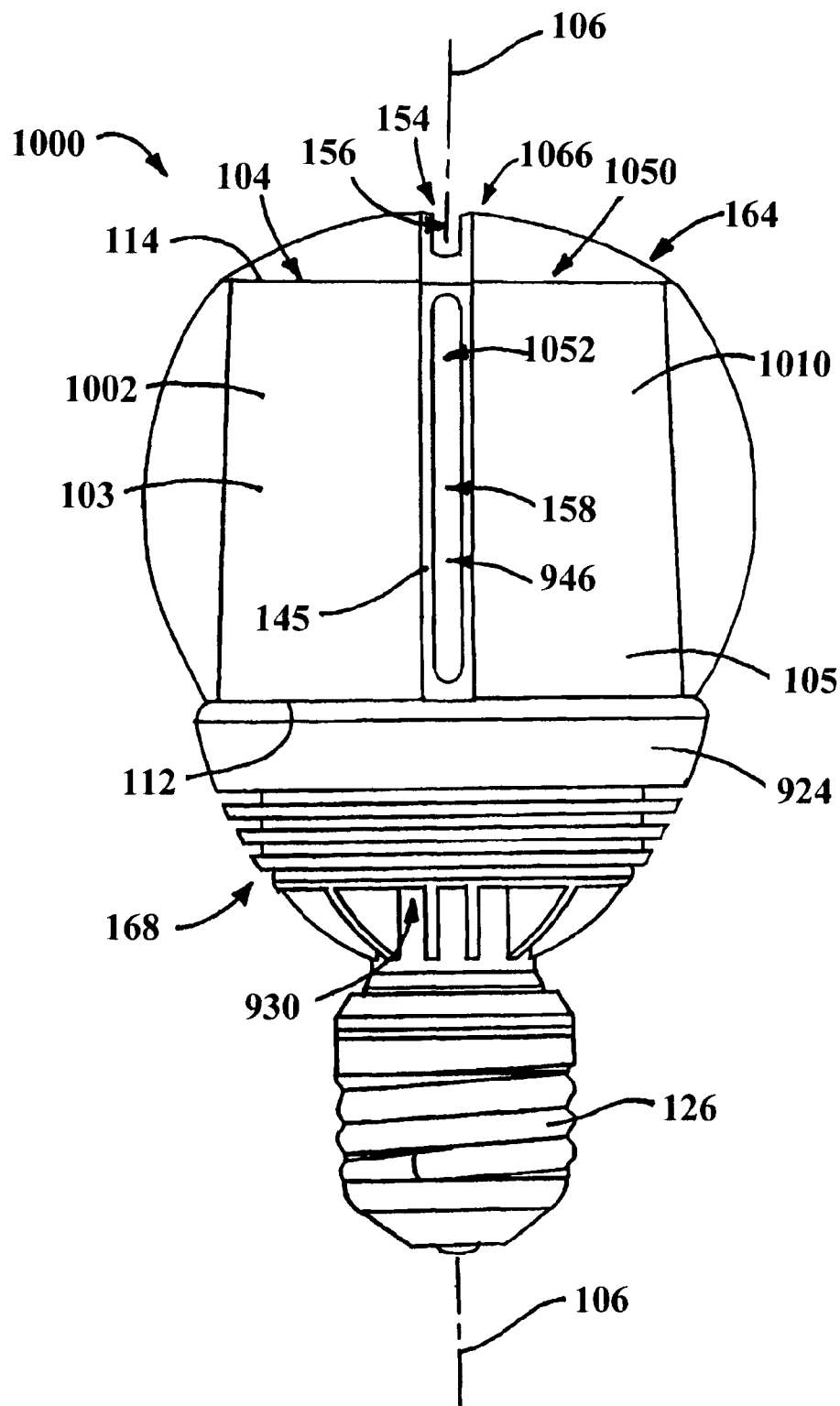
FIG. 10B is a side view of the light bulb shown in FIG. 10A oriented with its longitudinal axis vertical.
Figure 10C:
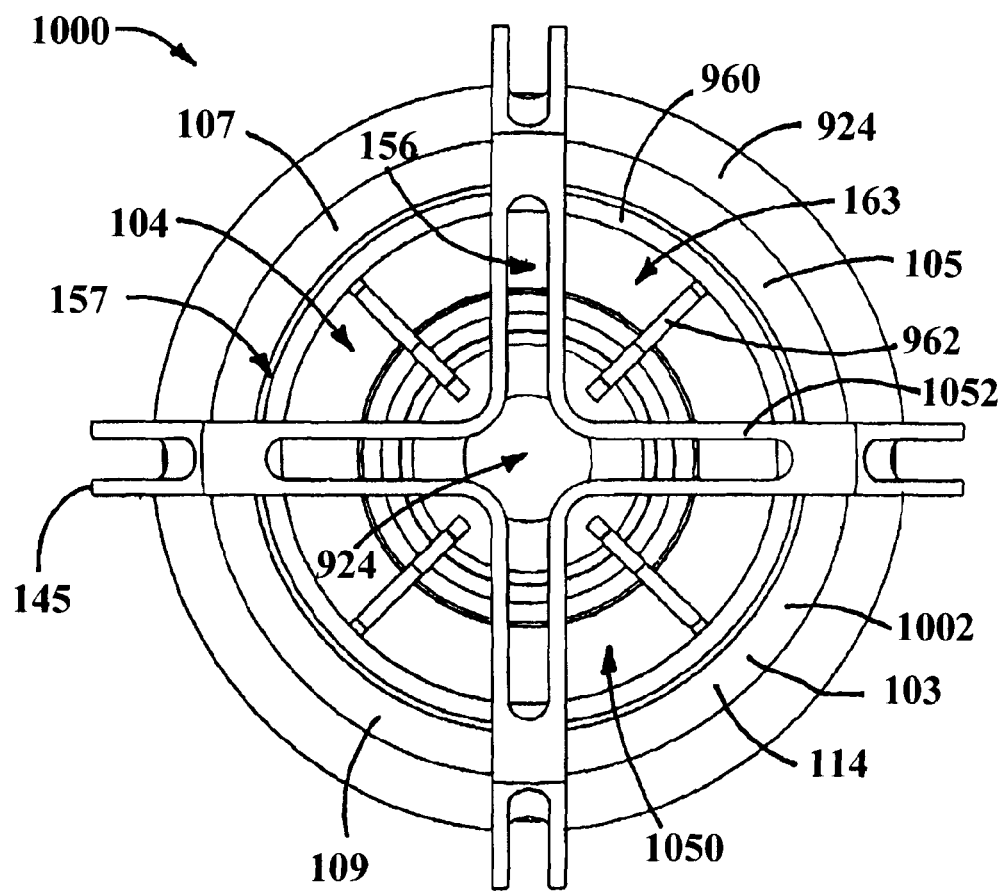
FIG. 10C is a top view of the light bulb shown in FIG. 10A viewed from the distal end of the light guide.

The embodiment of the heat sink 150 shown in FIGS. 9A-9E includes three branches 152 and may be referred to as having a "Y-shaped" heat sink. In other embodiments, the heat sink includes more or fewer branches. For example, one embodiment of the heat sink includes four branches and may be referred to as having an "X-shaped" heat sink (e.g., FIG. 10A). In such embodiments, the light guide includes a corresponding number of light guide regions (e.g., light guide segments 103, 105, 107, 109 as shown in FIG. 10C) and a corresponding number of through-slots, each through-slot aligned with a respective branch of the heat sink.

The heat sink 150 includes linking portions 960 (FIG. 9E) adjacent the inner major surface 908 of the light guide 902. Each linking portion 960 mechanically couples two adjacent 152 branches of the heat sink 150. The outer surface 961 of each linking portion 960 conforms to the inner major surface 908 of the light guide 902 and is separated from the inner major surface 908 of the light guide 902 by an air gap 157. In another example, the outer surface 961 of the linking portion 960 of the heat sink 150 is in contact with the inner major surface 908 of the light guide 902. Each linking portion 960 includes radial fins 962 parallel to the longitudinal axis 106 that extend radially inwards from the linking portion 960. In some embodiments, the outer surface 961 of one or more of the linking portions 960 is highly reflective, and light extracted through the inner major surface 908 is reflected at the outer surface 961 of the linking portion 960, re-enters the light guide 902 at the inner major surface 908, and is output from the light guide 902 through the outer major surface 910.

The distal end 164 of the heat sink 150 extends beyond the distal end 114 of the light guide 902. In some embodiments, the portion of the heat sink 150 extending beyond the light guide 902 is a separate component mechanically and thermally coupled to the remainder of the heat sink 150 disposed in the internal volume 104. In the illustrated example, the portion of the heat sink 150 that extends beyond the light guide is provided by an end cap 166 mechanically and thermally coupled to the remainder of the heat sink 150 adjacent the distal end of the light guide 902. The end cap 166 is configured as an open-ended hollow body with a branched cross section that corresponds to and is aligned with the branched cross section of the heat sink 150. The end cap 166 is also mechanically coupled to the distal end 114 of the light guide 902 and retains the light guide 902 relative to the housing 924. In other embodiments, the portion of the heat sink 150 extending beyond the light guide 902 is integral with the portion of the heat sink 150 disposed in the internal volume 104.

The housing 924 retains the light source 920 (FIG. 9D), including the solid-state light emitters 118, printed circuit board 122, and any additional components not specifically shown (e.g., a light source driver). The housing 924 includes radial fins 168. Vents 930 extend through the housing 924 and connect to the internal volume 104 of the light guide 902.

Figure 9F:
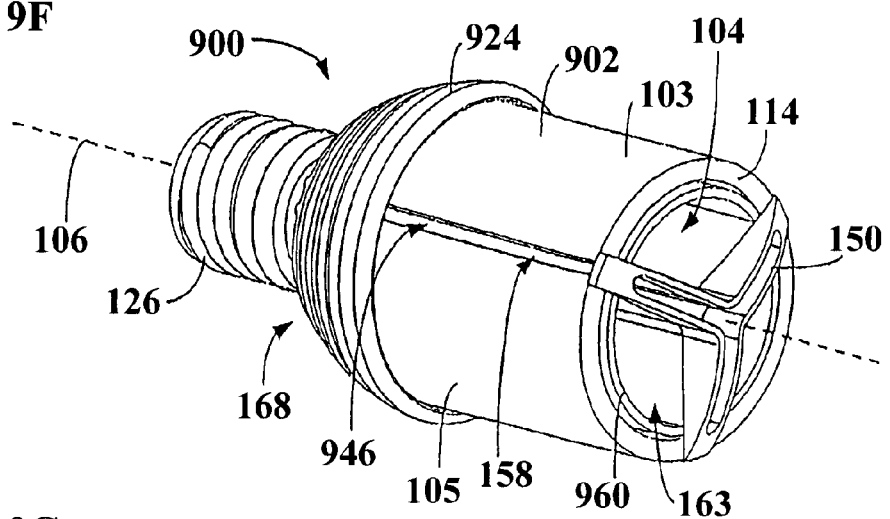
FIG. 9F is a perspective view of the light bulb shown in FIG. 9A oriented with its longitudinal axis horizontal.

Referring again to FIG. 9E, the vents 930 (FIG. 9B) are part of an air flow pathway through the housing 924 and the internal volume 104 of the light guide 902 through which air flows by convection due to heating by the light source 920. The air flow pathway includes the air passages 163 each bounded by the outside surfaces of two adjacent branches 152 of the heat sink 150 and the respective linking portion 960. In embodiments where the air flow channels 156 are at least partially open at their ends proximate the housing 924, the air flow pathway additionally includes the air flow channels 156. When the light bulb 900 is oriented with its longitudinal axis vertical (e.g., as shown in FIGS. 9A and 9B), the cooling air flow is an axial flow through the vents 930, the air flow channels 156 of the heat sink 150 (if the air flow channels 156 are at least partially open at their proximal ends), and the air passages 163. Cool air enters the light bulb 900 through vents 930 in the housing 924 and warm air exits the light bulb 900 through the open, distal end 114 of the light guide 902. Moreover, if the air flow channels 156 are at least partially open at their proximal ends, warm air exits at the open distal end of heat sink 150. The air flow reverses when the light bulb 900 is inverted relative to the orientation shown in FIGS. 9A and 9B such that cool air enters through the open, distal end 114 of the light guide 902 (and through the open distal end of the heat sink 150 if the air flow channels 156 are at least partially open at their proximal ends) and exits the light bulb 900 through the vents 930. The air flow along the pathway just described, however, is reduced when the light bulb 900 is oriented with its longitudinal axis 106 horizontal (e.g., as shown in FIG. 9F).

When the light bulb 900 is oriented with its longitudinal axis 106 horizontal, the through-slots 946 of the light guide 202 and the air flow channels 156 of the heat sink 150 also provide an air flow pathway through the internal volume 104 of the light guide 902 through which air flows by convection due to heating by the light source 920. The cooling air flow passes through the air flow channels 156. The cooling air flow through the air flow channels 156 has a vertical vector component, and is generally in the radial direction relative to the common center 154.

Figure 9G:
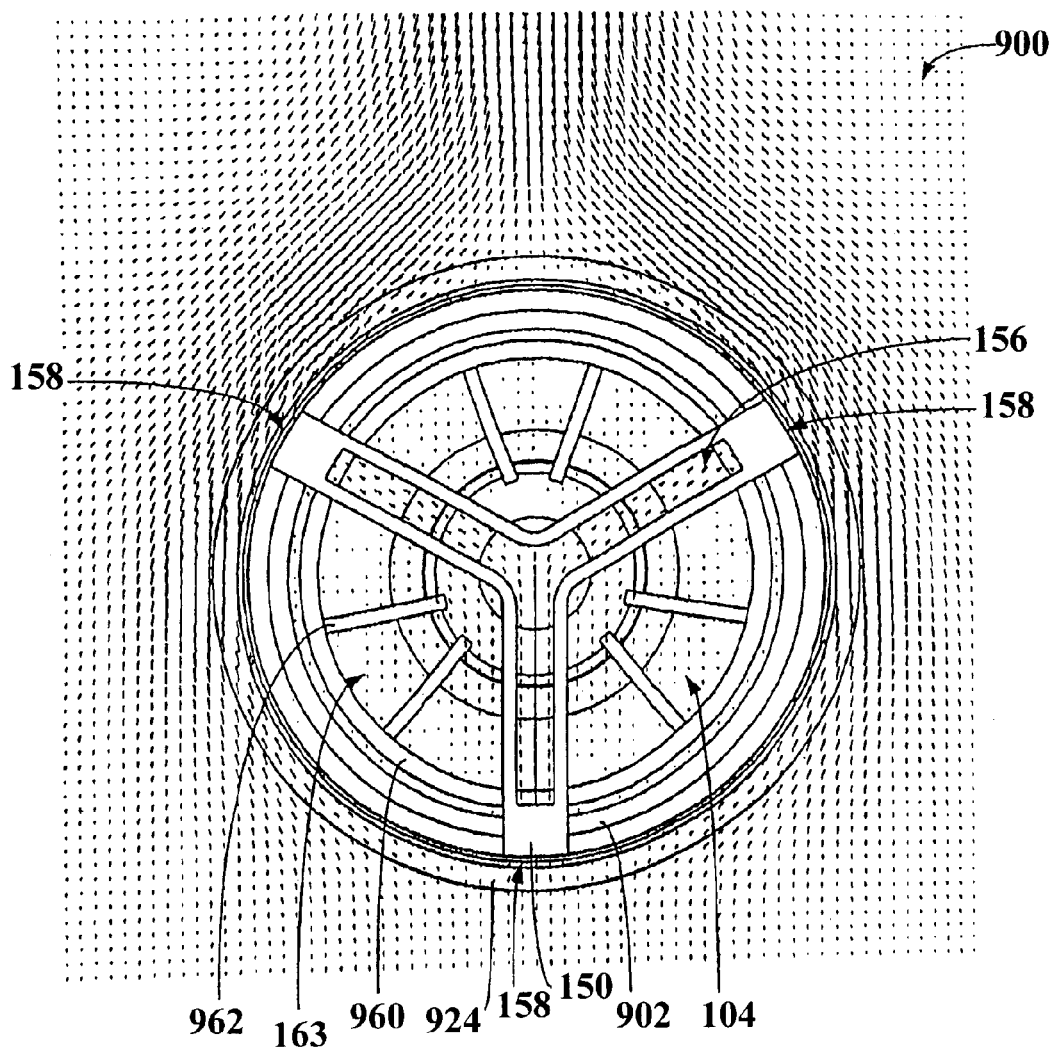
FIG. 9G is a schematic drawing showing the velocity vectors of computed air flow around and within the light bulb shown in FIG. 9A oriented with its longitudinal axis horizontal and viewed from the distal end of the light guide.
Figure 9H:
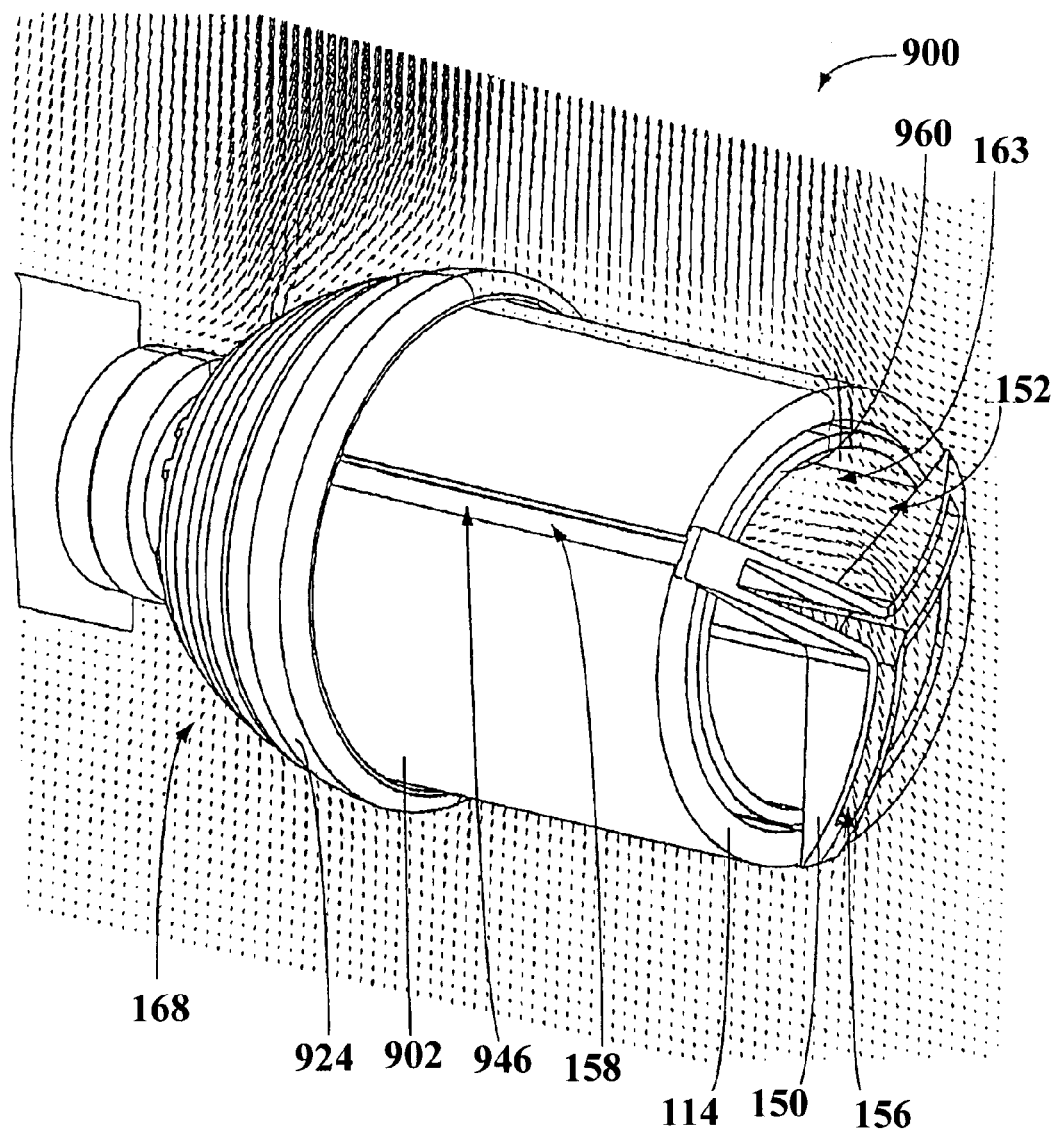
FIG. 9H is a schematic drawing showing the velocity vectors of computed air flow around and within the light bulb shown in FIG. 9A oriented with its longitudinal axis horizontal and viewed in perspective.

FIGS. 9G and 9H show the velocity vectors of computed air flow around and within the light bulb 900 when the light bulb 900 is oriented with its longitudinal axis 106 horizontal. In the example shown, cool air enters the air flow channels 156 through the lowest one of the orifices 158, and warm air exits the air flow channels through the two higher ones of the orifices 158. With the light bulb rotated though about 45 degrees from the example shown, cool air enters the air flow channels 156 through the two lower ones of the orifices 158, and warm air exits the air flow channels through the higher one of the orifices 158.

FIG. 9H shows the flow of air at the distal end of the heat sink 150. The distal end 164 of the heat sink 150 projecting beyond the distal end of the light guide 902 provides additional cooling when the light bulb 900 is oriented with its longitudinal axis 106 horizontal by causing a rotational air flow at the distal end 164 of the heat sink. Warm air exiting the distal end of air flow channel 156 reverses direction and enters the air passage 163 defined by the outer surface of two adjacent branches 152 of the heat sink 150 and the respective linking portions 960. The air flows through the air passage 163, providing additional cooling, and exits through the vents 930 in the housing 924. The rotational air flow increases air flow through the internal volume 104 of the light guide 902 when light bulb 900 is mounted with its longitudinal axis 106 horizontal.

Similar to above-described embodiments of the light bulb, the light bulb 900 includes thermal features that dissipate heat generated by the light source 920, regardless of the orientation of the light bulb 900. For example, when the light bulb 900 is oriented with its longitudinal axis 106 vertical, heat dissipation is primarily provided by axial air flow through the vents 930 and through the internal volume 104 of the light guide 902. When the light bulb 900 is oriented with its longitudinal axis 106 horizontal, heat dissipation is primarily provided by radial air flow through the through-slots 946 and the air flow channels 156. The radial air flow is supplemented by the rotational air flow at the distal end of the heat sink 150 moving air into the air passages 163. When the light bulb 900 is oriented with its longitudinal axis 106 between the vertical and horizontal, heat dissipation is provided by both axial air flow through the vents 930 and through the internal volume 104 of the light guide 902; and by radial air flow through the air flow channels 156. Some additional rotational air flow at the distal end of the heat sink 150 may also occur. The total air flow is apportioned among the radial and axial air flows depending on the specific orientation of the light bulb 900.

In some embodiments, the light bulb includes additional thermal features that improve the dissipation of heat generated by the light source. FIGS. 10A-10C show an exemplary embodiment of the light bulb 1000 including a heat sink 1050 and end cap 1066 that is similar to the heat sink 150 and end cap 166 shown in FIGS. 9A-9H, but the heat sink 1050 includes four branches 1052, and the end cap 1066 includes a branched cross section that corresponds to and is aligned with the branched cross section of the heat sink 1050. The respective branches 1052 of heat sink 1050 also extend beyond the outer major surface 1010 of light guide 1002. The extended branches 1052 provide increased surface area for additional cooling. In addition, the end face 145 of the branch 1052 extending in a direction parallel to the longitudinal axis 106 curves about an axis orthogonal to the longitudinal axis 106 such that the outer envelope of the light bulb 1000 along the longitudinal axis 106 is bulbous in shape.

The light guide 1002 shown in FIGS. 10A-10C is similar to the light guide 902 shown in FIGS. 9A-9H, but the light guide 1002 includes four light guide regions 103, 105, 107, and 109. The light guide is typically formed as a single piece with longitudinal slots at the major surfaces 1008, 1010 that extend axially through the light guide 1002 from the light input edge 116. When the light bulb is assembled, the extended branches 1052 extend through the slots in the light guide. Alternatively, the light guide may be composed of discrete segments equal in number to the branches 1052.

Figure 11A:
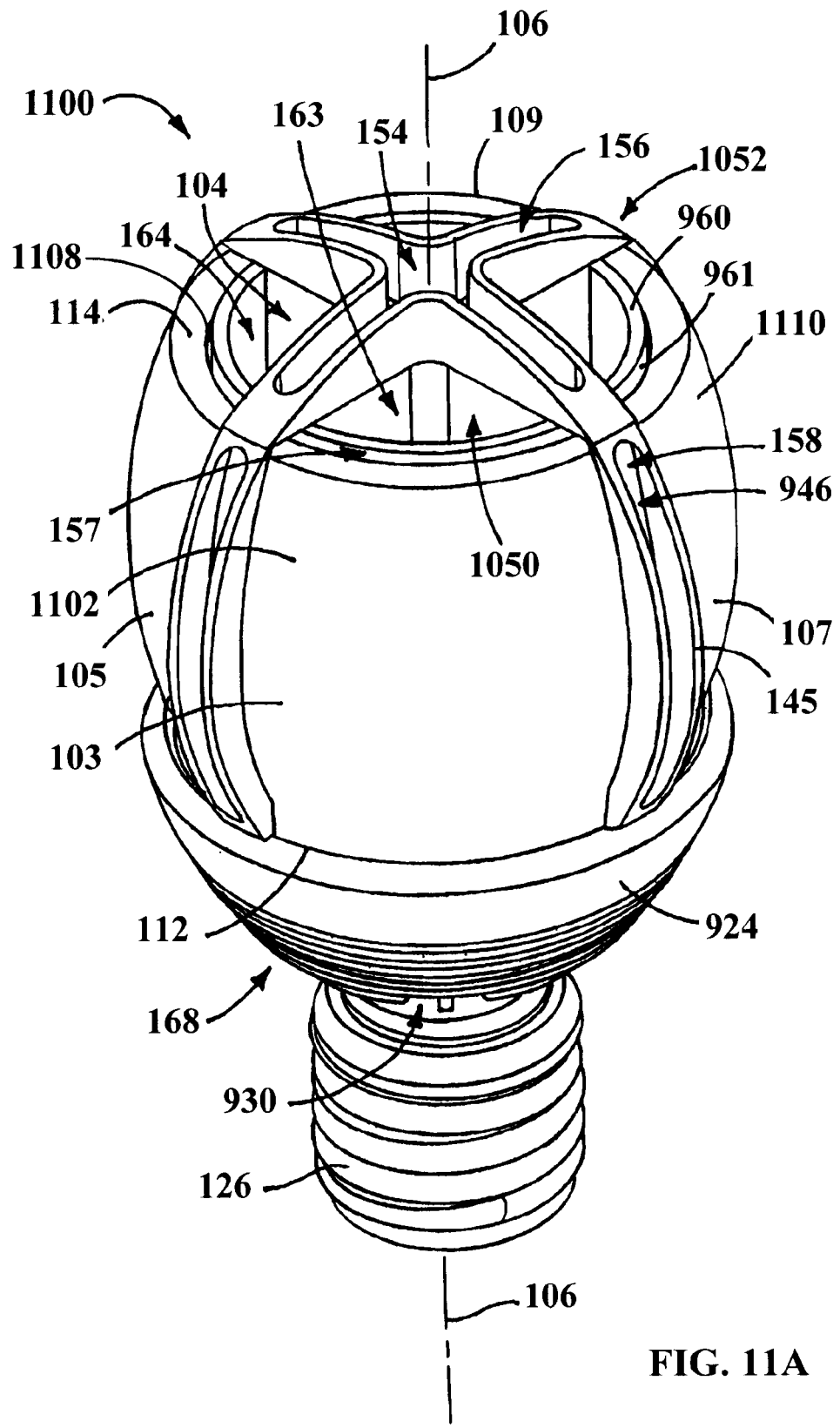
FIG. 11A is a perspective view of another exemplary light bulb oriented with its longitudinal axis vertical.
Figure 11B:
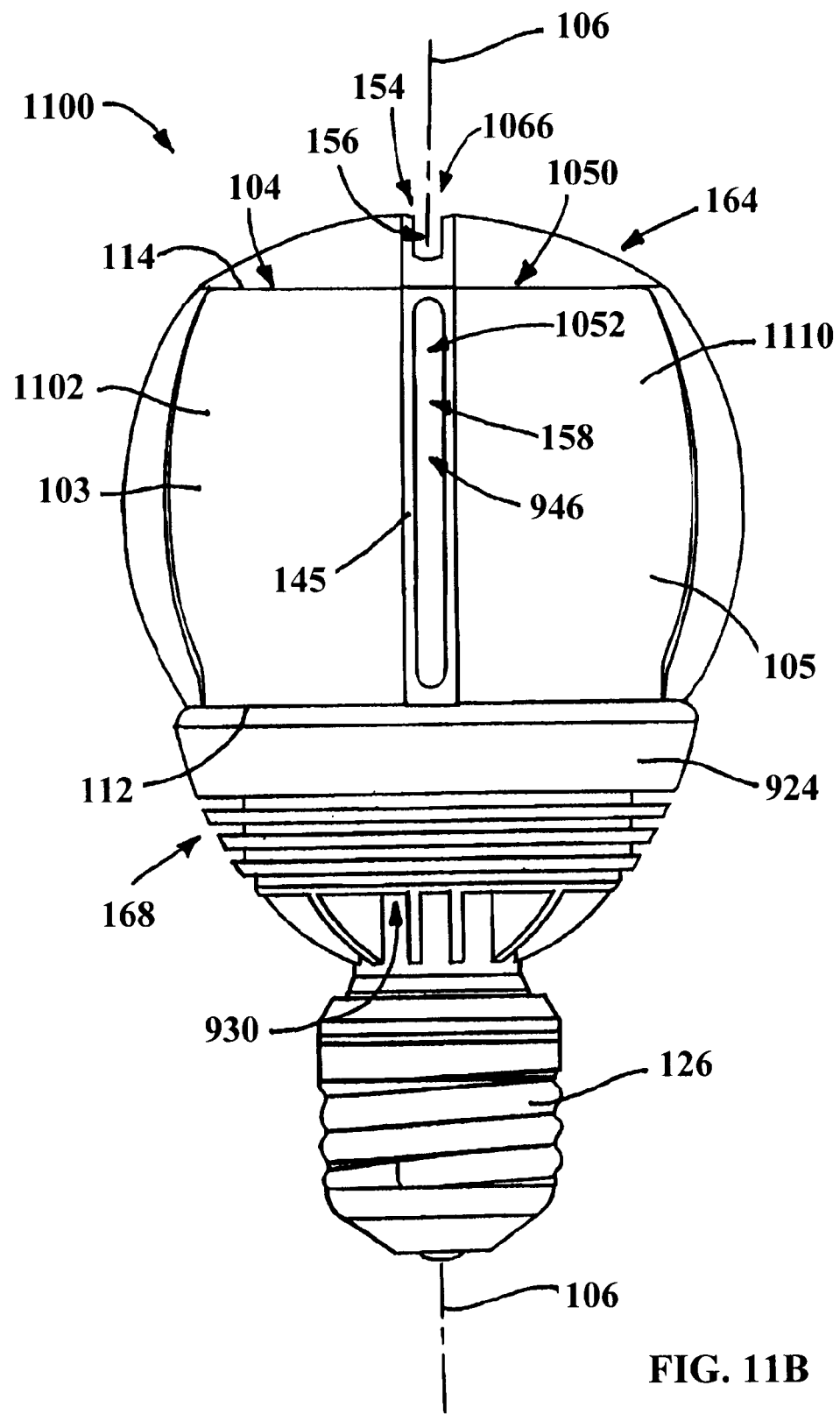
FIG. 11B is a side view of the light bulb shown in FIG. 11A oriented with its longitudinal axis vertical.

FIGS. 11A and 11B show another exemplary embodiment of the light bulb 1100 including a light guide 1102 that is similar to the light guide 1002 shown in FIGS. 10A-10C, but the light guide 1102 includes major surfaces 1108, 1110 that curve about an axis orthogonal to the longitudinal axis 106. The light guide 1102 therefore also provides for an outer envelope of the light bulb 1100 that is bulbous in shape.

Figure 12:
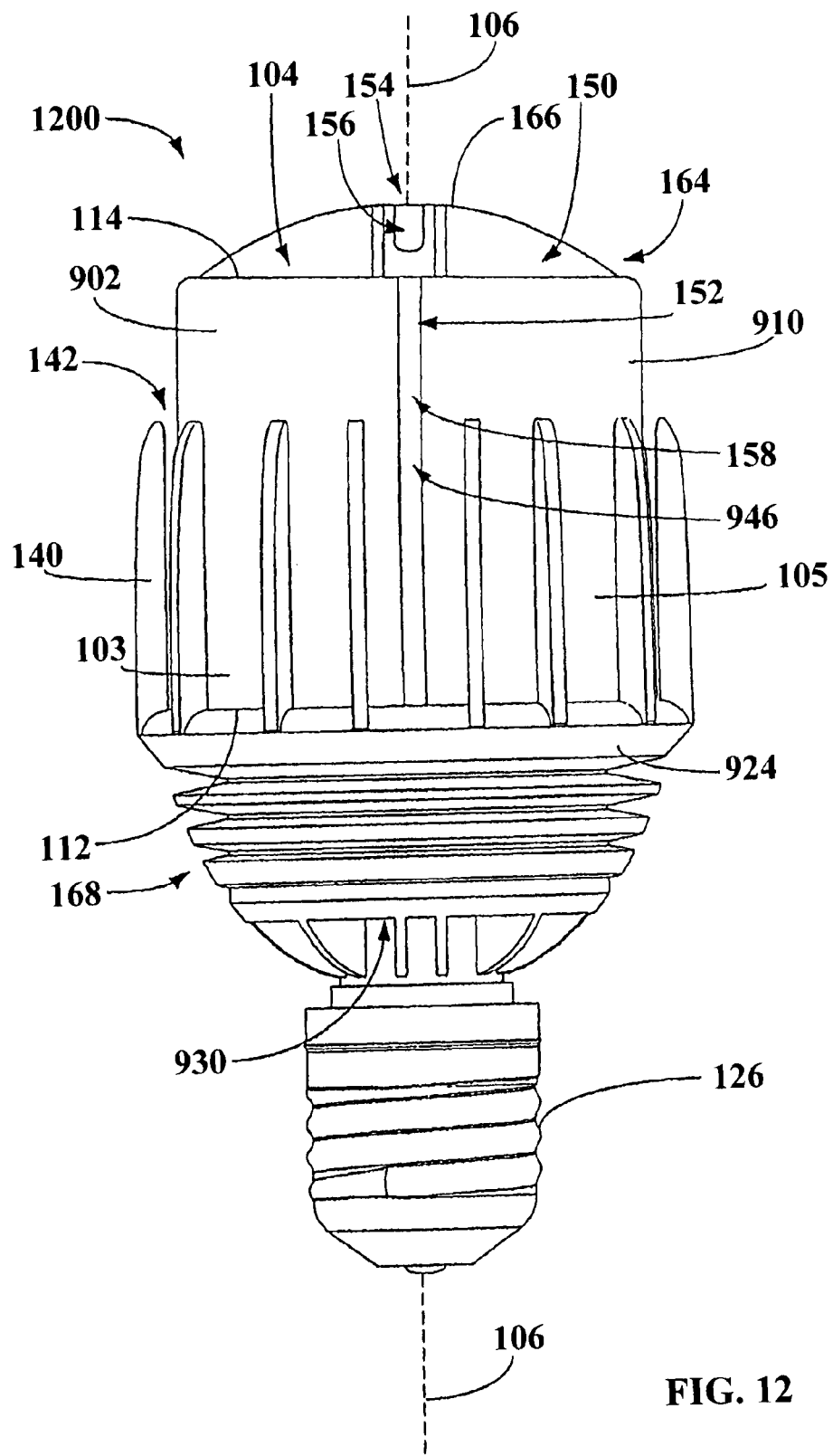
FIG. 12 is a side view of another exemplary light bulb oriented with its longitudinal axis vertical.
Figure 13:
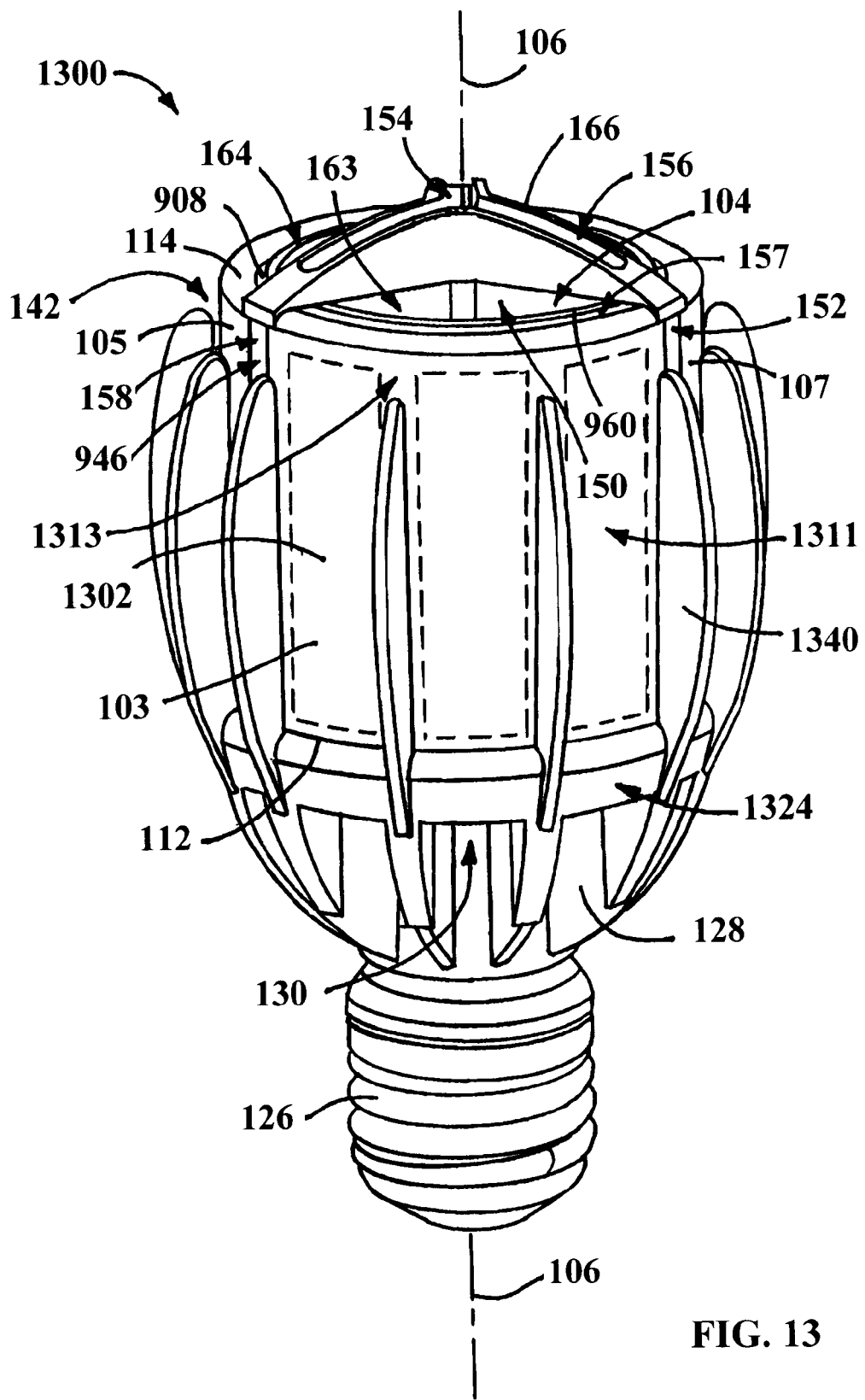
FIG. 13 is a perspective view of another exemplary light bulb oriented with its longitudinal axis vertical.

FIGS. 12 and 13 show embodiments of the light bulb 1200, 1300 including fins 140, 1340 extending from the housing 924, 1324 adjacent the outer major surface 210 of the light guide 902, 1302. FIG. 12 shows an embodiment in which each fin 140 has a rectangular cross-sectional shape in a plane orthogonal to the longitudinal axis 106. The radial dimension of the cross-section decreases with increasing distance along the fin from the housing 924.

FIG. 13 shows an embodiment of the light bulb 1300 including fins 1340 that are similar to the fins 140 shown in FIGS. 1A-1G and 12, but the radial dimension of the cross-section of each fin 1340 increases with increasing distance from the housing 1324 to a maximum part-way along the fin. The radial dimension then decreases as the distance from the housing 1324 increases further. The fin profile just described gives the outer envelope of the light bulb 1300 a bulbous appearance. Similar to the fins 140 of the light bulb 100, each fin 1340 is separated from the outer major surface 1310 of the light guide 1302 by an air gap 142 to allow air flow around the fins 1340, including between the fins 1340 and the outer major surface 1310 of the light guide 1302. The air gaps 142 separating the fins 1340 and the outer major surface 1310 of the light guide 1302 provide an airflow pathway through which cooling air flows by convection due to heating by the light source 120. Cool air flows around the outer major surface 1310 of the light guide 1302, flows around the fins 1340, flowing through the air gaps 142 between the fins 1340 and the outer major surface 1310 of the light guide 1302. The cool air is heated by heat from the fins 1340, and the resulting warm air rises in a direction away from the light bulb 1300, drawing in additional cool air.

The light guide 1302 shown in FIG. 13 is similar to the light guide 902 shown in FIGS. 9A-9H, but additionally includes light emitting regions 1311 and non-light emitting regions 1313 similar to the light emitting regions 111 and the non-light emitting regions 113 shown in FIGS. 2A and 2B. The light extracting elements at the major surface 1308, 1310 of the light guide 1302 are configured to extract the light from the light guide 1302 through the light emitting regions 1311 of the outer major surface 1310 of the light guide 1302. The light extracting elements are aligned with the light emitting regions 1311 of the outer major surface 1310 of the light guide 1302. The light emitting regions 1311 are circumferentially interleaved with non-light emitting regions 1313. The fins 1340 are adjacent the non-light emitting regions 1313, and are circumferentially offset from the light emitting regions 1311.

Figure 14:
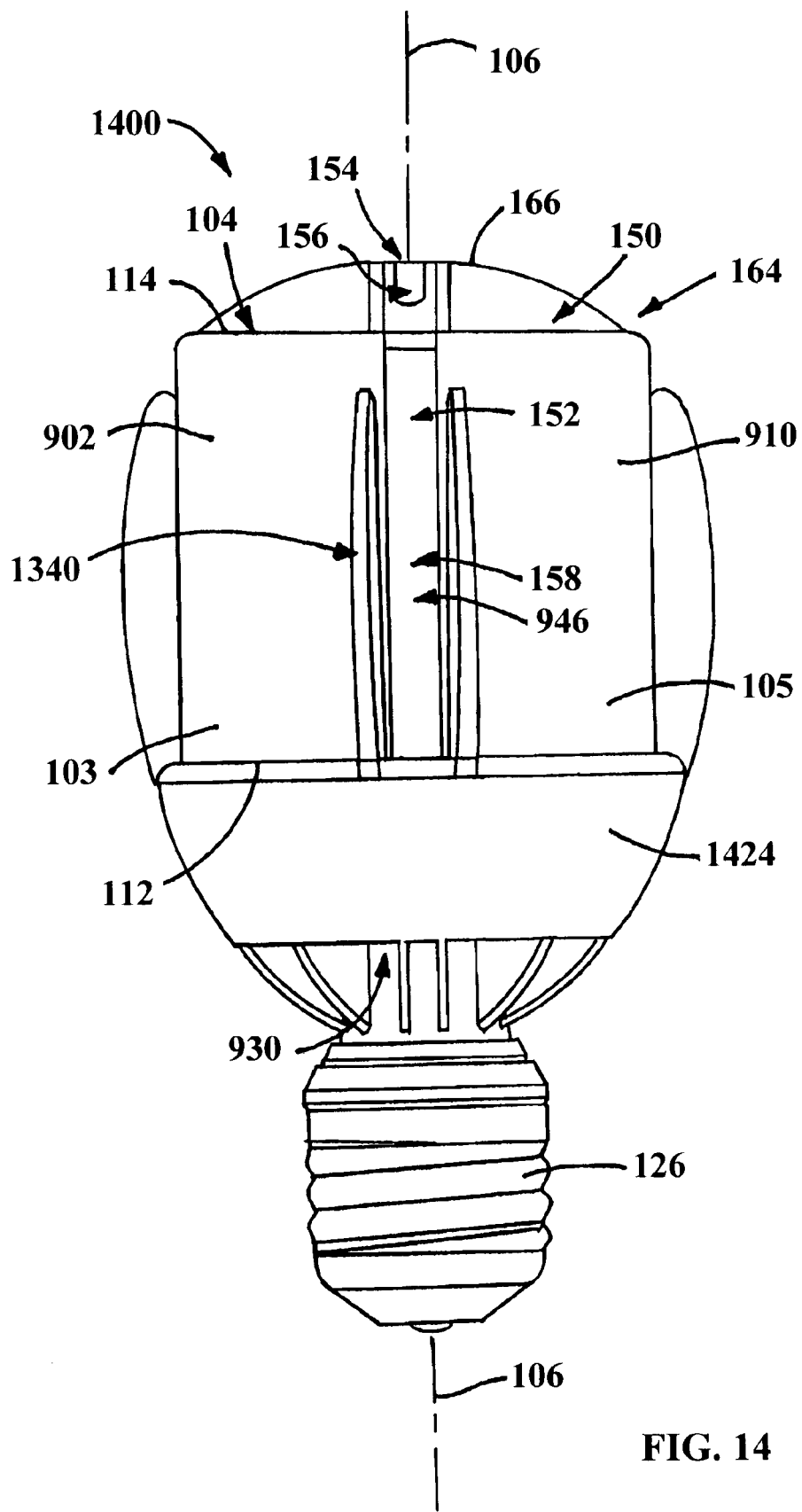
FIGS. 14 and 15 are side views of other exemplary light bulbs oriented with their longitudinal axes vertical.
Figure 15:
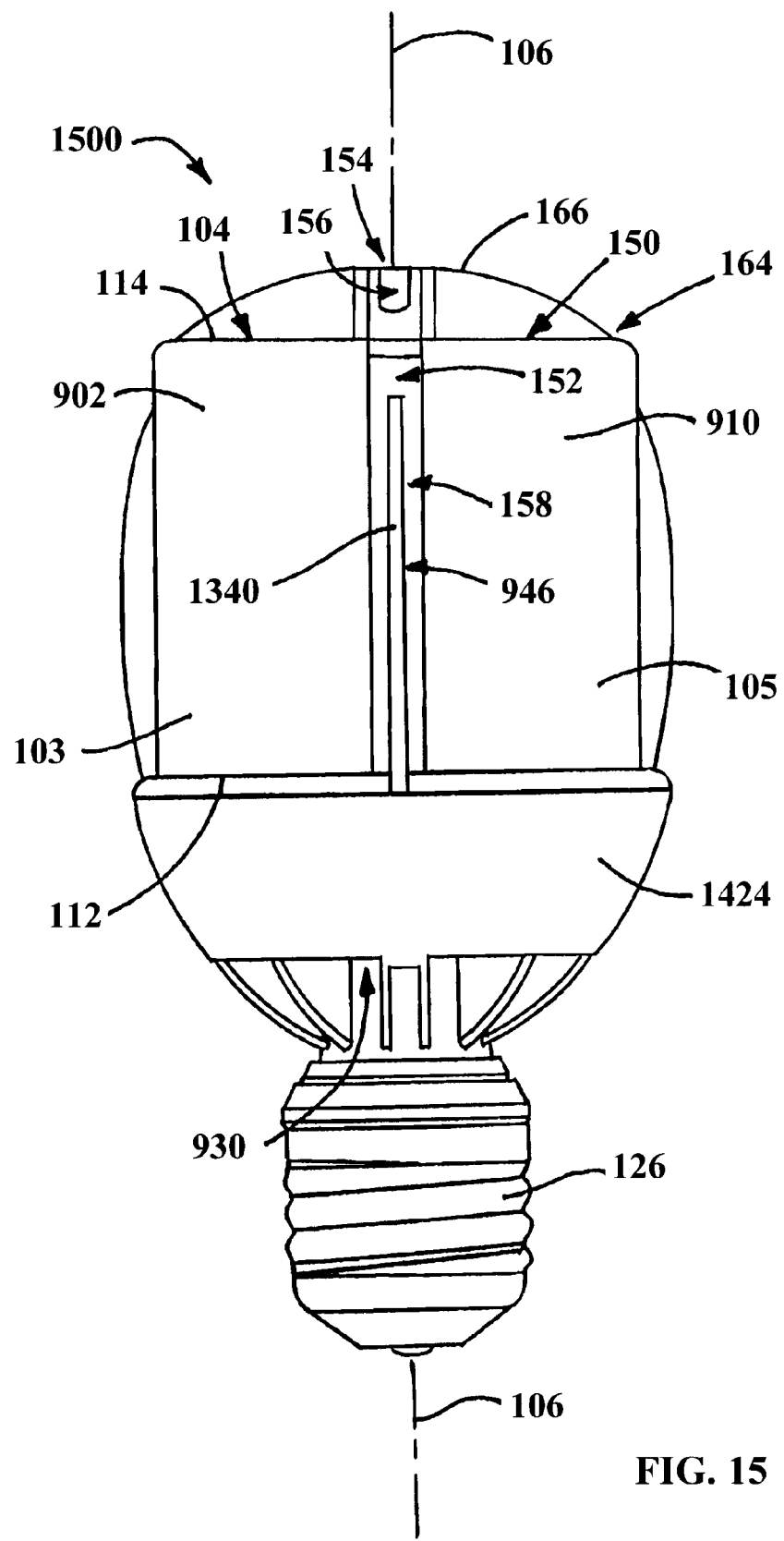

The light bulb may include any suitable number, any suitable arrangement, and any suitable configuration of the fins. FIGS. 14 and 15 show embodiments in which the fins 1340 extending from housing 1424 are located to reduce occlusion of the light extracted from the light guide 902. FIG. 14 shows an exemplary embodiment in which the fins 1340 are located in pairs adjacent each branch 152 of the heat sink 150. A pair of fins 1340 is arranged on opposite sides of the orifice of each branch 152 of the heat sink 150 and effectively forms an extension of the air flow channel 156. FIG. 15 shows an exemplary embodiment in which the fins 1340 are arranged with a respective fin 1340 centered on each through-slot 946. In the embodiments shown in FIGS. 14 and 15, the cooling air entering or exiting the air flow channels 156 via the respective through-slots 946 and orifices 158 flows past the fins 1340 shown in FIG. 14 or around the fin 1340 shown in FIG. 15 and extracts heat therefrom. The arrangements of the fins 1340 shown in FIGS. 14 and 15 also increase the area of the outer major surface 910 of the light guide 902 that can emit light that is not scattered or reflected back into the light guide 902 by a fin or is absorbed by the fin.

Figure 16:
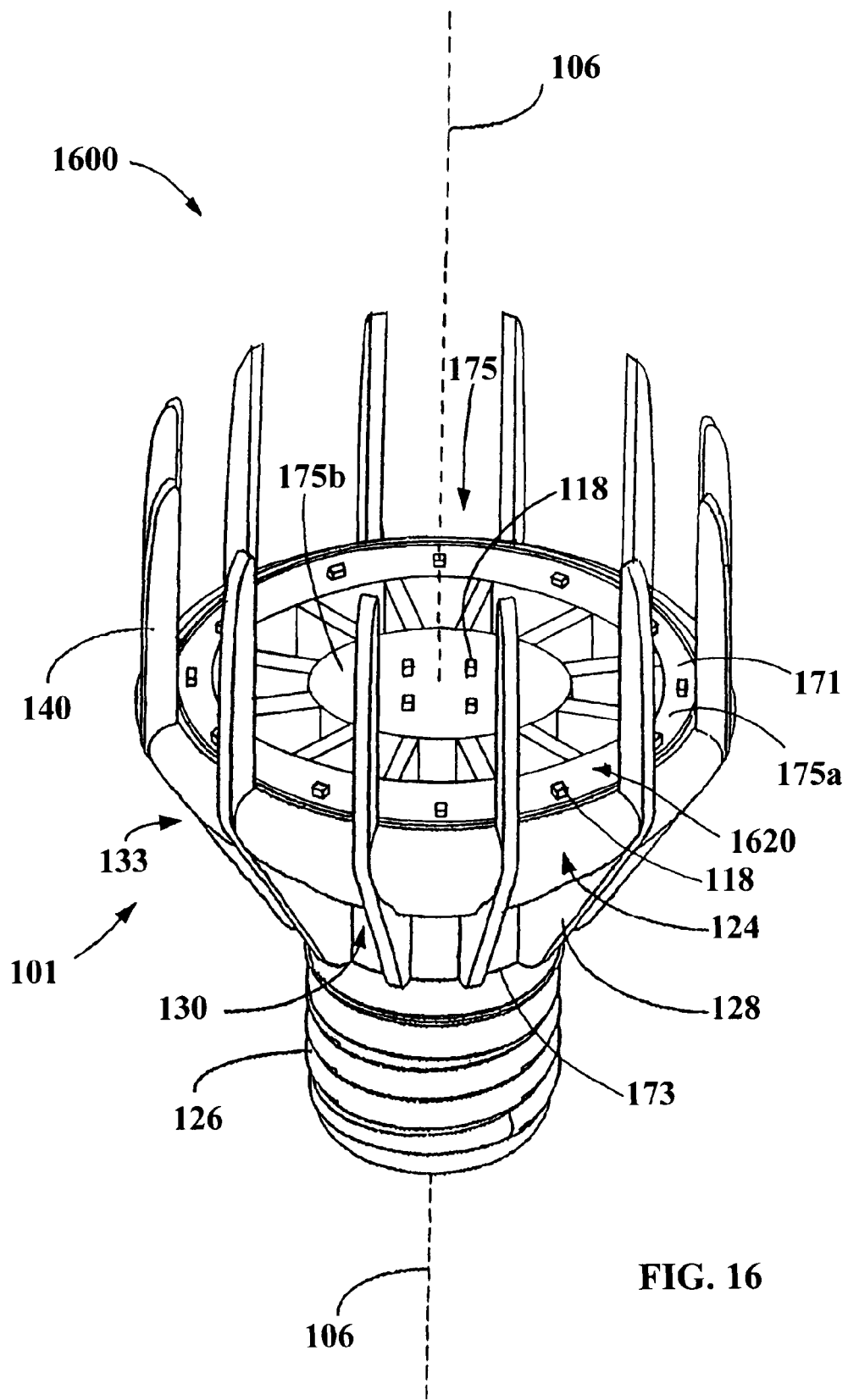
FIG. 16 is a perspective view of an exemplary light bulb component as a component of a light bulb oriented with its longitudinal axis vertical.

FIG. 16 shows an example of a light bulb 1600 that includes a light bulb component 101. The light bulb 1600 is similar to the light bulb 100 shown in FIGS. 1A-1E, but the light bulb 1600 does not include the light guide 102 or the heat sink 132. In some embodiments, the light bulb component is used as a component of a light bulb such as the light bulbs described above. In such light bulbs, a light guide is installed on the light bulb component and the light source is located to edge light the light guide.

The housing 124 of the light bulb component 101 defines the longitudinal axis 106 and includes a proximal end 173 and a distal end 171. The housing 124 includes radial buttresses 128 disposed parallel to the longitudinal axis 106 that bound the vents 130. The vents 130 extend through the housing 124 from the outer surface 133 of the housing and provide a path for air flow and convection cooling. The distal end 171 of the housing 124 includes a light source mounting surface 175 to which light source 1620 is mounted. The light source mounting surface 175 includes an outer portion 175a and an inner portion 175b. The outer portion 175a is separated from the inner portion 175b by the vents 130. Fins 140 extend from the distal end 171 of the housing 124 parallel to the longitudinal axis 106 and radially relative to the longitudinal axis 106.

A base 126 is coupled to the proximal end 173 of the housing 124. The base 126 is configured to mechanically mount the light bulb 1600 and receive electrical power. The light bulb 1600 additionally includes a light source 1620 having a suitable number and arrangement of solid state light emitters 118. In the embodiment shown in FIG. 16, the solid state light emitters 118 of the light source 1620 are arranged on both the outer portion 175a and the inner portion 175b of the light source mounting surface 175. In other embodiments, the solid state light emitters 118 of the light source 1620 are arranged on one of the outer portion 175a or the inner portion 175b of the light source mounting surface 175.

Figure 17A:
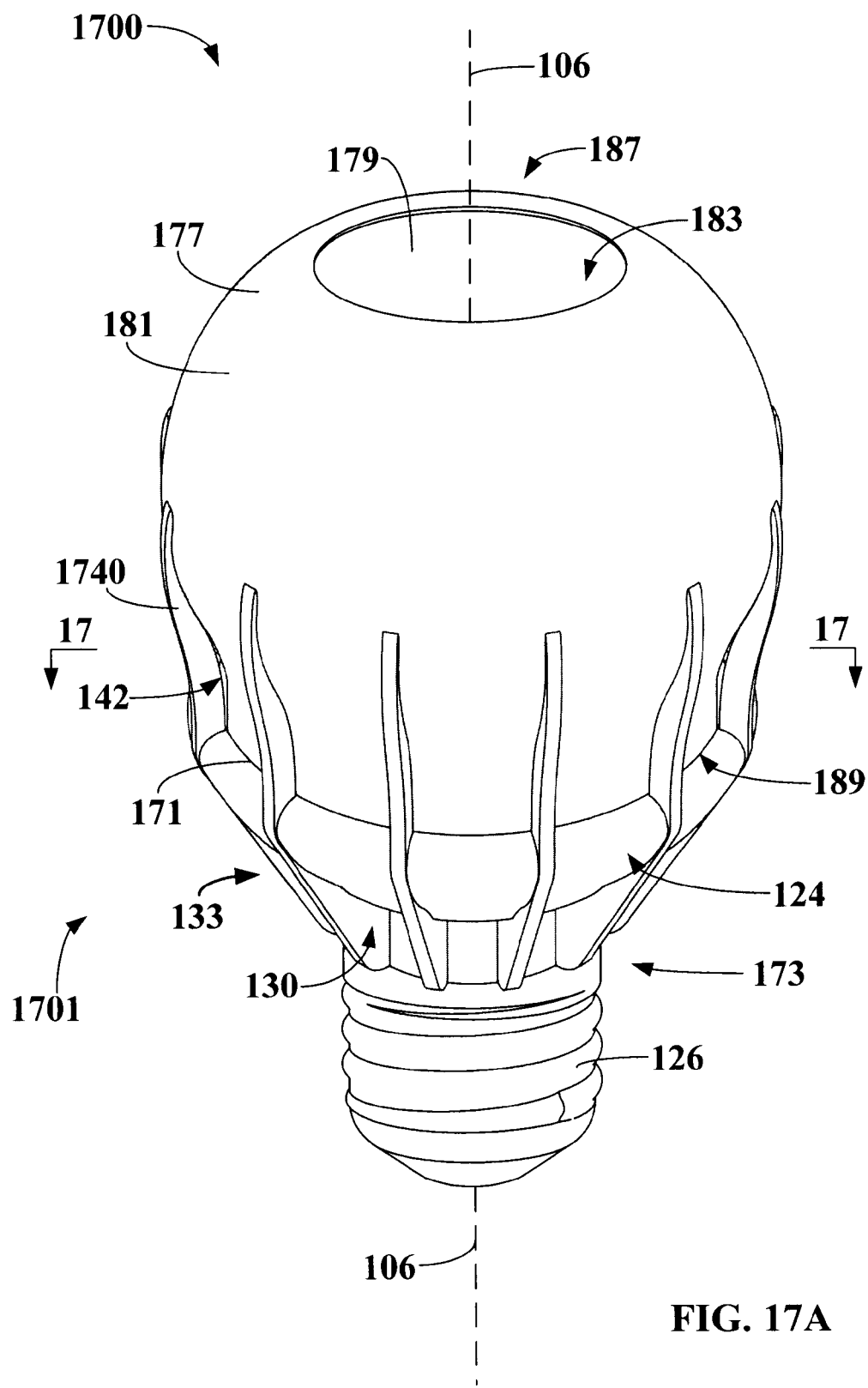
FIG. 17A is a perspective view of a light bulb oriented with its longitudinal axis vertical.
Figure 17B:
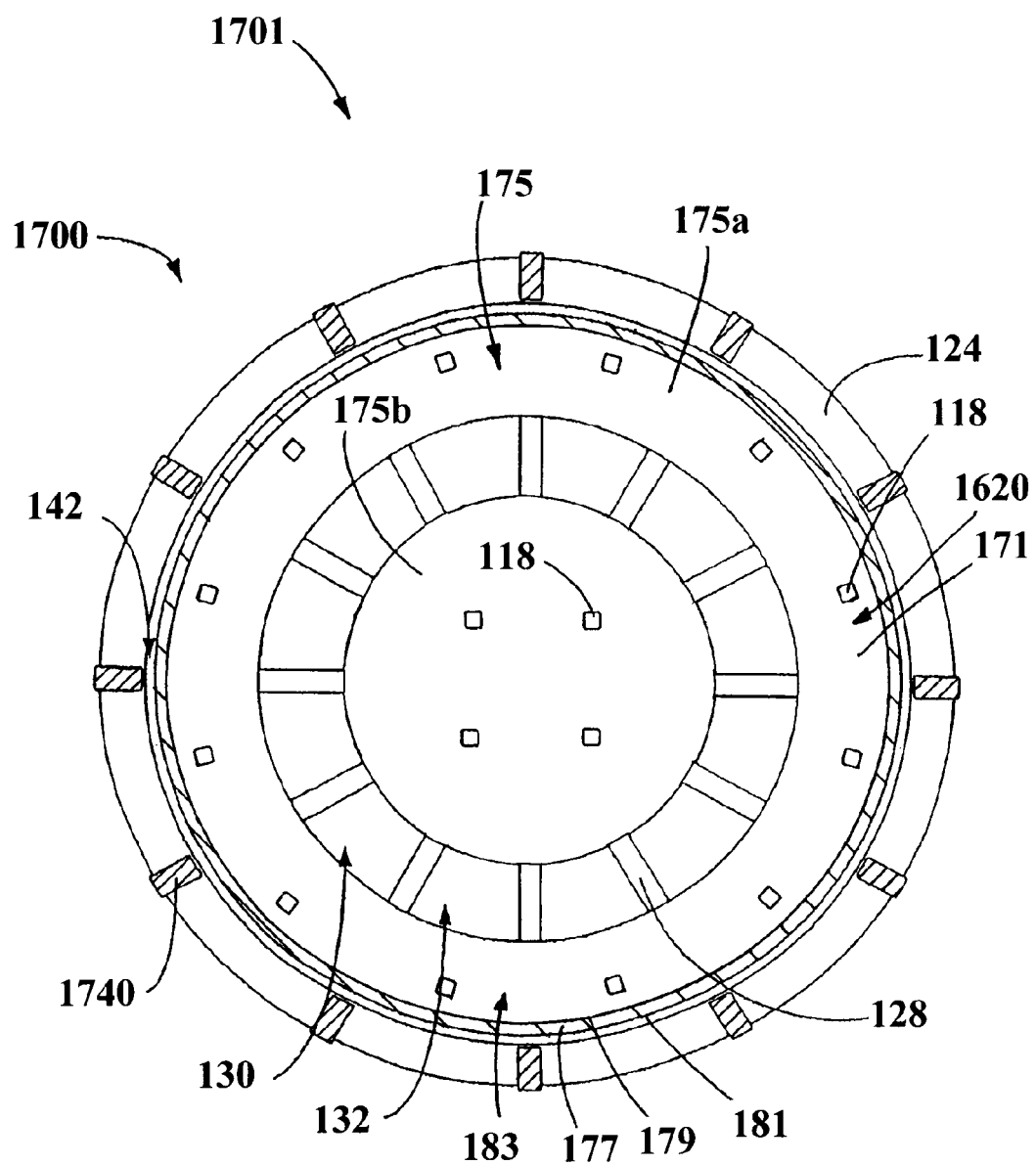
FIG. 17B is a cross-sectional view of the light bulb shown in FIG. 17A along the section line 17-17 shown in FIG. 17A.

FIGS. 17A and 17B show another example of a light bulb 1700 that includes a light bulb component 1701. The fins 1740 of the light bulb component 1701 shown in FIGS. 17A and 17B are similar to the fins 140 shown in FIG. 16, but the fins 1740 curve along an outer contour of a shroud 177.

The shroud 177 is a transparent or translucent shroud at the distal end 171 of the housing 124. The shroud 177 is configured as a hollow body surrounding an internal volume 183. The shroud 177 extends distally from the housing 124 and includes an inner major surface 179 and an outer major surface 181. The shroud 177 is open at both ends 187, 189. In some embodiments, the shroud 177 includes longitudinal through-slots (not shown) that allow air to flow radially through them. In other embodiments, the shroud 177 includes shroud segments (not shown) separated by longitudinal through-slots (not shown) that allow air to flow radially through them. In such embodiments, the end 187 of the shroud 177 remote from the housing 124 may be closed.

The major surfaces 179, 181 of the shroud 177 may curve about at least one of an axis orthogonal to the longitudinal axis 106 and an axis parallel to the longitudinal axis 106. In the embodiment shown in FIG. 17A, the shape of the shroud 177 resembles the envelope of an A19 incandescent light bulb. In other embodiments, the shape of the shroud may be, for example, spherical, cylindrical, frustoconical, frustopyramidal, bell-shaped, hourglass-shaped, teardrop-shaped, pear-shaped, bulbous, or another suitable shape. The light bulb 1700 may be configured to conform to a standard light bulb outer envelope specification.

Each fin 1740 is separated from the outer major surface 181 of the shroud 177 by an air gap 142 that allows air to flow between the fin 1740 and the outer major surface 181 of the shroud 177. In some of the embodiments where the outer major surface 181 of the shroud 177 is bulbous, at least the surface of the fins 1740 facing the shroud also conform to the outer major surface 181 of the shroud 177 (e.g., as shown in FIG. 17A).

The light source 1620 is at least partially in the internal volume 183 of the shroud 177 at the distal end 171 of the housing 124 (e.g., as shown in FIG. 17B). Most of the light emitted from the light source 1620 propagates through the internal volume of the shroud and is incident on the inner major surface 179 of the shroud 177. Most of the light incident on the shroud propagates through the shroud and exits the shroud through the outer major surface 181. In some embodiments, the shroud 177 is specularly transmissive. Light incident on the inner major surface 179 of the shroud 177 passes through the shroud 177 and is output from the light bulb 1700 with substantially no change in its light ray angle distribution. In other embodiments, the shroud 177 includes at least one of light-scattering elements and light-redirecting elements at at least one of the major surfaces 179, 181, and the light incident on the inner major surface 179 of the shroud 177 and propagating through the shroud is scattered or redirected to modify its light ray angle distribution. Regardless of whether the shroud 177 modifies the light ray angle distribution of the light incident thereon, the shroud may additionally or alternatively modify the spectrum of the light incident thereon. In yet other embodiments, the inner major surface 179 of the shroud is partially reflective to redirect light incident thereon back into the interior volume of the shroud to make the light ray angle distribution of the light bulb more homogeneous.

Figure 18:
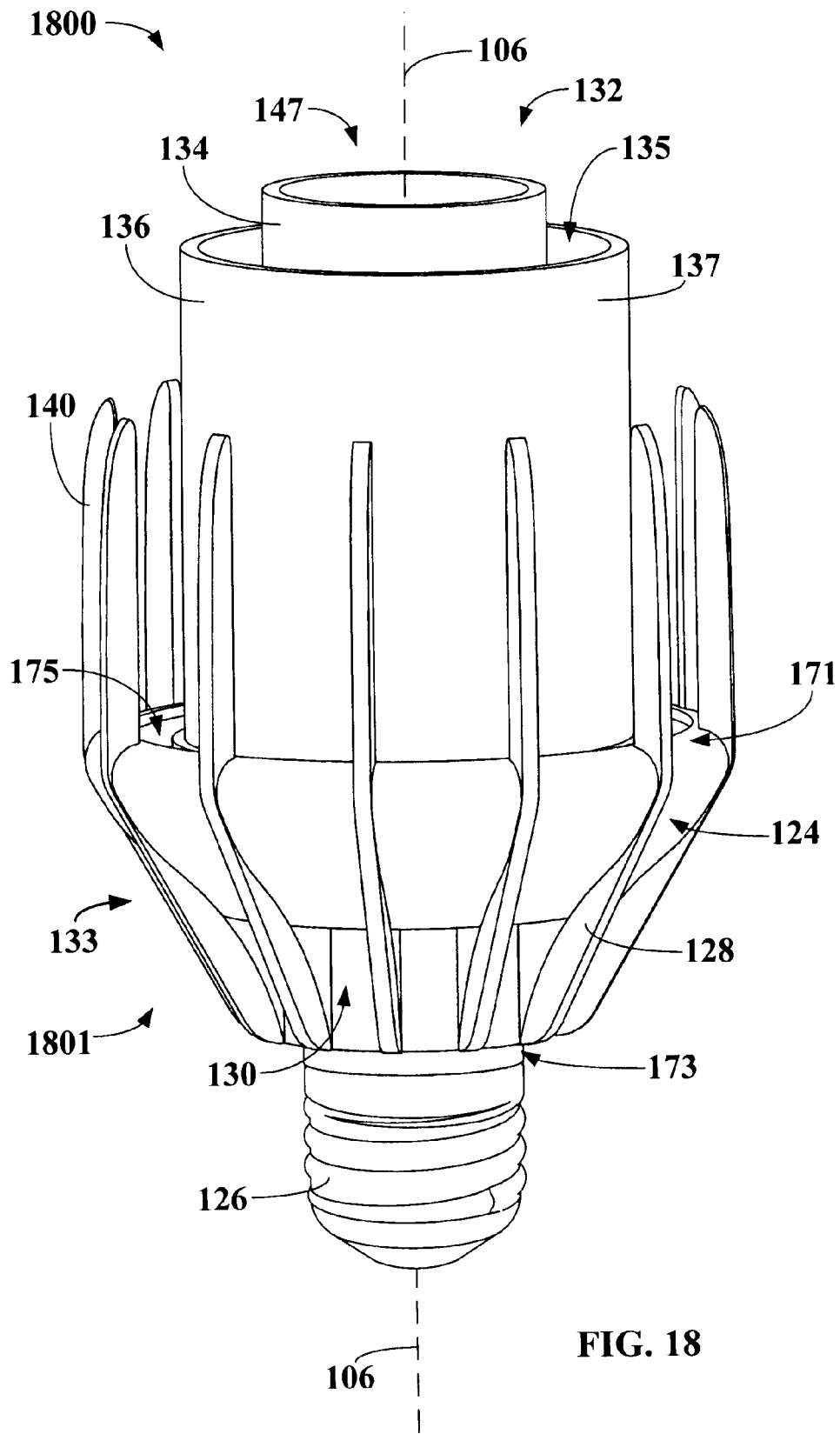
FIGS. 18-24 are perspective views of other exemplary light bulbs oriented with their longitudinal axes vertical.
Figure 19:
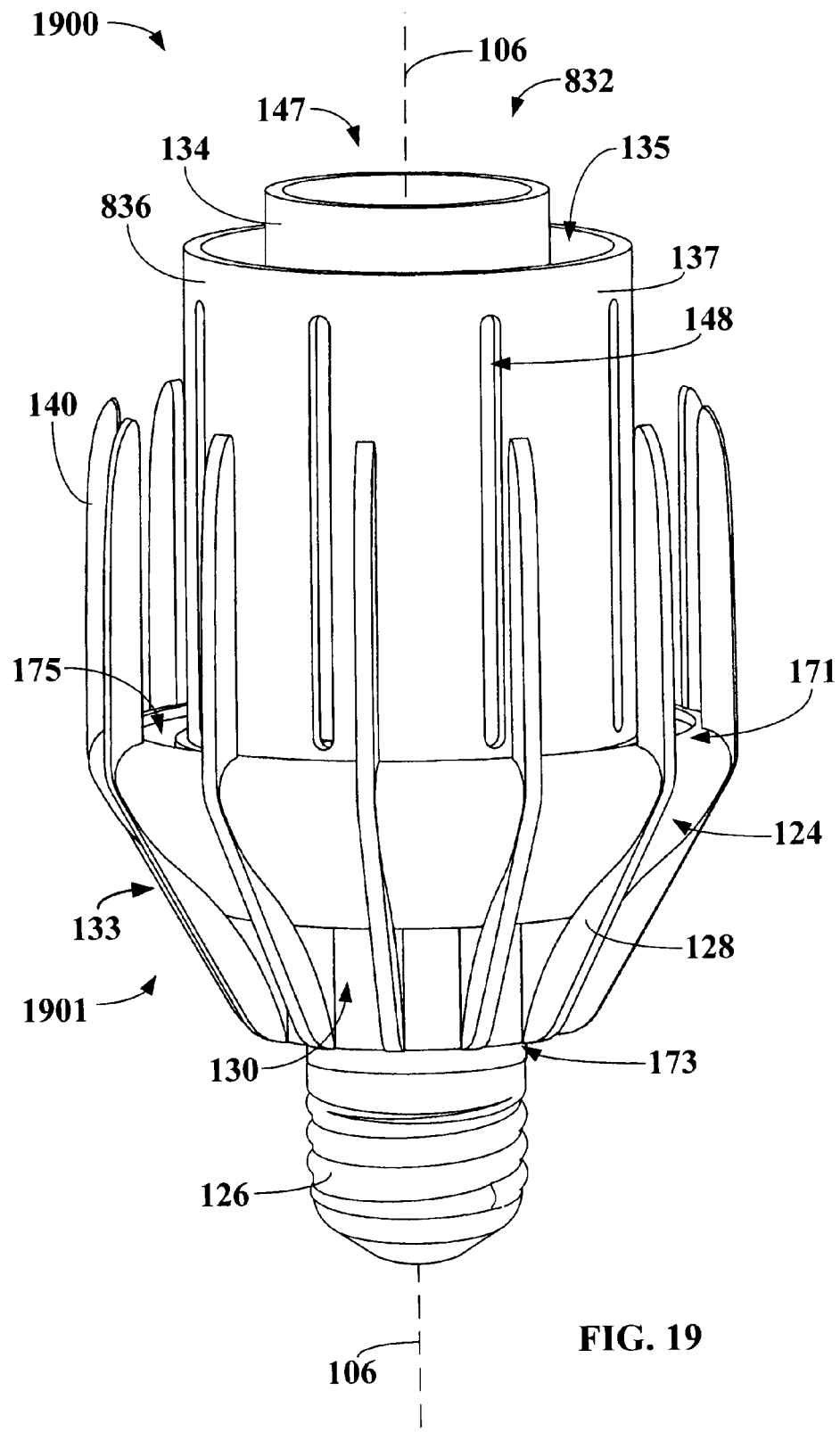

FIGS. 18 and 19 show other exemplary embodiments in which the light bulb component 1801, 1901 is similar to the light bulb component 101 shown in FIG. 16, but the light bulb component 1801, 1901 additionally includes a heat sink 132, 832 extending distally from the distal end 171 of the housing 124. The heat sink 132, 832 is surrounded by the fins 140. The heat sink 132, 832 is configured as an open-ended hollow body and includes an inner portion 134 around an inner volume 147, and an outer portion 136, 836 around the inner portion 134. The outer portion 136, 836 is separated from the inner portion 134 by an air gap 135. The housing 124 includes radial buttresses 128 that bound the vents 130. The vents 130 extend through the housing 324 from the outer surface 133 of the housing and provide a path for air flow and convection cooling. Typically, the vents are in air flow communication with one or both of the inner volume 147 and the air gap 135. When the light bulb component 1801, 1901 is oriented with its longitudinal axis 106 vertical, the cooling air flow is an axial flow through the vents 130 and the heat sink 132, 832.

As shown in FIG. 19, embodiments of the outer portion 836 of the heat sink 832 include axial through-slots 148 that extend radially through the outer portion 836 of the heat sink 832. The axial through-slots 148 allow for air flow through the outer portion 836 of the heat sink 832 into the air gap 135 between the inner portion 134 and the outer portion 836. When the light bulb component 1901 is oriented with the longitudinal axis 106 horizontal, the through-slots 148 allow cooling air to flow through the air gap 135, the air flow direction having a vertical vector component.

Figure 20:
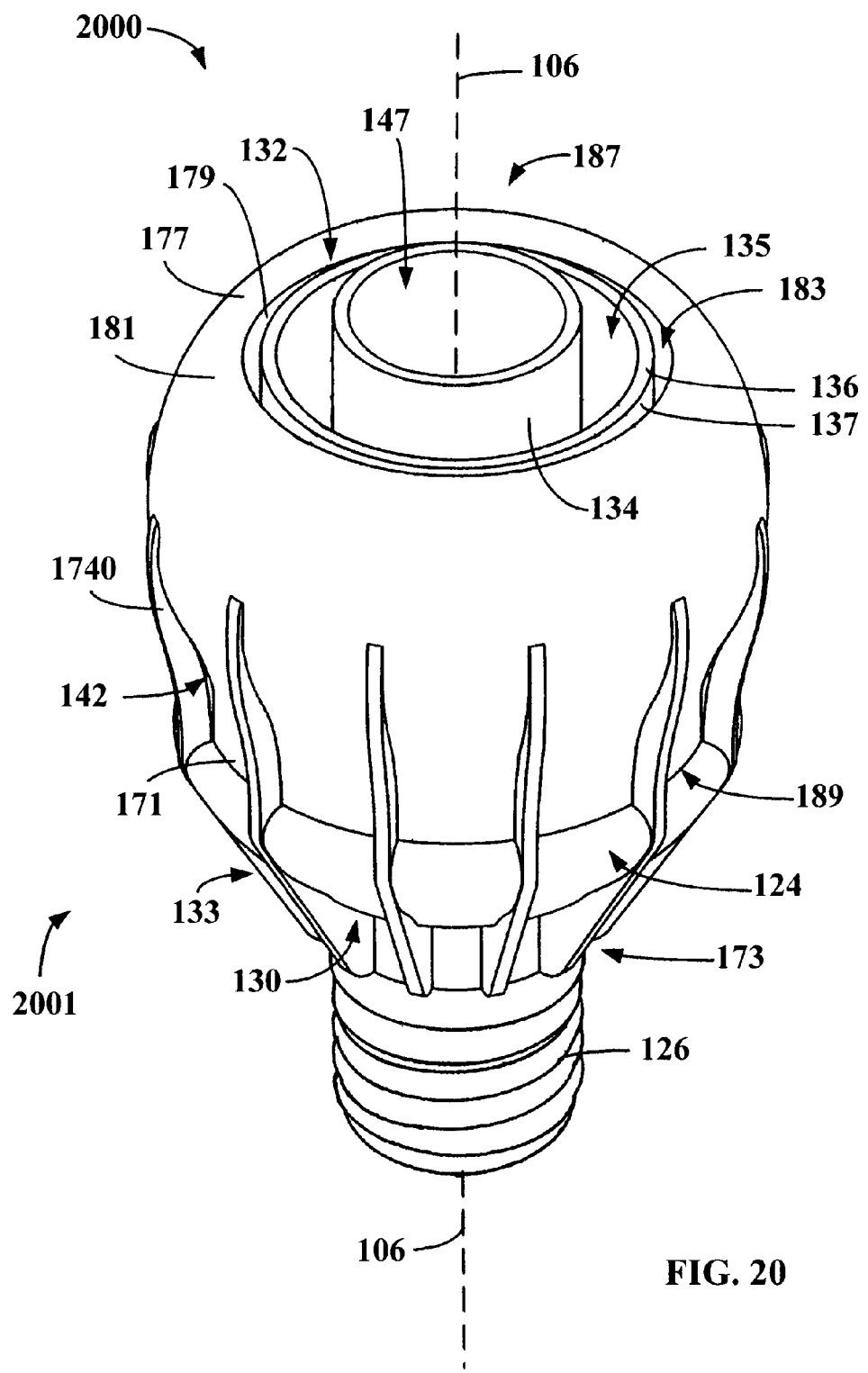

FIG. 20 shows an example of the light bulb component 2001 as a component of a light bulb 2000 that additionally includes a transparent or translucent shroud 177 at the distal end 171 of the housing 124. The heat sink 132 is at least partly disposed in the internal volume 183 of the shroud 177. In some embodiments, the heat sink extends axially beyond the open end of the shroud 177.

Figure 21:
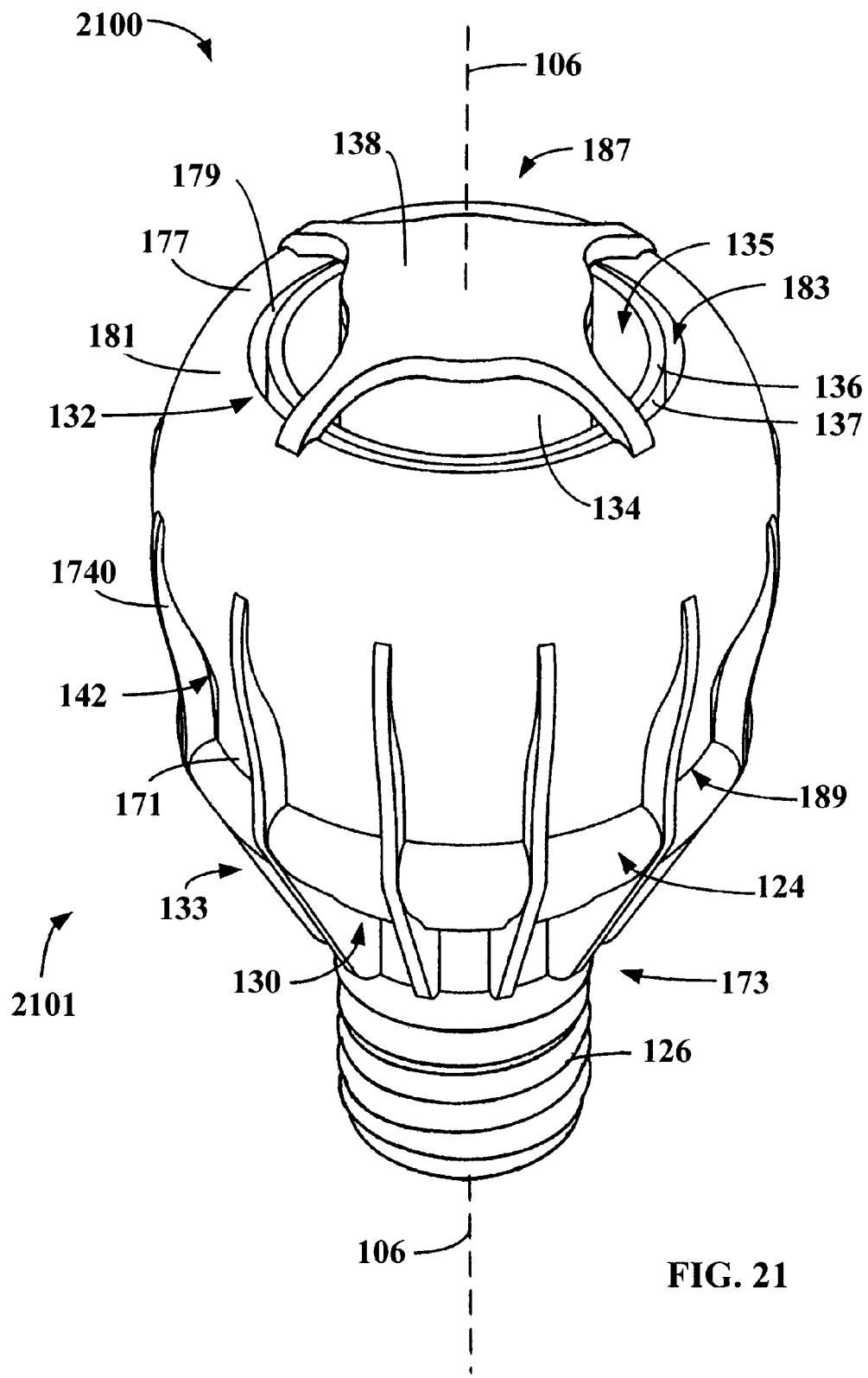

As further shown in FIG. 21, some embodiments of the light bulb 2100 additionally include an end cap 138 mechanically coupled to the heat sink 132 and thermally coupled to the light source via the heat sink 132. In some embodiments, the end cap 138 retains the shroud 177 in position relative to the housing 124. The end cap 138 may additionally define a through-hole aligned with the inner volume 147 to permit cooling air to flow through the inner volume. In other embodiments, the end cap 138 is mounted to the heat sink 132 in a manner, e.g., using stand-offs, that spaces the end cap from the inner portion of the heat sink in a way that permits cooling air to flow through the inner volume 147.

Figure 22:
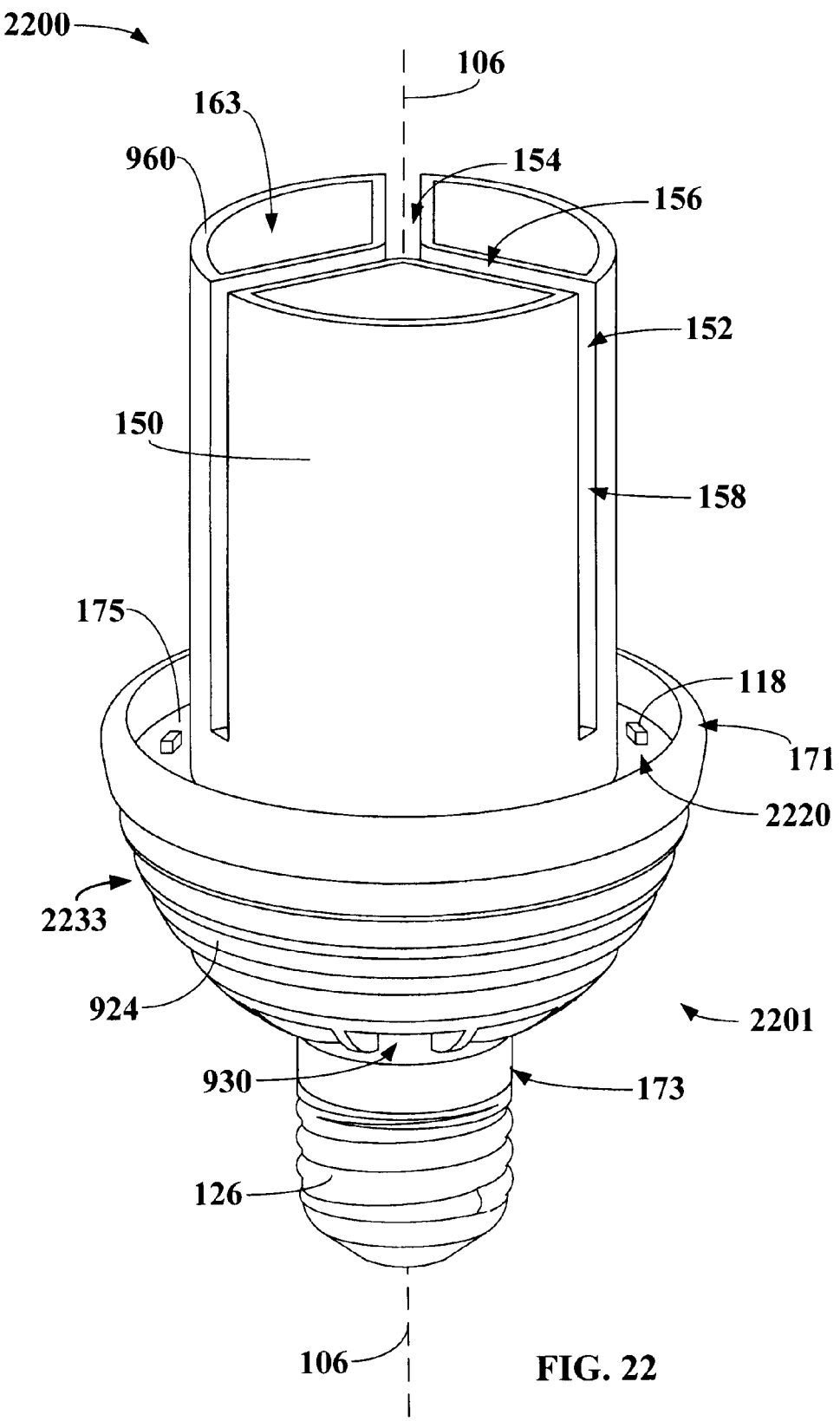

FIG. 22 shows an example of a light bulb 2200 that includes a light bulb component 2201. The light bulb 2200 is similar to the light bulb 900 shown in FIGS. 9A-9J, but the light bulb 2200 does not include the light guide 902. In some embodiments, the light bulb component is used as a component of a light bulb such as the light bulbs described above. In such light bulbs, a light guide is installed on the light bulb component and the light source is located to edge light the light guide.

The housing 924 of the light bulb component 2201 defines a longitudinal axis 106 and includes a proximal end 173 and a distal end 171. The distal end 171 of the housing 924 includes a light source mounting surface 175 to which the light source 2220 is mounted. Vents 930 extend through the housing 924 from the outer surface 2233 of the housing and provide a path for air flow and convection cooling between the outer surface 2233 and the internal volume of the heat sink 150. Although not specifically shown, in some embodiments, fins extend from the distal end 171 of the housing parallel to the longitudinal axis 106 and radially relative to the longitudinal axis 106. In one example, a pair of fins is arranged on opposite sides of the orifice of each branch 152 of the heat sink 150. In another example, the fins are arranged with a respective fin centered on each orifice 158. The cooling air entering or exiting the air flow channels 156 via the respective orifices 158 flows past or around the fins.

The heat sink 150 is coupled to the distal end 171 of the housing 924 and extends distally from the distal end 171 of the housing 924. The heat sink 150 is configured as a hollow body with a branched cross section, each branch 152 extending outward from a common center 154 and defining an air flow channel 156 that terminates in an orifice 158. In some embodiments, each branch 152 extends radially outward from the common center 154. When the light bulb component 2201 is oriented with its longitudinal axis 106 horizontal, the air flow channels 156 of the heat sink 150 provide an air flow pathway through which air flows in a direction having a vertical vector component.

The heat sink 150 includes linking portions 960, each linking portion 960 extending circumferentially between two respective adjacent 152 branches of the heat sink 150. Air passages 163 are defined by the outside surfaces of two adjacent branches 152 of the heat sink 150 and the respective linking portion 960. When the light bulb component 2201 is oriented with its longitudinal axis vertical, the air passages 163 and the vents in the housing provide an air flow pathway through which air flows in a direction having a vertical vector component. In embodiments where the air flow channels 156 are at least partially open to the vents in the housing at their ends proximate the housing 924, the air flow pathway additionally includes the air flow channels 156.

Figure 23:
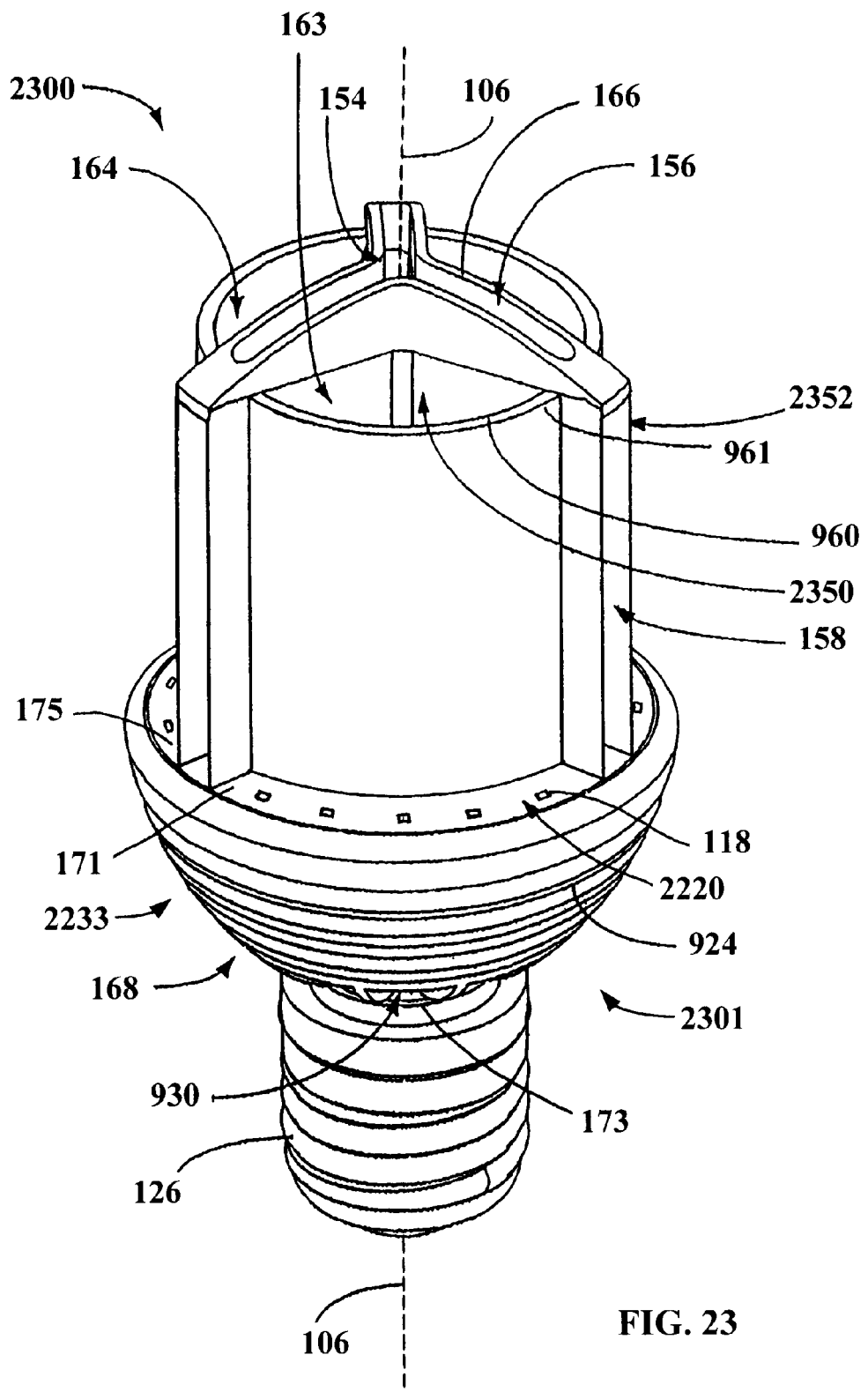

FIG. 23 shows an example of a light bulb 2300 that includes a light bulb component 2301. The heat sink 2350 of the light bulb component 2301 shown in FIG. 23 is similar to the heat sink 150 shown in FIG. 22, but the branches 2352 of the heat sink 2350 extend radially beyond the linking portions 960. The light bulb 2300 shown in FIG. 23 additionally includes an end cap 166 at the distal end 164 thereof. The end cap 166 is configured as an open-ended hollow body with a branched cross section that corresponds to and is aligned with the branched cross section of the heat sink 2350. The end cap 166 is mechanically and thermally coupled to the distal end 164 of the heat sink 2350.

With continued reference to FIGS. 22 and 23, a base 126 is coupled to the proximal end 173 of the housing 924. The base 126 is configured to mechanically mount the light bulb and receive electrical power. The light bulb additionally includes a light source 2220 having a suitable number and arrangement of solid state light emitters 118.

Figure 24:
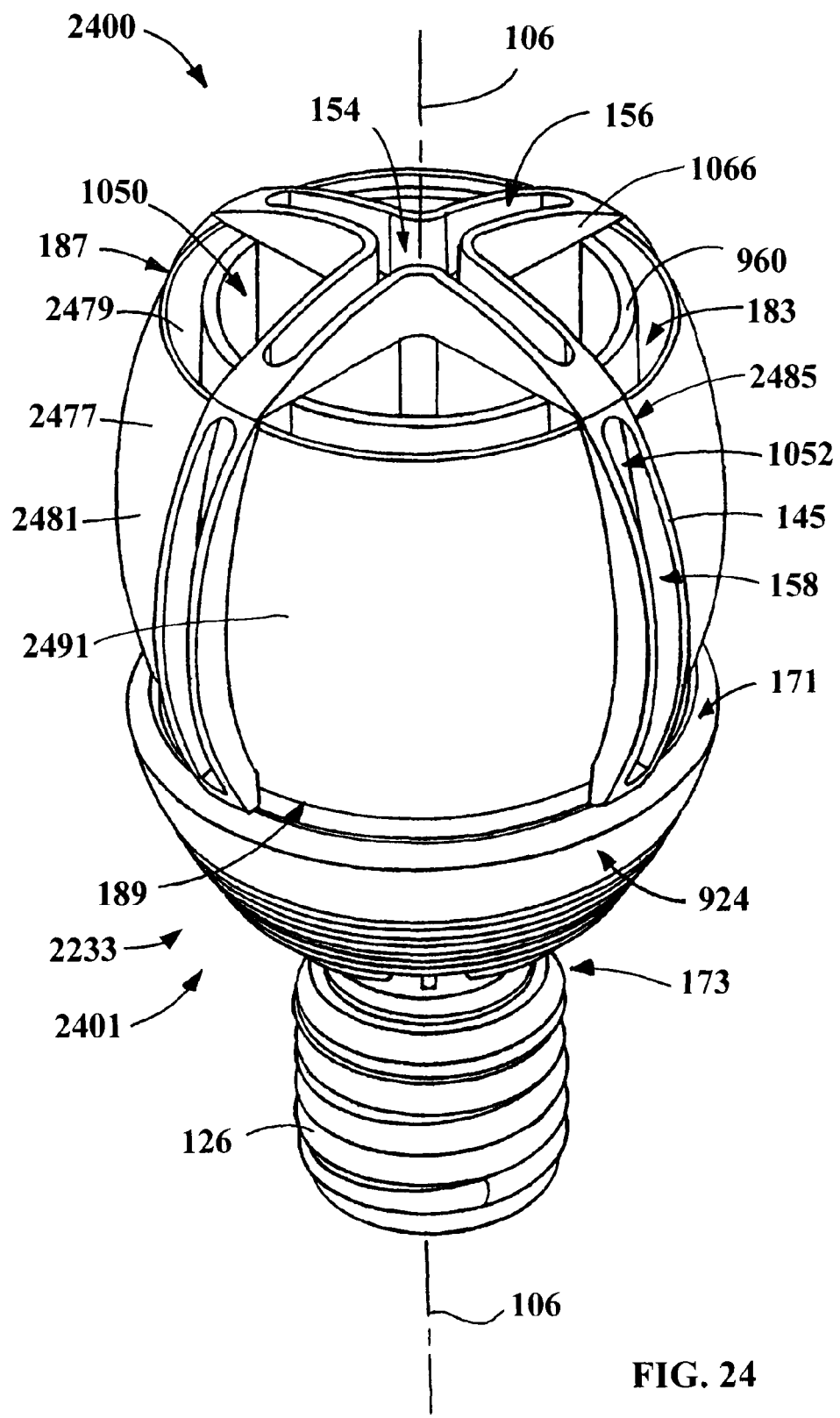

FIG. 24 shows an example of a light bulb 2400 that includes a transparent or translucent shroud 2477 at the distal end 171 of the housing 924. The shroud 2477 is configured as a hollow body surrounding an internal volume 183. The shroud 2477 extends distally from the housing 924 and includes an inner major surface 2479 and an outer major surface 2481. The shroud 2477 is open at both ends 187, 189. In some embodiments, the shroud 2477 includes shroud segments 2491 separated by through-slots 2485 to allow air flow radially through them. Each orifice 158 of the heat sink 1050 is aligned with a respective one of the through-slots 2485. The heat sink 1050 is at least partly disposed in the internal volume 2483 of the shroud 2477. A radially-outer portion of the branches 1052 of the heat sink 1050 and of the end cap 1066 extend beyond the outer major surface 2481 of the shroud 2477.

The major surfaces 2479, 2481 of the shroud 2477 may be curved in two directions. In the embodiment shown, the shape of the outer major surface 2481 of the shroud 2477 is that of a section of an ellipsoid, such as a prolate spheroid. In other embodiments, the shape of the shroud 2477 may be, for example, spherical, cylindrical, frustoconical, frustopyramidal, bell shaped, hourglass shaped, teardrop shaped, pear-shaped, bulbous, or another suitable shape. The light bulb 2400 may be configured to conform to a standard light bulb outer envelope specification.

A light source is at least partially in the internal volume 2483 of the shroud 2477 at the distal end 171 of the housing 924. Most of the light emitted from the light source propagates through the internal volume of the shroud and is incident on the inner major surface 2479 of the shroud 2477. Most of the light incident on the shroud propagates through the shroud and exits the shroud through the outer major surface 2481. In some embodiments, the shroud 2477 is specularly transmissive. Light incident on the inner major surface 2479 of the shroud 2477 passes through the shroud 2477 and is output from the light bulb 2400 with substantially no change in its light ray angle distribution. In other embodiments, the shroud 2477 includes at least one of light-scattering elements and light redirecting elements at at least one of the major surfaces 2479, 2481, and the light incident on the inner major surface 2479 of the shroud 2477 and propagating through the shroud is scattered or redirected to modify its light ray angle distribution. Regardless of whether the shroud 2477 modifies the light ray angle distribution of the light incident thereon, the shroud 2477 may additionally or alternatively modify the spectrum of the light incident thereon. In yet other embodiments, the inner major surface 2479 of the shroud is partially reflective to redirect light incident thereon back into the interior volume of the shroud to make the light ray angle distribution of the light bulb more homogeneous.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

What is claimed is:

1. A light bulb, comprising:
a light guide configured as an open-ended hollow body surrounding an internal volume and defining a longitudinal axis, the light guide comprising an inner major surface facing the internal volume and an outer major surface opposed the inner major surface, the major surfaces extending along the longitudinal axis between a proximate end of the light guide and a distal end of the light guide;
a light source to edge light the light guide such that light from the light source propagates along the light guide by total internal reflection at the outer and inner major surfaces;
a housing at an end of the light guide; and
fins extending from the housing adjacent the outer major surface of the light guide and located closer to the outer major surface than the inner major surface, the fins, the housing, and the light source being thermally coupled, wherein each fin is separated from the outer major surface of the light guide by an air gap to allow air flow between the fin and the outer major surface of the light guide.

2. A light bulb, comprising:
a light guide configured as an open-ended hollow body surrounding an internal volume and defining a longitudinal axis, the light guide comprising an inner major surface facing the internal volume, an outer major surface opposed the inner major surface, the major surfaces extending along the longitudinal axis between a proximate end of the light guide and a distal end of the light guide, and light extracting elements at at least one of the major surfaces, wherein the light guide has light guide regions and additionally comprises through-slots extending through the light guide in a direction orthogonal to the longitudinal axis, each through-slot located between two adjacent ones of the light guide regions;
a light source to edge light the light guide such that light from the light source propagates along the light guide by total internal reflection at the outer and inner major surfaces;
a housing at an end of the light guide; and
a heat sink disposed in the internal volume of the light guide and configured as a hollow body extending along the longitudinal axis and having three branches, each branch extending radially outward from the longitudinal axis from a common center and defining a radial air flow channel that terminates in an orifice aligned with a respective one of the through-slots of the light guide, the heat sink, the housing, and the light source being thermally coupled.

3. The light bulb of claim 2, wherein the branches extend radially beyond the outer major surface of the light guide.

4. The light bulb of claim 2, wherein each branch comprises an end face extending in a direction parallel to the longitudinal axis, the end face curving about an axis orthogonal to the longitudinal axis.

5. The light bulb of claim 2, wherein the heat sink comprises radial fins parallel to the longitudinal axis and extending radially inwards.

6. The light bulb of claim 2, wherein a portion of the heat sink extends beyond an end of the light guide distal from the housing.

7. The light bulb of claim 6, wherein the distal end of the heat sink is configured such that rotational air flow occurs at the distal end to cause air to flow into a portion of the internal volume between the heat sink and the inner major surface of the light guide when the light bulb is oriented with the longitudinal axis horizontal.

8. The light bulb of claim 6, wherein the portion of the heat sink that extends beyond the end of the light guide is a separate component mechanically and thermally coupled to the remainder of the heat sink disposed in the internal volume.

9. The light bulb of claim 2, wherein air flows radially through the air flow channel when the light bulb is oriented with the longitudinal axis horizontal.

10. The light bulb of claim 2, wherein the light guide comprises light guide segments each corresponding to a respective one of the light guide regions.

11. The light bulb of claim 2, additionally comprising vents extending through the housing to the internal volume of the light guide, wherein air flows axially through the vents and the air flow channels when the light bulb is oriented with the longitudinal axis vertical.

12. The light bulb of claim 2, wherein the air flow channels extend between the housing and the end of the light guide distal from the housing.

13. The light bulb of claim 2, wherein the heat sink additionally comprises linking portions adjacent the inner major surface of the light guide, each linking portion mechanically coupling two adjacent ones of the branches of the heat sink.

14. The light bulb of claim 13, wherein each linking portion comprises a highly reflective surface conforming to and facing the inner major surface of the light guide.

15. The light bulb of claim 14, wherein the heat sink has exactly three linking portions.

16. The light bulb of claim 2, wherein the housing comprises radial fins.

17. The light bulb of claim 2, wherein the housing comprises a base configured to mechanically mount the light bulb and receive electrical power.

18. The light bulb of claim 17, wherein the light extracting elements comprise one of light-scattering elements and micro-optical elements.

19. The light bulb of claim 2, additionally comprising a highly reflective surface adjacent the inner major surface of the light guide.

20. The light bulb of claim 2, additionally comprising an optical adjuster adjacent at least one of the major surfaces of the light guide to modify at least one of spectrum, polarization, light ray angle distribution, and intensity of the light extracted through the adjacent major surface.

21. The light bulb of claim 2, additionally comprising fins extending from the housing adjacent the outer major surface of the light guide and located closer to the outer major surface than the inner major surface, the fins, the housing, the heat sink, and the light source being thermally coupled, each fin separated from the outer major surface of the light guide by an air gap to allow air flow between the fin and the outer major surface of the light guide.

22. The light bulb of claim 21, wherein the light extracting elements are located to extract the light through one or more light emitting regions at the outer major surface of the light guide, the one or more light emitting regions being circumferentially offset from the fins.

23. The light bulb of claim 22, wherein the light guide additionally comprises non-light emitting regions circumferentially interleaved with the light emitting regions.

24. The light bulb of claim 21, wherein
the light guide further comprises a light input edge comprising a first light input portion and a second light input portion non-parallel to the first portion, and a concentrator surface adjacent the second light input portion configured to reflect the light input to the light guide through the second light input portion in a direction having a greater axial component than a direction in which the light is input to the light guide; and
the light source is arranged relative to the light input edge such that a first portion of the light emitted by the light source is input to the light guide through the first light input portion and a second portion of the light emitted by the light source is input to the light guide through the second light input portion.

25. The light bulb of claim 24, wherein the first light input portion is oriented more circumferentially than axially and second light input portion is oriented more axially than circumferentially.

26. The light bulb of claim 24, additionally comprising a light guide retaining member to retain the light input edge relative to the light source.

27. The light bulb of claim 24, wherein the light guide retaining member comprises one or more through-holes extending axially through the light guide retaining member in which the light source is disposed.

28. The light bulb of claim 21, additionally comprising a light guide retaining member, the light guide retaining member comprising:
a recess to retain the end of the light guide; and
a through-hole extending axially through the light guide retaining member into the recess and in which the light source is disposed, the through-hole comprising a concentrator surface configured to reflect a portion of the light emitted from the light source in a direction having a greater axial component than a direction in which the light is emitted from the light source.

29. The light bulb of claim 28, wherein the concentrator surface is highly reflective.

30. The light bulb of claim 21, wherein the fins are arranged adjacent opposite sides of the orifice of each branch of the heat sink.

31. The light bulb of claim 21, wherein a respective one of the fins is adjacent each through-slot.

32. The light bulb of claim 21, wherein the branches extend radially beyond the outer major surface of the light guide.

33. The light bulb of claim 1, wherein the fins are located radially beyond the light guide in a direction orthogonal the longitudinal axis.

* * * * *